Jan. 13, 1970            M. J. TAYLOR            3,489,914
ELECTRICAL GENERATING SYSTEM
Filed Aug. 12, 1965            13 Sheets-Sheet 1
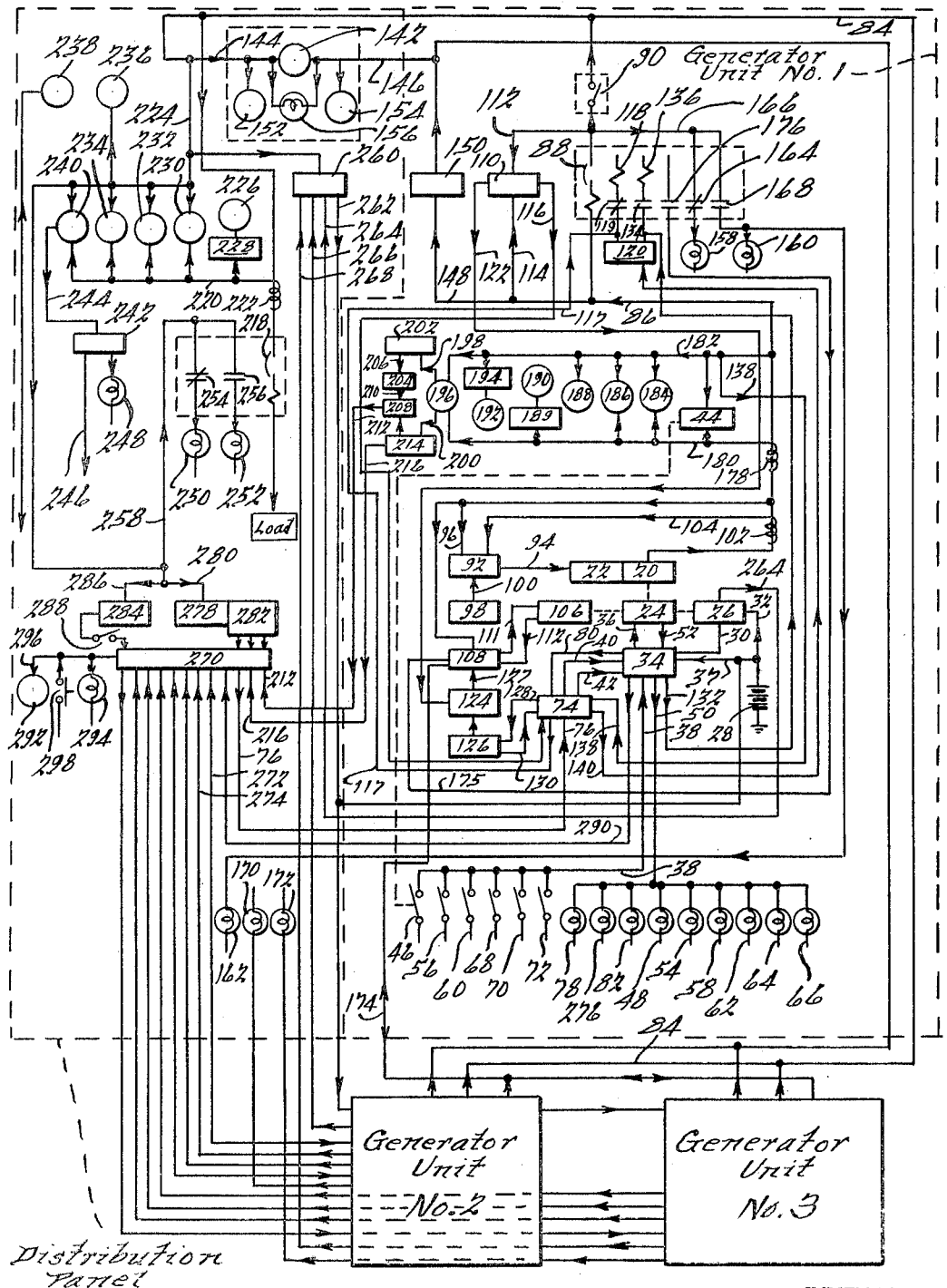
INVENTOR.
Michael J. Taylor
BY
Harness, Dickey & Pierce
ATTORNEYS.

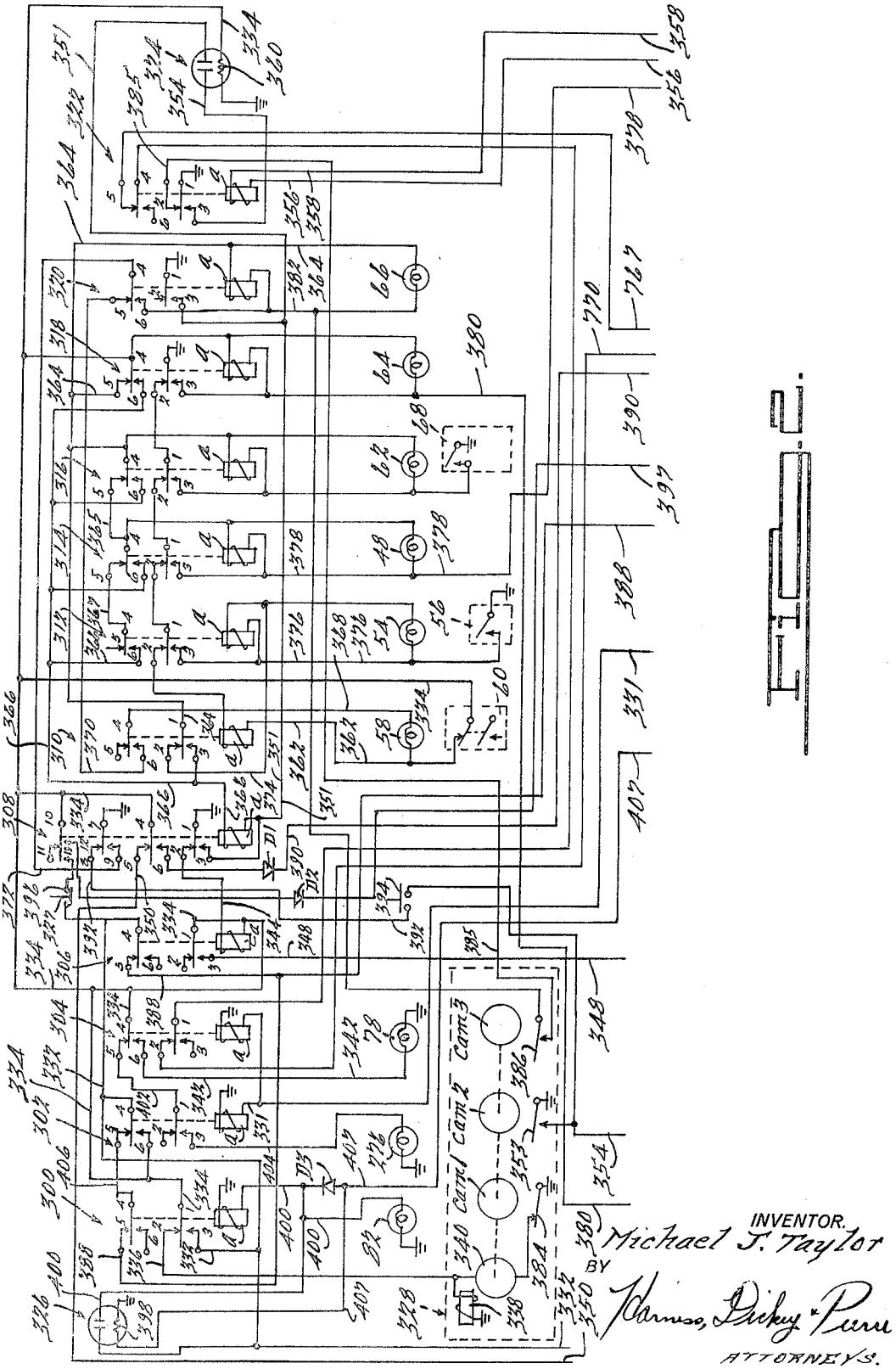

Jan. 13, 1970  M. J. TAYLOR  3,489,914
ELECTRICAL GENERATING SYSTEM
Filed Aug. 12, 1965  13 Sheets-Sheet 3
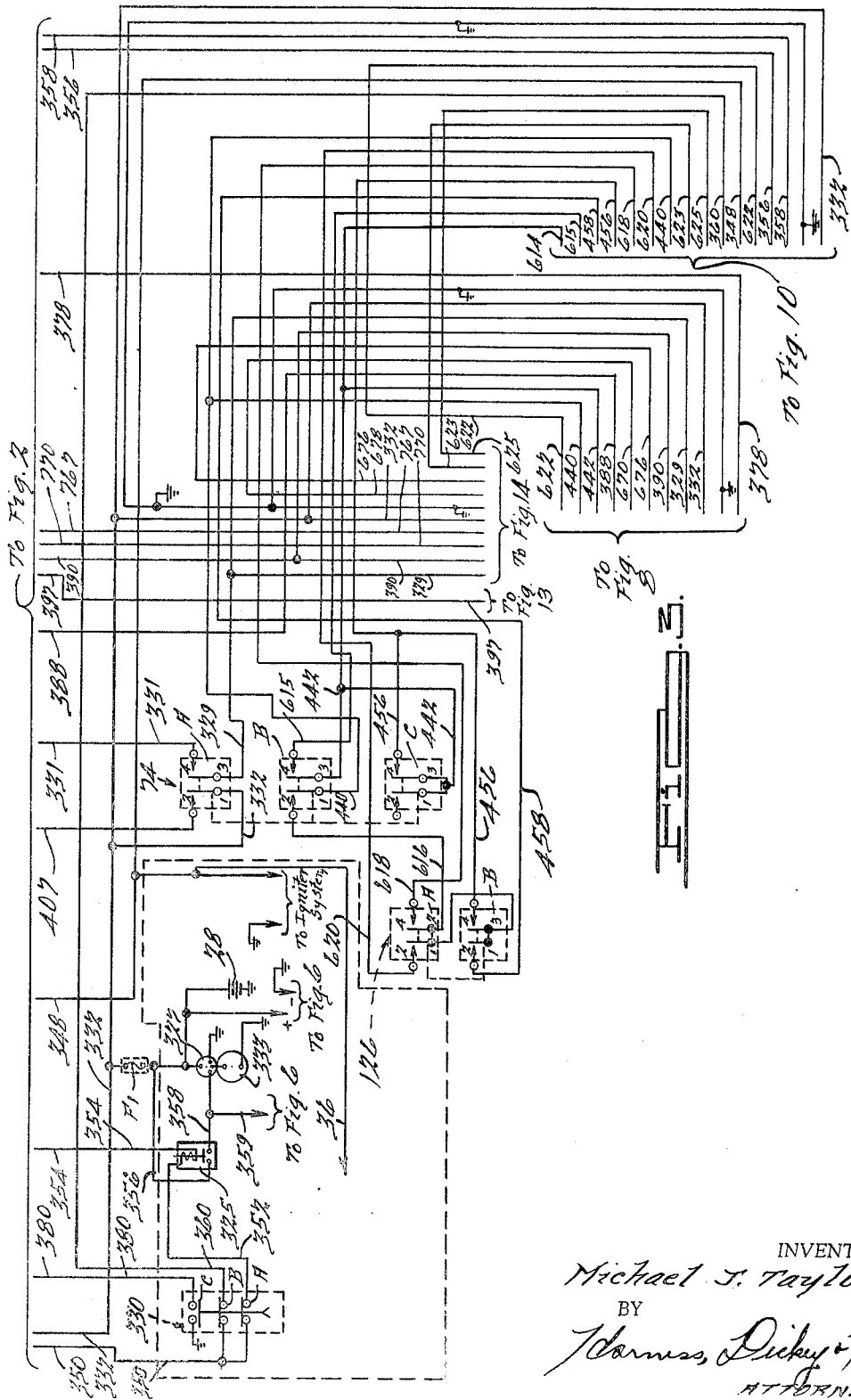
INVENTOR.
Michael J. Taylor.
BY
Harness, Dickey & Pierce
ATTORNEYS.

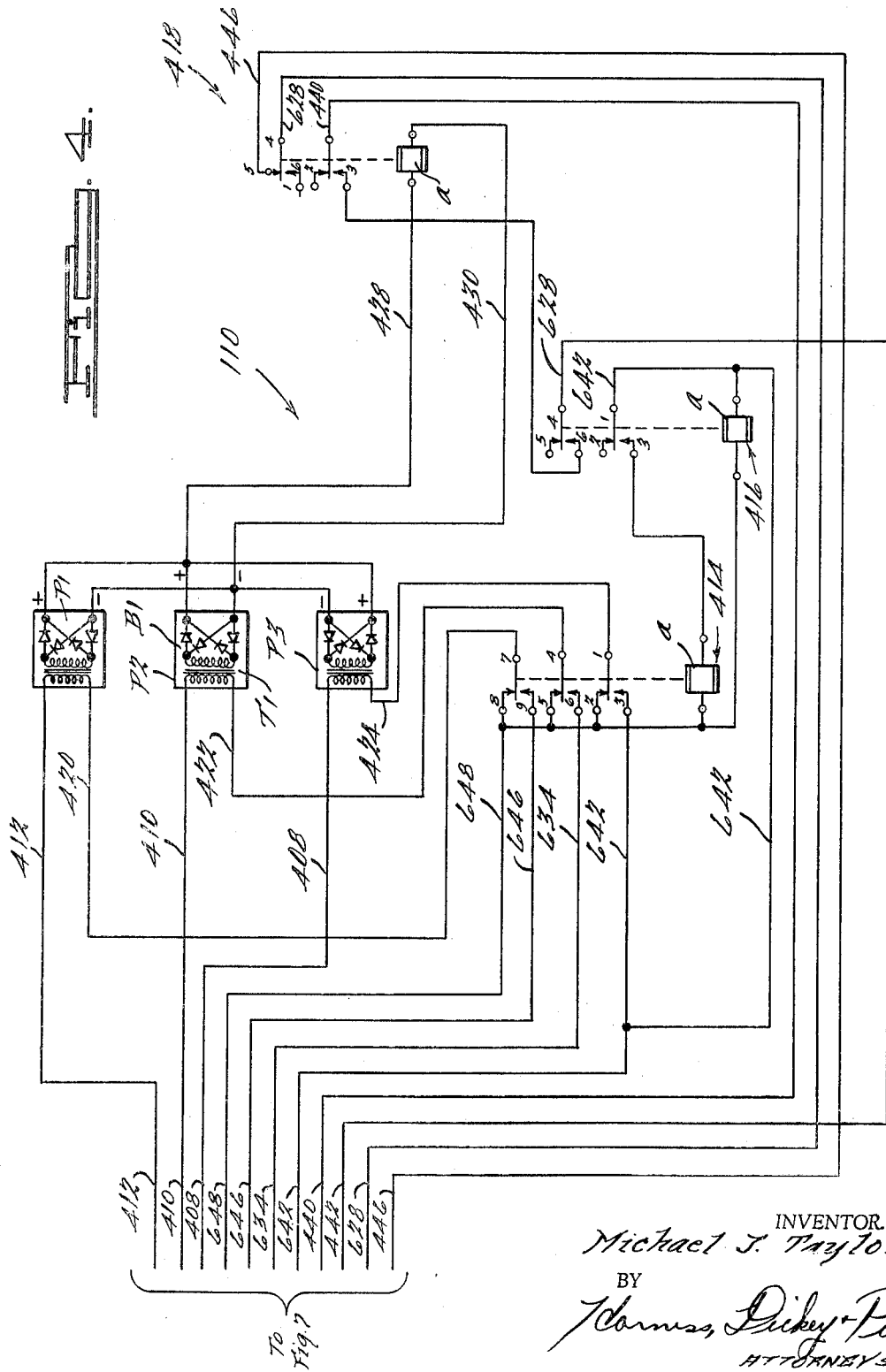

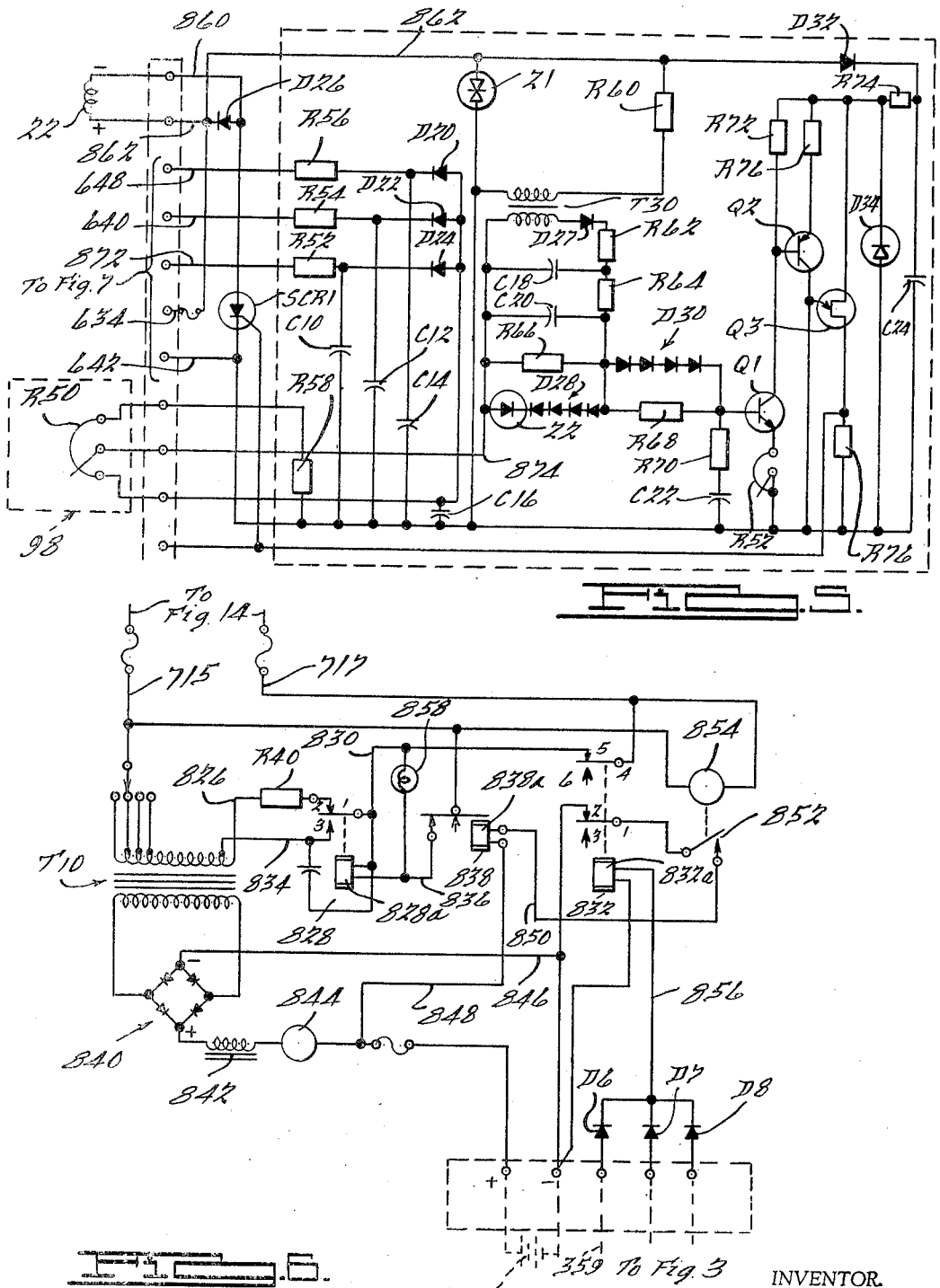

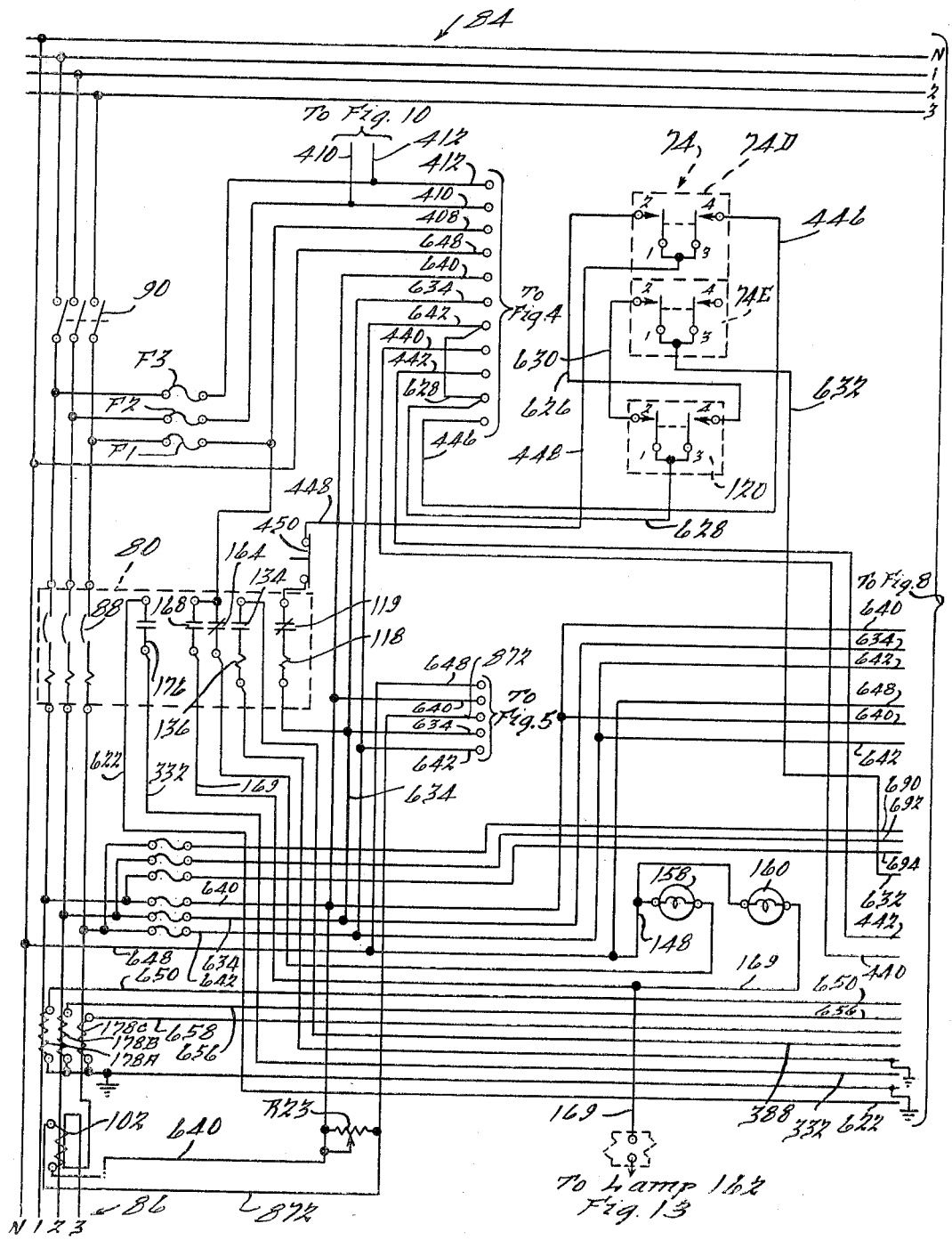

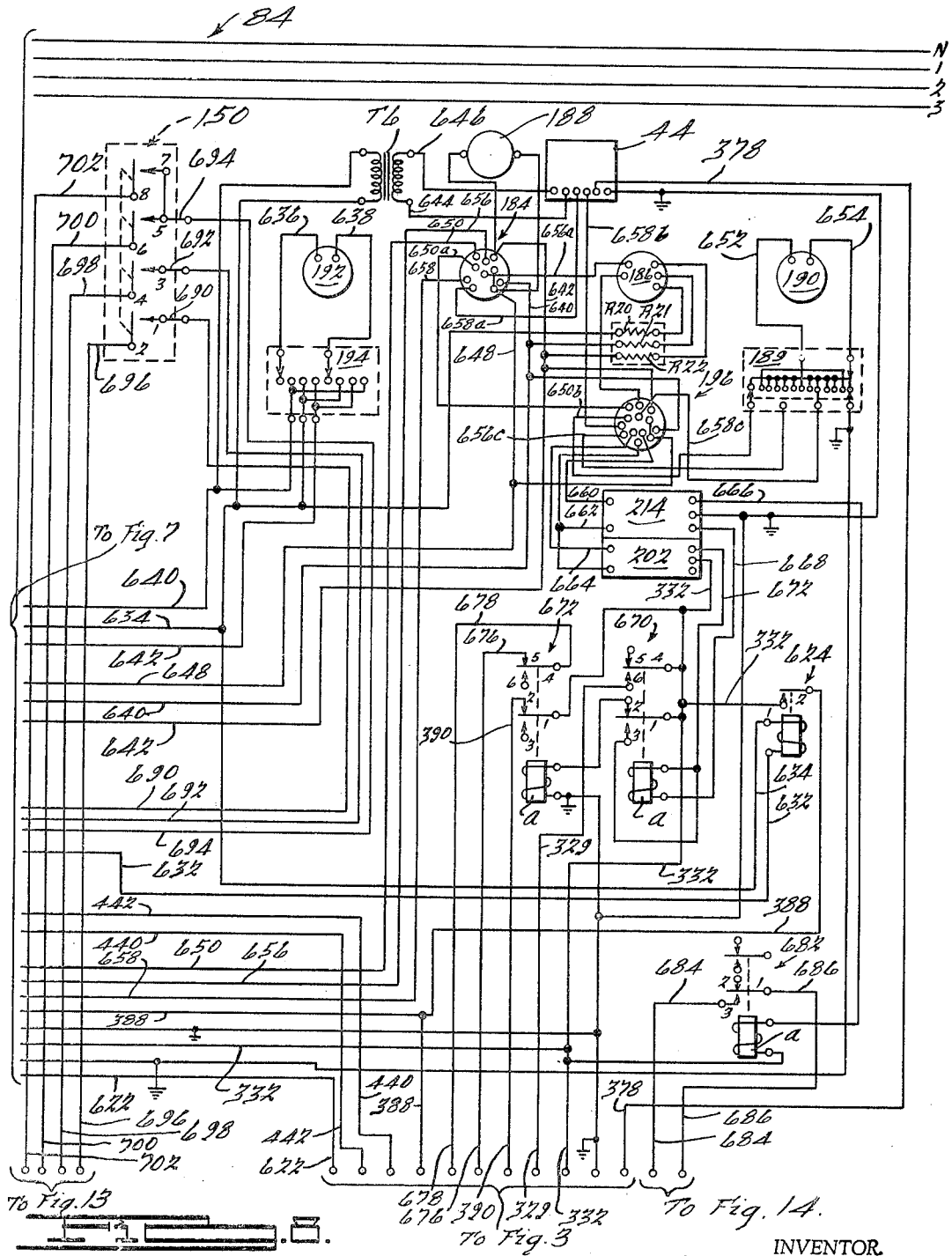

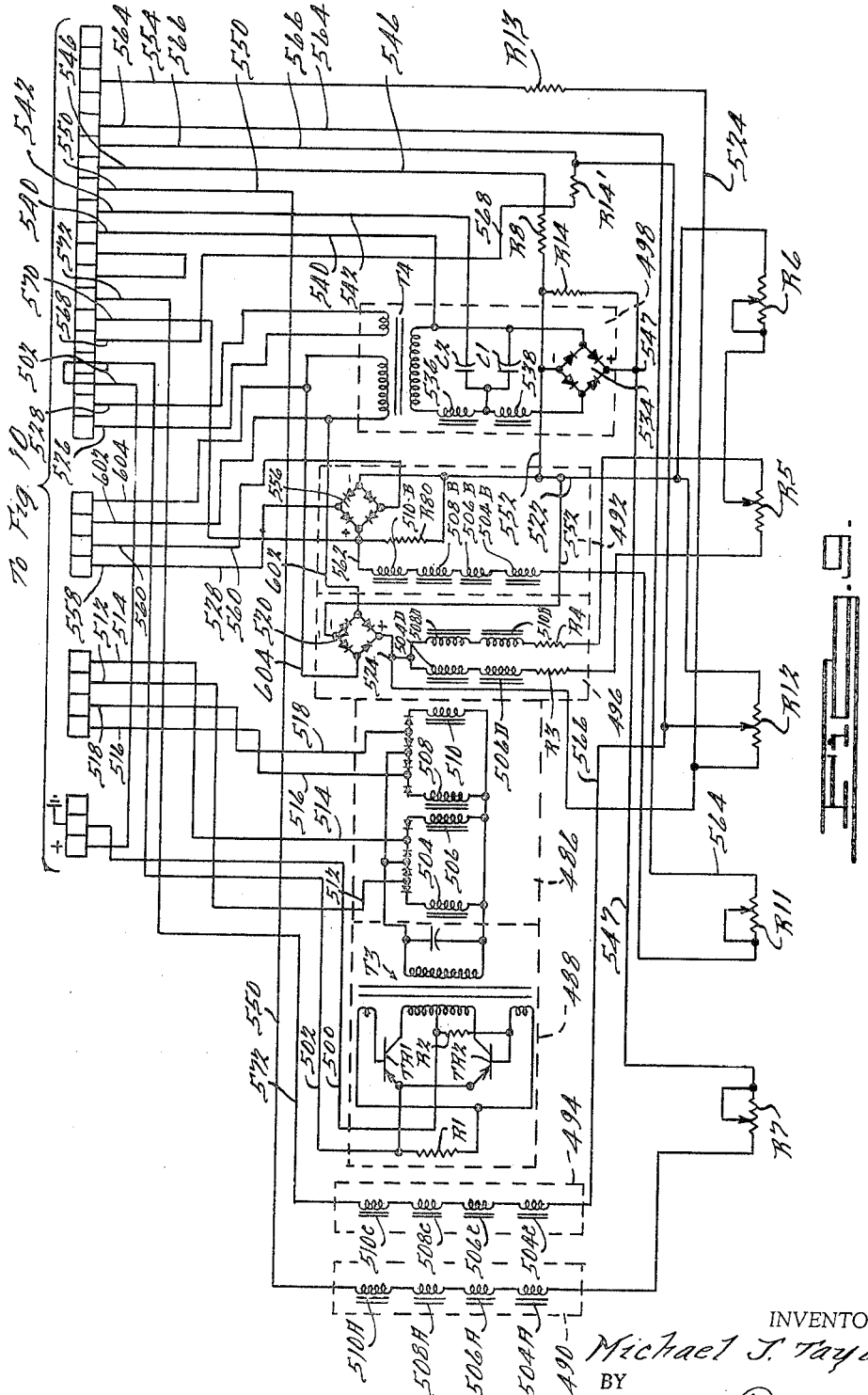

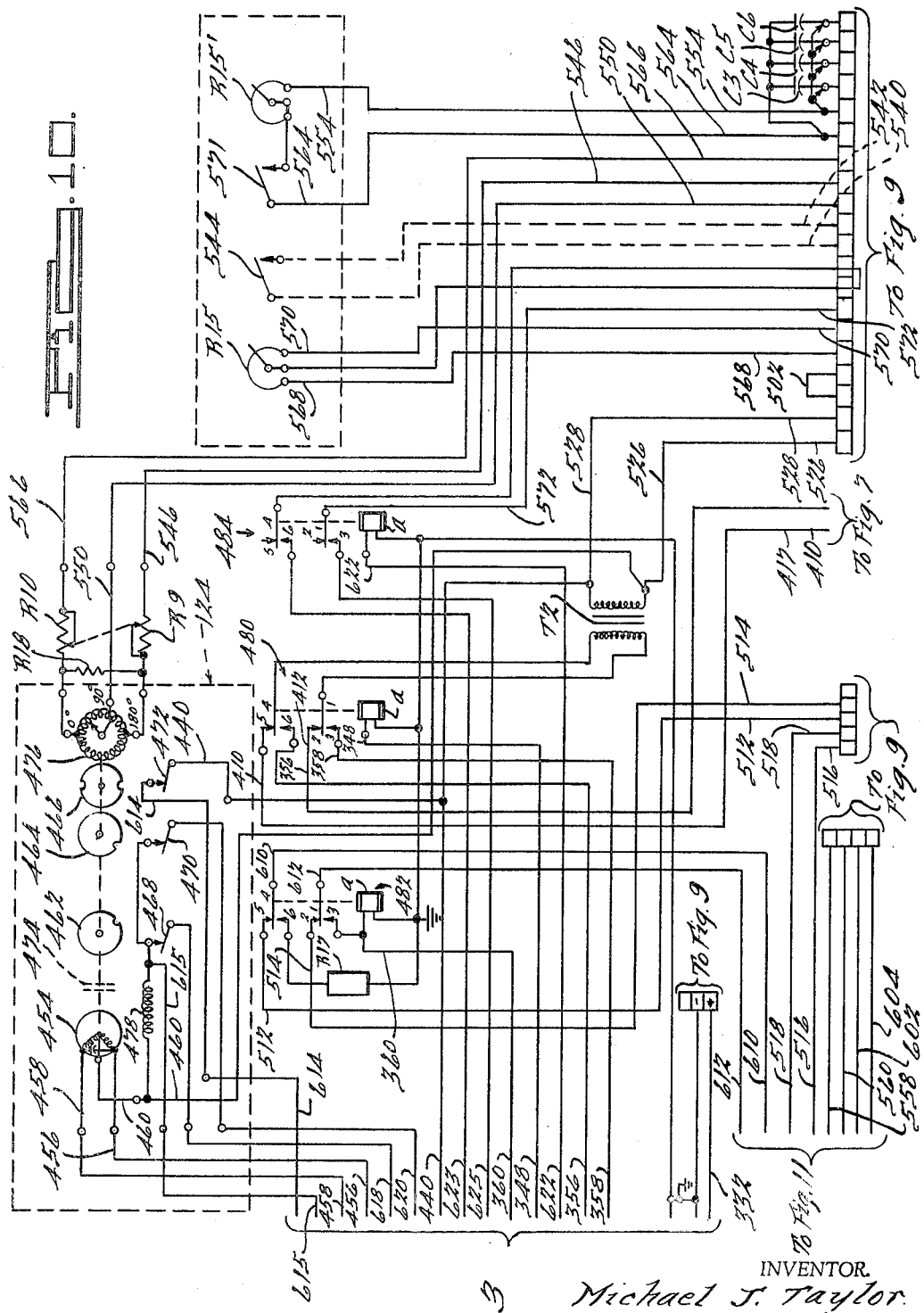

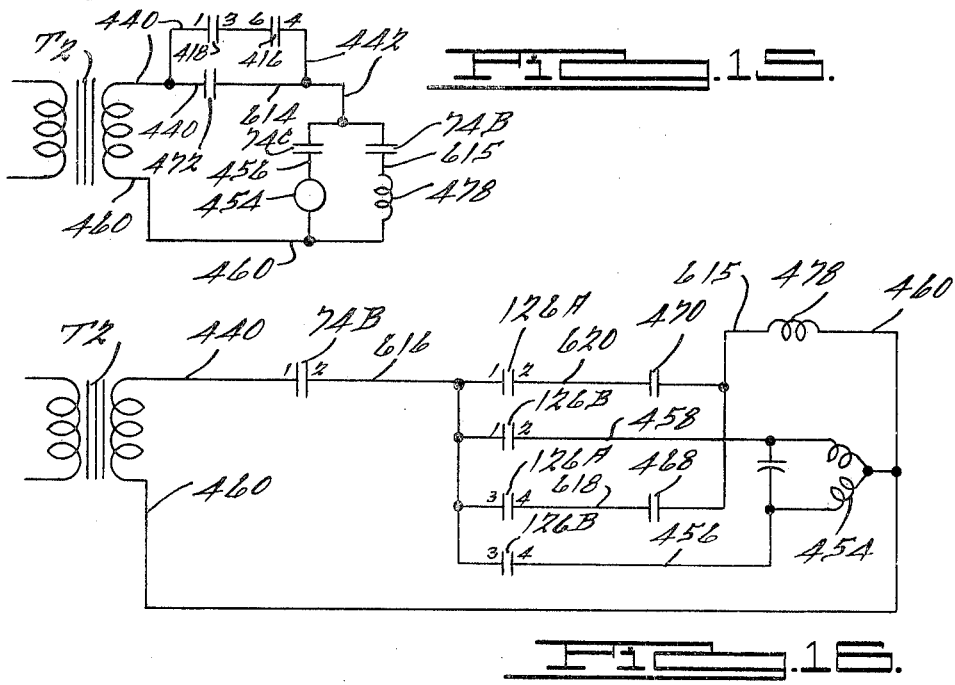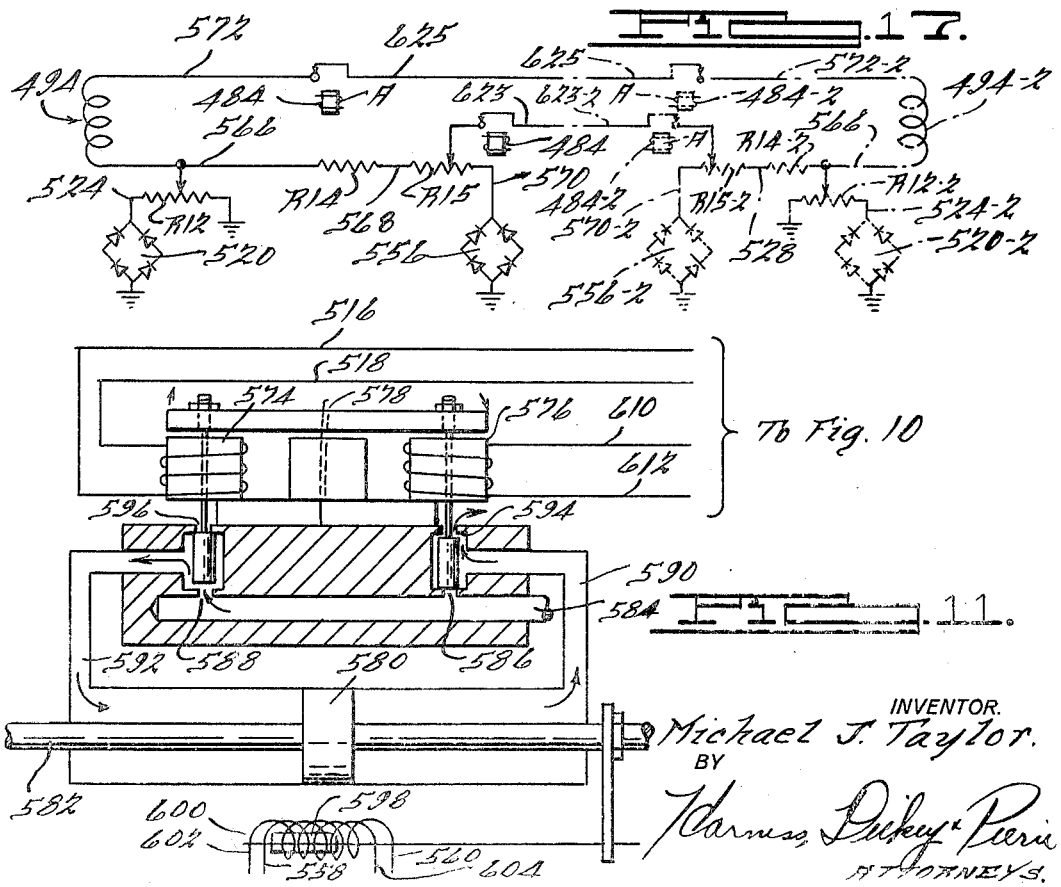

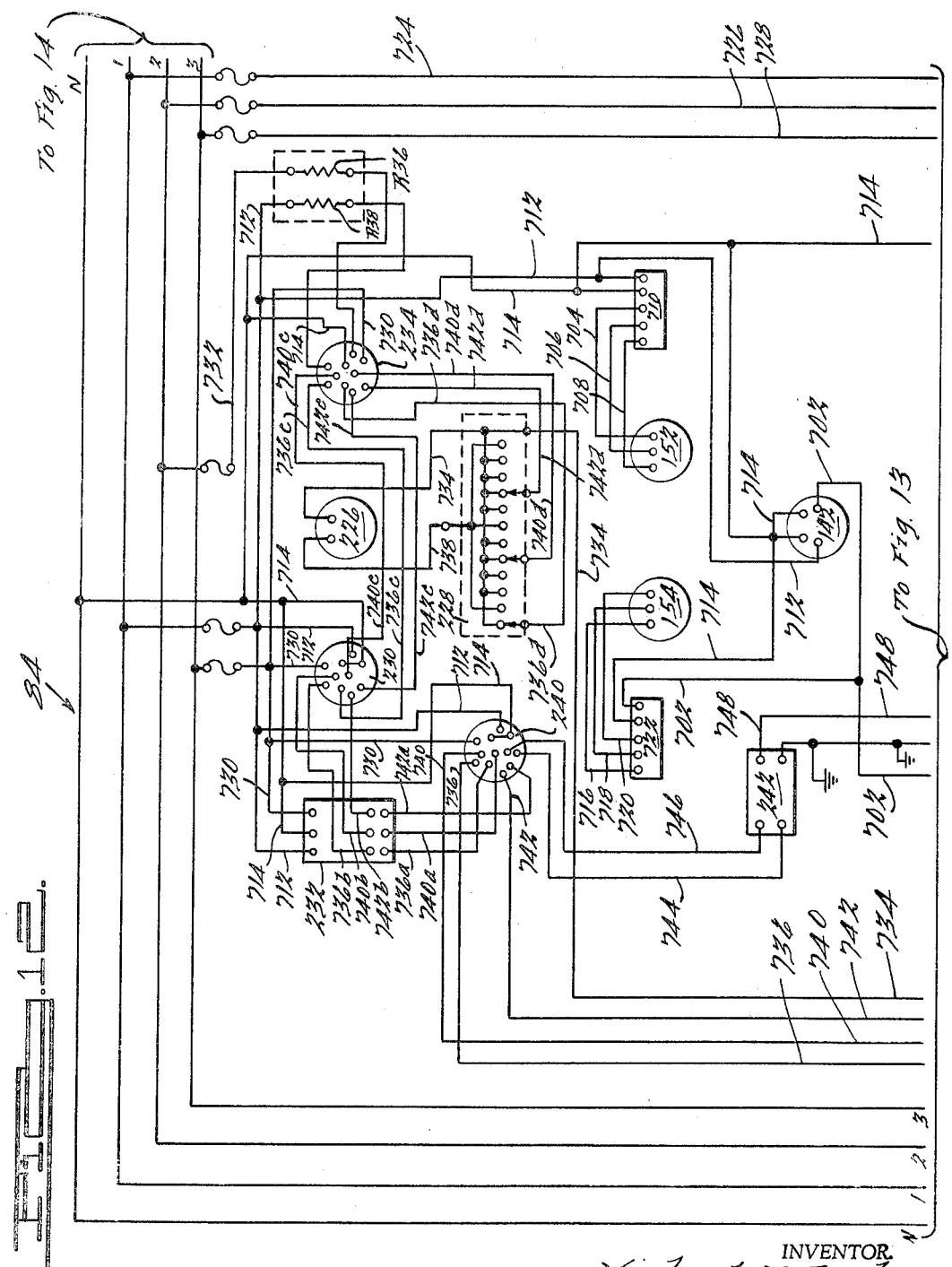

Jan. 13, 1970   M. J. TAYLOR   3,489,914
ELECTRICAL GENERATING SYSTEM
Filed Aug. 12, 1965   13 Sheets-Sheet 12
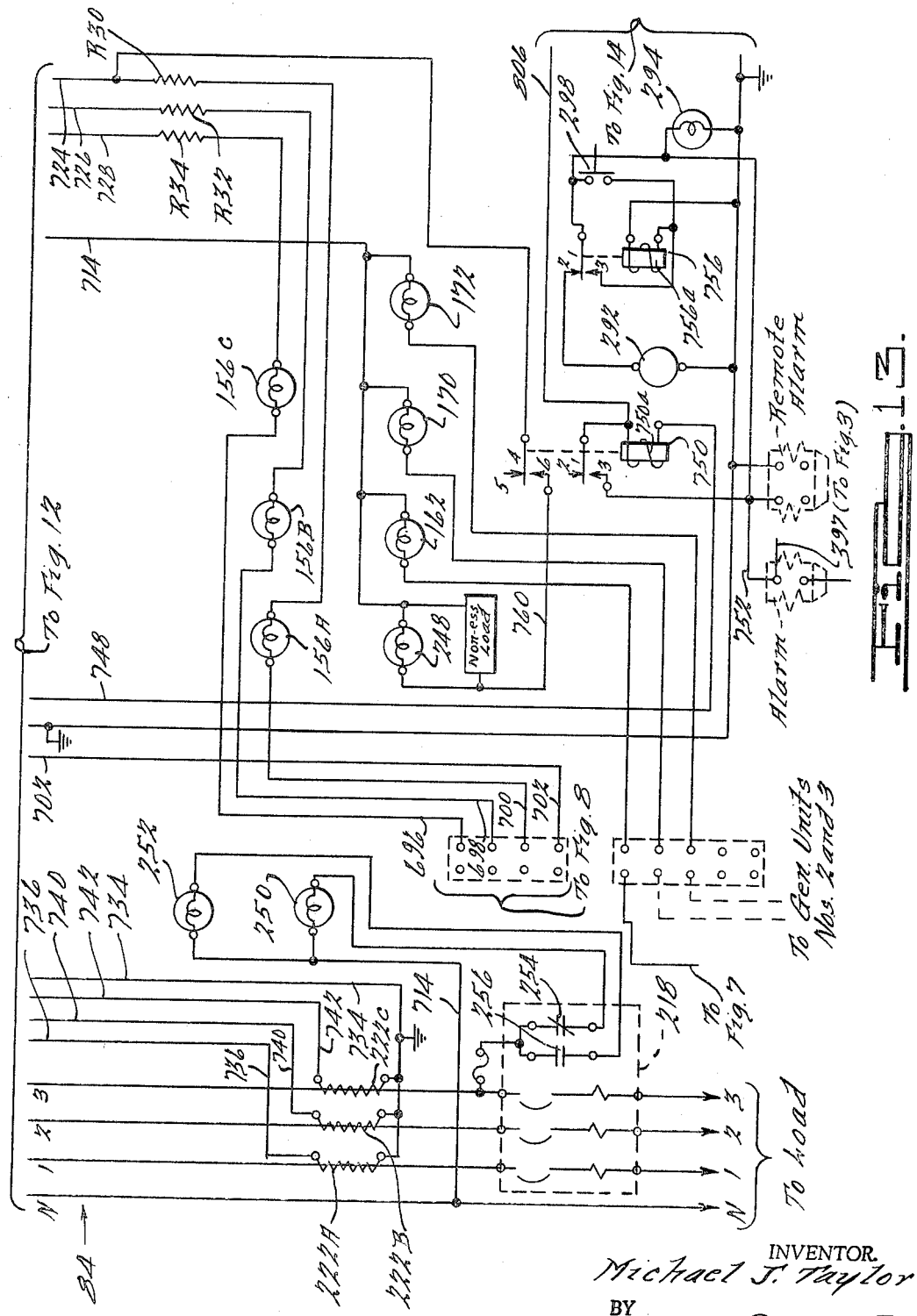
INVENTOR.
Michael J. Taylor
BY
Carnes, Dickey & Pierce
ATTORNEYS.

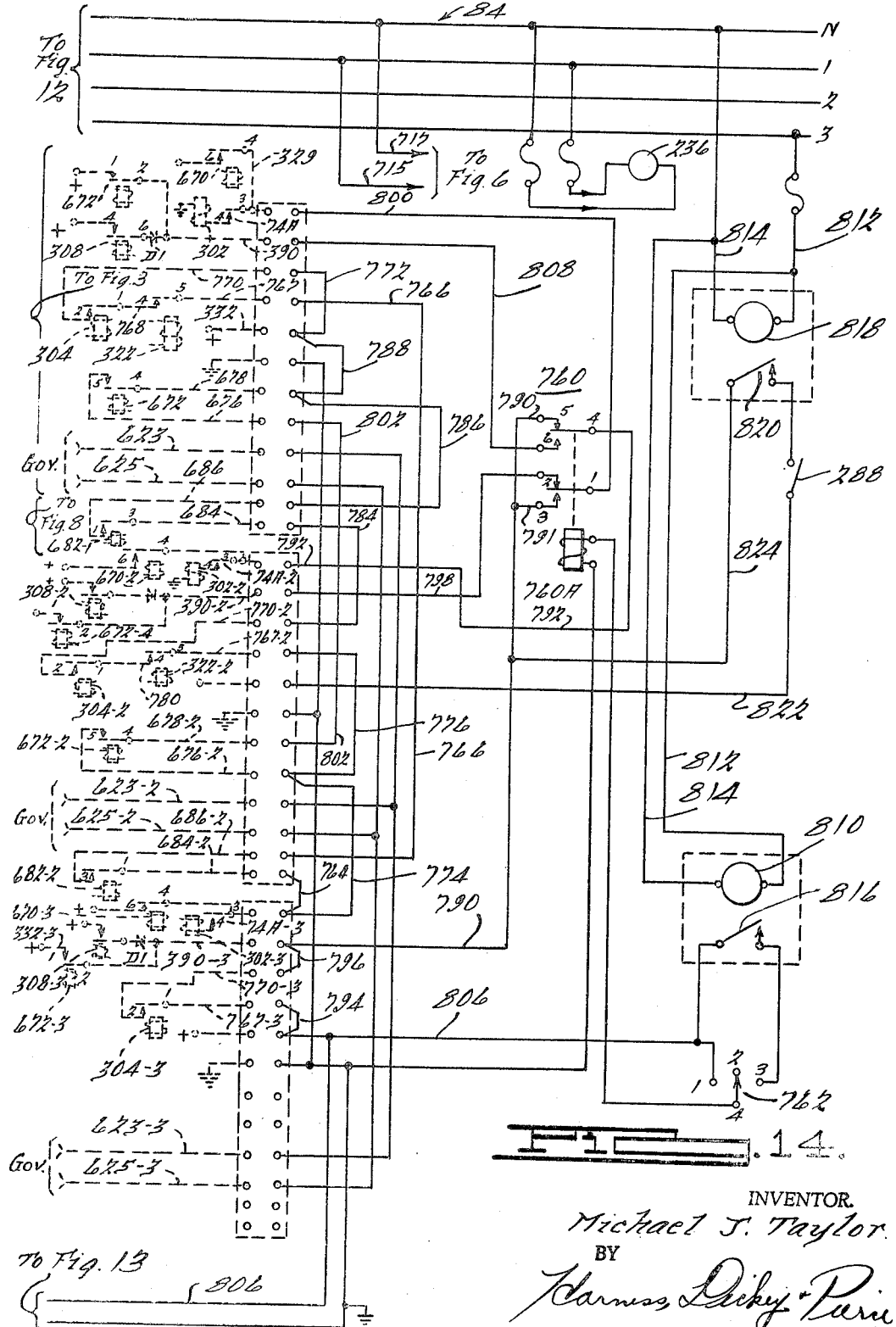

United States Patent Office 3,489,914
Patented Jan. 13, 1970

3,489,914
ELECTRICAL GENERATING SYSTEM
Michael J. Taylor, St. Clair Shores, Mich., assignor to Ready-Power Company, Detroit, Mich., a corporation of Michigan
Filed Aug. 12, 1965, Ser. No. 479,092
Int. Cl. H02j 1/10, 3/00
U.S. Cl. 307—59                                    20 Claims

ABSTRACT OF THE DISCLOSURE

An electrical generating system having a generator driven by a prime mover and to be paralleled onto a bus and including synchronizing means to sense the difference in phase between the potential on the bus and the potential from the generator and providing a signal to a modulator which is connected to the prime mover such that the speed of the prime mover is varied by the modulator in response to the signal over a preselected range and also including a time delay means for delaying for a preselected interval the sensing of the difference in phase whereby the scan signal is not provided during initial starting periods of the prime mover during which the prime mover is rapidly brought up to speed.

---

The present invention relates to electrical generating systems.

There are many applications in which public utility electric power is unavailable or quite costly because of larger demand; there also are many applications in which it is desirable to have an auxiliary power supply available.

The present invention deals with an electrical generating system which can be economically used in the above and many other applications. A typical system utilizing the present invention would include two or more generators, each of which is driven by an internal combustion engine and would further include controls whereby the generators would be actuated to start, divide load and stop according to load demand.

For example, the system could include two 100 kw. generators and a 50 kw. generator.

The operation of the generators would be controlled such that an efficient combination of generators would be actuated to accommodate the load demand; hence, at times only one of the generators might be in operation. Automatic timing and sequencing are provided so that each generator and its associated prime mover are operated for the same length of time; i.e., to equalize wear, etc. Additional automatic controls are provided whereby one or more of the generators is automatically brought into a condition of readiness to anticipate an increase in load, the occurrence of which can be programmed on the basis of prior known load demand information. The system also includes means to automatically shut down an engine-generator unit in the event that the associated engine begins to malfunction and to bring another onto the load to take its place; in addition, if the demand is too great for the capacity of the generators available for use, non-essential loads are automatically dropped to relieve the demand on the system. The system also includes time delay apparatus such that the automatic controls are not constantly cutting generators in and out as the result of load fluctuations of short duration. The system has other automatic control features as well as many manual override controls. As will be seen, the system offers flexibility in design to efficiently and effectively accommodate many different applications.

Therefore, it is an object of the present invention to provide a new and improved electrical generating system.

It is another object of the present invention to provide an electrical generating system utilizing two or more generators each driven by its own prime mover in which the relatively duty times of the different generators are automatically controlled over a selected time base.

It is another object of the present invention to provide an electrical generating system utilizing two or more generators in which the load demand is sensed and an efficient combination of generators satisfying the demand is automatically selected.

It is another object of the present invention to provide an electrical generating system utilizing two or more generators in which an engine which is malfunctioning and which is driving a generator is automatically de-actuated and another generator actuated to take its place.

It is another object to provide novel apparatus for providing alarm signals in response to detected malfunction conditions.

It is another object of the present invention to provide an electrical generating system utilizing two or more generators in which in the event that the demand is greater than the capacity of those generators capable of functioning preselected non-essential loads are automatically dropped to relieve the demand.

It is another object to provide a generating system capable of manual, automatic or combined manual automatic operation.

It is another object of the present invention to provide an electrical generating system utilizing two or more generators in which anticipated load demands are programmed whereby the system is automatically brought into readiness to accommodate the anticipated demand.

It is another object of the present invention to provide an electrical generating system utilizing two or more generators in which time delay apparatus is provided to prevent generators from being cut in and out as the result of load fluctuations of short duration.

It is another object to provide novel synchronizing apparatus for automatically synchronizing a generator with a bus.

Other objects, features, and advantages of the present invention will become apparent from the subsequent description and the appended claims, taken in conjunction with the accompanying drawings, in which:

FIGURE 1 is a schematic block diagram of a system embodying the features of the present invention;

FIGURES 2 and 3 combined are an electrical schematic diagram of a manual-automatic selector switch and a part of an automatic start/stop control and other elements of the system of the present invention;

FIGURE 4 is a schematic diagram of an automatic synchronizer of the present invention;

FIGURE 5 is a schematic diagram of the voltage regulator of the present invention;

FIGURE 6 is a schematic diagram of the battery charger of the present invention;

FIGURES 7 and 8 combined are a schematic diagram of instrumentation and interconnections between components of one of the generator units of the present invention;

FIGURE 9 is a schematic diagram of the governor of the present invention;

FIGURE 10 is a schematic diagram of a modulator and other circuit elements of the present invention;

FIGURE 11 is a partial schematic and cross-sectional view of a hydraulic actuator of the present invention;

FIGURES 12 and 13 combined are a circuit diagram of a main distribution panel and associated circuitry of the present invention;

FIGURE 14 is a circuit diagram of an automatic-manual engine selector control system of the present invention;

FIGURE 15 is a simplified circuit diagram of the automatic synchronizing circuit of the present invention;

FIGURE 16 is a simplified circuit diagram of the manual synchronizing circuit of the present invention; and FIGURE 17 is a simplified circuit diagram of the load sharing circuit of the present invention.

Looking now to FIGURE 1, a system is shown having three generator units generally indicated as generator unit No. 1, generator unit No. 2, and generator unit No. 3. For purpose of illustration it will be assumed that generator units Nos. 1 and 2 are of equal capacity and of greater capacity than generator unit No. 3. Since the individual control apparatus for each of the generator units Nos. 1, 2 and 3 is generally identical, only the individual control apparatus of generator unit No. 1 has been shown. The system further includes a distribution panel which includes control apparatus common to all three generator units. In the diagram of FIGURE 1 electrical connections between the various components are shown by a single line which in the following discussion are referred to as cables; it should be understood that these cables could include one or more conductors and are shown principally for purposes of general explanation.

In this system, generator units Nos. 1 and 2 would be used for high load conditions either together or alone and generator unit No. 3 could be used for low demand periods or with units Nos. 1 and 2 for maximum demand periods.

In FIGURE 1 the generator unit No. 1 includes a generator 20 which has an exciter 22 and which is driven by a prime mover 24. The prime mover 24, while in the preferred system it is an internal combustion engine operated on a gaseous fuel, can be of another form and still suffice.

The engine 24 is started by a starter motor 26 which is energized by a battery 28. A circuit can be completed from battery 28 through the starter motor 26 via cables 30 and 32 by means of an automatic start/stop control 34. The start/stop control 34 controls the ignition system of engine 24 via the cable 36. Thus, the start/stop control 34 is capable of controlling the starting and stopping of the engine 24.

The electrical power for the ignition system is obtained from battery 28 via cable 37 through the start/stop control 34 and through cable 36. As will be seen, the control 34 operates responsively to signals received via cables 38, 40, and 42. Cable 38 carries signals for stopping the engine 24 when certain sensed conditions occur. These conditions are the following: (1) the occurrence of reverse power; i.e., the generator 20 is receiving power from one of the other generators and is tending to act as a motor; (2) the occurrence of excessive water temperature in the cooling system of the engine 24; (3) the occurrence of low oil pressure in the lubrication system of the engine 24; (4) the occurrence of excessive vibration of the engine 24; (5) the occurrence of excessive speed of the engine 24; and (6) the occurrence of overcranking of the engine 24 without starting. Occurrence of reverse power is sensed by a reverse power relay 44 which functions in a manner to be described to close a reverse power relay switch 46 whereby a signal is transmitted to the start/stop control 34 via cable 38 to stop the engine 24. When the engine 24 is stopped for a reverse power condition, an appropriately designated lamp or alarm 48 is actuated via a signal from the start/stop control 34 via a cable 50. The cable 50 also carries other sensed conditions of the engine 24. Thus, the occurrence of excessive water temperature results in a switch 56 to close whereby a signal is transmitted via cable 38 to start/stop control 34 to stop the engine 24 and further results in a signal to a high water temperature light or alarm 54 via cable 50. The occurrence of low oil pressure results in a switch 60 to close whereby a signal is transmitted via cable 38 to start/stop control 34 to stop the engine 24 and further results in a signal to a low oil pressure light or alarm 58 via cable 50. In a similar manner excessive vibration, engine overspeed, or overcranking result in signals to excessive vibration light or alarm 62, to overspeed light or alarm 64, and to overcrank light or alarm 66, respectively, responsively to the closing of switches 68, 70 and 72, respectively, whereby the engine 24 is stopped.

The operation of engine 24 and hence of generator 20 can be either automatically through the automatic start/stop control 34, along with apparatus to be described, or manually. A manual-automatic selector switch 74 is connected to the start/stop control 34 and can be placed in one of three condition; the first is an "off" condition in which the engine 24 cannot be actuated; the control 34 also can be placed in a condition in which the starting and stopping of engine 24 is caused automatically and in another condition in which it is caused manually. The cable 42 connects the selector switch 74 to the start/stop control 34 and with switch 74 in its automatic condition appropriate control signals are transmitted through cable 42 from a cable 76. The cable 76 is connected to apparatus in the distribution panel and receives control signals therefrom in a manner to be described. With the switch 74 in its automatic position and with the occurrence of appropriate signals to automatically start engine 24, an indicating lamp 78 is energized via a signal through cable 50 and cable 76 to start stop control 34.

With the selector switch 74 in its manual condition the connection between cables 42 and 76 is broken and a connection between cable 40 and a cable 80 is made whereby manual control signals for starting engine 24 can be fed to the cable 36 through the start/stop control 34. With the switch 74 in this latter condition an indicating lamp 82 is energized via a signal through cable 50.

The output from generator 20 can be connected to a main bus 84 via an output cable 86 which is in series with the contacts of a main circuit breaker 88 and a manual disconnect switch 90. The operation of the main breaker 88 will be described in detail later. The potential at generator 20 is controlled by an automatic voltage regulator 92 which provides the excitation voltage to the exciter 22 via a cable 94. The regulator senses the output voltage of generator 20 at cable 86 via a cable 96 and automatically adjusts the magnitude of the excitation to exciter 22 to maintain the output voltage at a selected ampliude. A voltage level adjustment control 98 is connected to the regulator 92 via a cable 100 and provides means for selectively setting the amplitude of the voltage at which the generator 20 is to be regulated. Since the present system employs more than one generator each having its own regulator, such as regulator 92, slight differences in the amplitude of the output voltages would result in circulating currents between generators. To minimize these currents, cross current compensation is provided via a sensed signal from a cross current transformer 102 which is coupled to the output cable 86 and connected to the voltage regulator 92 via a cable 104.

The speed of the engine 24 and hence the frequency of the output voltage from the generator 20 will be determined by the throttle setting of the engine 24. In order to maintain the same engine speed with variations in load the throttle setting must be varied. The opening of the throttle of engine 24 is set by a hydraulic actuator 106 which is connected to and controlled by an electronic hydraulic governor 108. Control signals from the governor 108 via cable 112. The magnitude of the signal at cable 112 is related to the throttle opening and hence to the power being delivered by the engine and hence to th load being carried by the generator 20.

In automatic operation, when the generator 20 of generator unit No. 1 is first actuated, prior to being placed in parallel with either of the other two generators which may then be on the line, it must first be brought into synchronism with the voltage then on the bus 84. While the governor 108 will bring the output of voltage of the generator 20 up to the desired frequency, it alone would be insensitive to any phase differential. An automatic synchronizer 110 senses the phase of the voltage on the bus 84 via a cable 112 and also senses the phase of the voltage on the output cable 86 via cable 114. If no difference in phase is detected, the synchronizer 110 sends a signal via cables 116 and 117 through the switch 74 to close coil 118 for the main breaker 88 whereby the breaker 88 is closed and the output cable 86 from generator 20 is connected to the bus 84. If the synchronizer 110 detects a difference in phase between the voltage at cable 86 and that on the bust 84, no signal is transmitted through cable 116 but rather a scan signal is transmitted via a cable 122 to an automatic frequency modulator control unit 24. The modulator control 124 in connected to the governor via a cable 127 and upon receiving a scan signal from synchronizer 110 causes the governor 108 to change frequency above and below the desired frequency in order that the voltage at the cable 86 will be brought into phase with the voltage at the bus 84. As soon as phase coincidence is obtained, synchronzer 110 sends its signal on cable 116 to close the main circuit breaker 88 and sends an anti-scan signal on cable 122 to the modulator control 124 whereby it is brought to a "home" position and the governor 108 will have set the speed of the engine 24 to provide the desired output frequency from generator 20. To remove the generator 20 from the bus 84 a signal from the start/stop control 34 along a trip cable 132 will energize a trip coil 136 whereby the main breaker 88 will be opened; this signal, as will be seen, can be caused by a malfunction condition through the closure of one of the switches 46, 56, 60, 68, 70 or 72 or by means of a stop signal from the distribution panel.

For manual operation the selector switch 74 is placed in its manual condition thereby actuating a manual governor raise/lower switch 126 via cables 128 and 130. In the manual condition, when the manual circuit breaker switch 120 is actuated manually, the close coil 118 is energized via cable 138, the switch 74 and cable 140, whereby the main breaker 88 is closed.

In the manual operating condition synchronization is obtained manually. Thus, the automatic synchronizer 110 is deactuated and hence no scan signal will be received by the frequency modulator control 124. However, the manual governor raise/lower switch 126 will permit manual actuation of modulator control 124 whereby the speed of engine 24 can be varied. In order to determine when synchronization occurs, a synchroscope 142 is provided in the distribution panel for visual observation of the difference in phase between the voltage on the bus 84 and the voltage at cable 86 of generator 20. Thus, synchroscope 142 receives a signal from the bus 84 via a cable 144 and receives a signal from the cable 86 via a manual synchronizing cable 146 and a cable 148 through a manual synchronizing switch 150. The switch 150 when actuated manually connects cables 148 and 146 and hence provides a signal to synchroscope 142 of the voltage at cable 86. By watching synchroscope 142, the manual raise/lower switch 126 can be manipulated until the potential at cable 86 is in phase with the potential at bus 84 at which time the manual breaker switch 120 can be closed to energize close coil 118 whereby the main breaker 88 is closed. A bank of lamps 156 will be dark when synchronism is obtained. Noted that the cable 146 is common to all of the generator units Nos. 1, 2 and 3 and hence synchroscope 142 can be used for manual paralleling of any of the generators merely by actuating the appropriate switch, such as switch 150. To aid in synchronization a pair of frequency meters 152 and 154 are connected to cables 144 and 146, respectively, to provide visual indications of the frequency of the voltage at the bus 84 and of the voltage of the oncoming generator.

The condition of the main breaker 88 is indicated by lamps 158, 160 and 162. Lamp 158 is connected to the bus 84 via normally closed auxiliary contacts 164, cable 166 and manual disconnect 90 and hence will be lit when breaker 88 is opened. When breaker 88 is closed via current through close coil 118, the contacts 164 are opened and lamp 158 is deenergized. Lamps 160 and 162 are connected to the bus 84 via cable 166 and normally opened close auxiliary contacts 168. Hence lamps 160 and 162 are not lit when main breaker 88 is open. Upon energization of close coil 118 through close contact 119, the main breaker 88 is closed thereby closing auxiliary contacts 168 whereby lamps 160 and 162 will be lit indicating that main breaker 88 is closed. The lamp 160 is located at the generator unit No. 1, while the lamp 162 is located at the distribution panel. Lamps 170 and 172 serve similar functions to lamp 162 for generator units Nos. 2 and 3, respectively.

While the generator 20 can be brought onto the bus 84, still more must be done in order for it to assume a selected portion of the load. This is done by the governor 108 which is connected to each of the other governors for generator units Nos. 2 and 3 via a governor tie line 174. By means of the governor tie line 174 information is exchanged whereby the generators previously on the line relinquish load and the oncoming generator 20 assumes load. By setting each of the governors 108 a selected division will automatically occur. Note that the governor 108 of the oncoming generator 20 is not connected to the other governors until the generator 20 is on the line, at which time normally opened auxiliary contact 176 is closed to close a circuit at the governor 108 via cable 175 and the interconnection between governors is complete; the contacts 176 prevent any attempt at load division prior to generator 20 being on the bus 84.

A plurality of meters is located on a circuit with a current transformer 178 which is coupled to the cable 86; the meters are connected to transformer 178 via cable 180. At the same time some of the meters are connected to sense the potential at cable 86 via cable 182. Thus a kilowatt meter 184 is connected to both cables 180, 182 to provide an indication of the kilowatt output; a power factor meter 186 is connected to both cables 180, 182 to provide an indication of the power factor. An elapsed time meter 188 is connected to cable 182 alone and provides a reading of the total time that generator 20 has been used in service. An ammeter 190 is connected to cable 180 via a selector switch 189 whereby the current in each phase of the three phase output can be read. A voltmeter 192 is connected to the cable 182 via a switch 194 whereby the potential between phases of the output can be read. In addition to the meters noted, the reverse power relay 44 is connected both to cables 180 and 182.

A kw. control 196 is connected to both conductors 180 and 182 and hence receives information as to the load then being handled by generator 20. The kw. control 196 has two outputs via cables 198 and 200. Assuming now that generator 20 is providing a preselected thigh portion of its capacity, e.g. 80% of its k.w. capacity, the control 196 will initiate a signal via cable 198 to a DC amplifier high limit 202. A relay on amplifier 202 will cause a signal to be sent to a time delay 204 via a cable 206. After a preselected length of time has passed i.e., long enough to ignore momentary load fluctuations, time delay 204 will signal demand relay 208 via a cable 210. The demand relay 208 will send out a signal via cable 212 demanding that another generator unit be placed on the line to pick up some of the load. Assuming now that the generator 20 is providing a pre-selected low portion of its capacity, the control 196 will initiate a signal via cable 200 to a DC amplifier low limit 214. The amplifier 214 will send out a signal via cable 216 indicating that one of the generators on the bus 84 should be dropped. Note that the kw. control 196 is operative both when the manual/automatic selector switch 74 is in the automatic or manual conditions.

Looking now to the distribution panel the bus 84 is connected to the load via a main breaker 218. A plurality of meters is provided which is energized from a cable 200 connected to a current transformer 222 which is coupled to the bus 84 to sense current and a cable 224 which is connected to the bus 84 to sense voltage. An ammeter 226 is connected to cable 220 via a selector switch 228 whereby the current of each phase of the output can be read. A kilowatt meter 230 and kilowatt hour meter 232 are connected to both cables 224 and 220 whereby the kilowatt output and kilowatt hour output, respectively, can be read. A VAR meter 234 is connected to both cables 220 and 224 whereby the reactive load can be read. A synchronous clock 236 is energized via cable 224 and provides a time indication of the frequency stability of the system; a comparative clock 238 is connected to Western Union or some other standard time base to provide a comparison for clock 236.

A kw. control 240 is connected across cables 224 and 220 and provides an output to a DC amplifier high limit 242 via a cable 244. When the kw. control 240 senses a load at a preselected high limit for the system, the amplifier 242 provides an output signal via a cable 246 whereby nonessential loads can be disconnected from the system. Thus essential loads will still receive power and nonessential loads, i.e., air conditioning, etc., will be dropped until the system can again accommodate them. A lamp 248 will be lit upon occurrence of an overload requiring the dropping of nonessential loads. Lamps 250 and 252 are connected via auxiliary contacts 254 and 256, respectively, to bus 84 via a cable 258 and cable 224. Contacts 254 are normally closed and are opened when main breaker 218 is closed and hence lamp 250 is lit to indicate that main breaker 218 is opened; contacts 256 are normally opened and are closed when breaker 218 is closed and hence lamp 252 is lit to indicate that main breaker 218 is closed.

A battery charger 260 is provided to charge all of the batteries such as battery 28 via a cable 262. In order to prevent damage to the charger 260 due to high loads during engine starting, the battery charger 260 is disabled during engine starting. Thus a cable 264 connects start motor 26 to charger 260 whereby charger 260 is disabled during starting of engine 24. Similar disabling signals are provided from generator units 2 and 3 via cables 266 and 268, respectively.

The generator units Nos. 1–3 can be controlled by an automatic/manual engine selector control system 270. Assume now that all of the manual/automatic selector switches such as switch 74 are in the automatic condition; also assume that generator unit No. 2 is alone connected to the bus 84. When the power requirements increase to a point near the capacity of generator unit No. 2, its demand relay (similar to relay 208) will send a signal to the selector control 270 via a cable 272. The selector control 270 would then transmit a start signal to start/stop control 34 via cable 42, via selector switch 74 and via cable 76. The engine 24 would be automatically started, the output of generator 20 brought into synchronism with the bus 84, and the generator 20 connected to the bus 84. Assuming now that the load demand drops, a signal from the DC amplifier such as amplifier 214 would be transmitted to the selector control 270 via cables 216 and 274 for the generator units No. 1 and 2, respectively, whereby a stop signal would be transmitted from selector control 270 to the start/stop control 34 via cable 42, of generator unit No. 1 via selector switch 74 and via cable 76 stop the engine 24. The start/stop control 34, however, is provided with a time delay such that engine 24 and hence generator 20 will be maintained actuated for a preselected period after initiation of the stop signal from the selector control 270; this prevents generator 20 from being removed as the result of load fluctuations of short duration. During this time period generator 20 is in a standby condition; this condition is indicated by a lamp 276 which is lit by a potential via cable 50 as the result of a signal from start/stop control 34 indicating standby status. The actuation and deactuation of generator unit No. 3 would be in a similar manner. Note that as long as switch 74 for generator unit No. 1 was in the automatic position, the identical sequence of events as given above would have occurred even if the selector switch, corresponding to switch 74, for generator unit No. 2 were in the manual condition. However, if all units were in the manual control condition, this selector control 270 would not have been operable.

A 48-hour engine sequence timer 278 is energized from a cable 280 which is connected to bus 84 via cable 224. The engine sequence timer 278 with an engine selector switch 282 can provide three outputs to the engine selector control 270. The switch 282 has a first position in which the generator unit No. 1 is preferred and generator unit No. 2 is alternate and a second position in which the opposite relationship is provided. In either of the first two positions, the preferred generator unit will be constantly in service and the other will be brought in and out, depending upon load demand. The switch 282 has a third position in which the time of preferred operation of each of the generator units Nos. 1 and 2 is automatically made equal over a 48-hour period by means of the timer 278.

A 24-hour system program timer 284 is energized from a cable 286 which is connected to bus 84 via cable 224. The timer 284 is connected to the engine selector control 270 via an off/on switch 288. The 24-hour system 284 can be programmed to anticipate demand during a 24-hour period; this program is derived from historical load demand data. The timer 284, in anticipation of load demands, will start one or more of the automatic generator units just prior to the time of predicted load demand.

The occurrence of events resulting in closing of any of the malfunction switches 46, 56, 60, 70 or 72 will result in an alarm signal being transmitted to the selector control 270 from the start/stop control 34 via a cable 290; the alarm signal results in actuation of an audible alarm 292 and an alarm lamp 294 at the distribution panel via a cable 296. The audible alarm can be deactuated via a switch 298 which is connected to cable 296. In response to an alarm signal, the engine selector control 270 will initiate actuation of another engine generator unit.

In the following description various relays will be referred to, each of which has a coil and a plurality of contacts. In the drawings, the contacts for each relay are numbered consecutively beginning with numeral 1. In referring to particular coils for a relay the number of the relay will be given first, followed by the postscript *a*. Thus, 300*a* refers to the coil for relay 300. Also in the reference to various conductors where it has been convenient and for the sake of simplicity and ease of tracing circuits, the same numeral designation has been used for conductors at the same potential or originating from a common point.

AUTOMATIC START/STOP CONTROL 34

The following description will be generally as to the construction of the automatic start/stop control 34, which is shown in FIGURES 2 and 3, and is operation in conjunction with the manual/automatic selector switch 74. As previously noted, the selector switch 74 has an automatic, an off, and a manual position.

Looking now to FIGURES 2 and 3, the automatic start/stop control 34 includes a manual start relay 300, an automatic start relay 302, a start/stop relay 304, an operate relay 306, an alarm relay 308, a low oil pressure relay 310, a high water temperature relay 312, a reverse power alarm relay 314, an excessive vibration relay 316, an overspeed relay 318, an overcrank relay 320, a voltage relay 322, a safety time delay relay 324 and a manual time delay relay 326, a crashing timer 328, manual start push button 394, and an alarm push button 327.

MANUAL START RELAY 300

This relay will be energized only when the manual/automatic selector switch 74 is in its manual position and conditions the control 34 and associated circuitry for manual operation. When energized, the manual start relay 300 energizes the operate relay 306, the low oil pressure relay 310, and the safety time delay relay 324. Upon energization, the manual start relay 300, in addition to the above and other functions which will be noted in a more detailed description which follows, supplies potential to a start solenoid 325 of the start motor circuit 26 whereby the engine 24 can be started manually by depression of a push button switch 394 in a manner to be seen; note that actuation of start solenoid 325 energizes starter solenoid 327 whereby the starter motor 333 is energized.

AUTOMATIC START RELAY 302

The automatic start relay 302 will be energized only when the manual/automatic selector switch 74 is in its automatic position and conditions the control 34 and associated circuitry for automatic operation. Assuming now that a signal to start has been received from the automatic/manual engine selector control system 270, then the automatic start relay 302 will be energized to operate a cranking timer 328. The function of the cranking timer 328 will be discussed later; however, for the present moment it should be noted that the cranking timer 328 upon energization of the automatic start relay 302 causes cranking of the engine 24 on a 10 seconds on, 10 seconds off basis for four cycles; if the engine 24 has not started at the end of the four cycles, then the cranking timer 328 causes a signal to be sent to the overcrank relay 320 whereby the generator unit No. 1 is deactuated and a signal is sent to the automatic/manual engine selector control system 270 to indicate that this unit has undergone a malfunction and that another generator unit should be called into service. Again, the details permitting this operation will be more readily seen from the description to be given.

The automatic start relay 302, upon energization, removes potential from the shunt trip coil 136 to permit automatic closing of the main breaker 88 when the generator 20 is ready to be connected to the bus 84. Upon deenergization of the automatic start relay 302, potential would again be reinstated upon the shunt trip coil 136 whereby the main breaker 88 would be opened thereby removing the generator 20 from the bus 84. Note, however, that the automatic start relay 302 is of the time delay type whereby, upon deenergization of its coil, the contacts are maintained in their energized position for a selected time; this time delay is provided to anticipate possible momentary unloading of the system and hence to accommodate load fluctuations of short duration whereby the generator 20 is not instantaneously then removed from the bus 84. If the duration of the unloading is less than that of the time delay provided by the automatic start relay 302, then upon reestablishment of a sufficient load demand, the generator 20 already on the bus 84 on standby would merely require energization of the automatic start relay 302 to reinstate it on the bus 84 in a nonstandby condition.

The automatic start relay 302, upon energization, energizes the operate relay 306, the low oil pressure relay 310 and the safety time delay relay 324. In addition, the automatic start relay 302 when energized is effective to supply voltage to start solenoid 325 in the start motor circuit 26.

START/STOP RELAY 304

The start/stop relay 304 will be energized only when the manual/automatic selector switch 74 is in its automatic position. Upon energization of the start/stop relay 304, the automatic indicating lamp 78 will be lit and a signal will be sent to the automatic/manual engine selector control system 270, which will serve a purpose to be described.

Upon deenergization of the start/stop relay 304, it is operative with the automatic start relay 302 whereby the standby indicating lamp 276 is energized while the automatic start relay 302 is in its time delay condition. After the expiration of this time delay condition and the contacts of the automatic start relay 302 have been opened, this particular circuit is opened and the standby indicating lamp 276 is extinguished.

OPERATE RELAY 306

The operate relay 306 will be energized when the manual/automatic selector switch 74 is in either the manual or automatic position and will be energized upon energization of either the manual start relay 300 or the automatic start relay 302. Upon energization, the operate relay 306 supplies ignition and instrumentation voltage to the engine 24.

The operate relay 306, upon deenergization, provides voltage to the shunt trip coil 136 whereby the main breaker 88 is opened to disconnect the cable 86 from the bus 84. As will be seen, the operate relay 306 will be deenergized by actuation of the alarm relay 308.

ALARM RELAY 308

The alarm relay 308 can be energized with the selector switch 74 in either the manual or automatic position. When energized, the alarm relay 308 will deenergize the operate relay 306 whereby the main circuit breaker 88 is opened and also whereby ignition voltage is removed from the engine 24. The alarm relay 308 will also send a signal to the automatic/manual engine selector control system 270 to indicate that a failure or malfunction has occurred. Energization of alarm relay 308 will occur through energization of low oil pressure relay 310, high water temperature relay 312, reverse power relay 314, excessive vibration relay 316 and overspeed relay 318 only after energization of voltage relay 322 and safety time delay relay 324. As will be seen, this prevents actuation of alarm relay 308 due to a low oil pressure condition in starting or stopping of engine 24 which would energize the low oil pressure relay 310 and yet not represent a malfunction. The alarm relay 308 will be energized upon actuation of the overcrank relay 320 alone.

When the system is in the automatic condition, a centrifugal switch 330, the details of which will be described later, permits the start solenoid 325 to be energized up to a certain engine speed, i.e., 400–600 r.p.m., after which the centrifugal switch 330 by opening a set of contacts deenergizes the start solenoid 325, starter solenoid 327 and start motor 333, thereby removing the starter motor 333 from engagement with the flywheel of the engine 24. It can be appreciated that upon deenergization of the engine 24 from its normal operating condition, it will decelerate to the speed at which the centrifugal switch 330 will once more become closed. In order to prevent energization of the starter motor 333 and its engagement with the flywheel of the engine 24 as it is decelerating to stop, the alarm relay 308, upon energization, will remove voltage from the centrifugal switch 330 thereby precluding actuation of the starter motor 333.

The alarm relay 308 in addition functions with the low oil pressure relay 310, in a manner to be seen, whereby the low oil pressure lamp 58 will be lit only when the engine 24 is being shut down as the result of a low oil pressure malfunction. In other words, it cooperates to prevent lighting of the low oil pressure lamp 58 as the result of the existence of low oil pressure at low engine speeds merely in the starting and stopping of the engine 24. The alarm relay 308 in addition, when energized, renders the manual push button start switch 332 inoperative. Upon energization, the alarm relay 308 energizes a remote alarm, which could be located at the distribution panel, under all emergency or malfunction shut-down conditions or failure-to-start conditions. Note that a normally closed switch 327 provides a hold path for the relay 308 until the malfunction is observed by operator and switch 327 manually opened to reset the alarm relay 308.

As will be seen, the alarm relay 308 can be energized by energization of one of the following: the low oil pressure relay 318, the high water pressure relay 312, the reverse power alarm relay 314, the excessive vibration relay 316, the overspeed relay 318, or the overcrank relay 320. Note that with all but the last relay, the alarm relay 308 will be energized only when, in addition, the voltage relay 322 is energized. The purpose of this will be more readily seen from a more detailed description to follow.

LOW OIL PRESSURE RELAY 310

The low oil pressure relay 310 will be energized with the selector switch 74 in either the manual or automatic positions and is capable of being energized after energization of either the manual start relay 300 or the automatic start relay 302.

The low oil pressure relay 310 will be energized in response to a low oil pressure malfunction condition to energize the alarm relay 308 whereby the generator 20 is removed from the bus 84. The low oil pressure relay 310 is interconnected through the high water tembperature relay 312, the reverse power alarm relay 314, the excessive vibration relay 316, and the overspeed relay 318 such that it can be energized only when all of these relays are deenergized. This is to prevent a false signal from occurring indicating a low oil pressure condition when actually the malfunction is the result of some other condition resulting in the closure of one of the other relays noted.

HIGH WATER TEMPERATURE RELAY 312

The high water temperature relay 312 is operative with the manual/automatic selector switch 74 in either the manual or automatic condition. Its function is to respond to a high water temperature malfunction condition and to cause automatic deenergization of the generator unit No. 1 in response to the occurrence of such a condition. The high water temperature relay is energizable after energization of either the manual start relay 300 or the automatic start relay 302.

The high water temperature relay 312 and the low oil pressure relay 310 are interconnected whereby only one or the other can be energized at a time. Again, this is to prevent false indication of the actual cause of malfunction. In addition, the high temperature relay 312 can be energized only when the reverse power alarm relay 314, the excessive vibration relay 316 or the overspeed relay 318 are deenergized.

Energization of the high water temperature relay 312 causes energization of the alarm relay 308 and of course the disconnection of generator 20 from the bus 84.

REVERSE POWER ALARM RELAY 314

The reverse power alarm relay 314 is operative with the switch 74 in either a manual or automatic condition and can be energized only after energization of either the manual start relay 300 or the automatic start relay 302. The reverse power alarm relay 314 is actuable in response to the occurrence of a reverse power condition and upon energization will cause energization of the alarm relay 308 resulting in disconnection of the generator 20 from the bus 84.

Again, in order to prevent a possible false indication as to the source of malfunction, the reverse power alarm relay 314 can be energized only when the excessive vibration relay 316 and the overspeed relay 318 are deenergized. Note that energization of the reverse power alarm relay 314 prevents energization of both the low oil pressure relay 310 and the high water temperature relay 312.

EXCESSIVE VIBRATION RELAY 316

The excessive vibration relay 316 will cause shut-down of the engine 24 and removal of the generator 20 from the bus 84 upon an excessive vibration condition. The excessive vibration relay 316 is operative with the selector switch 74 in either the automatic or manual position and can be energized only after energization of the manual start relay 300 or the automatic start relay 302. Note also that the excessive vibration relay 316 can be energized only if overspeed relay 318 is deenergized. Upon energization of the excessive vibration relay 316, the relays 310, 312 and 314 cannot be energized. Upon energization of the excessive vibration relay 316, the alarm relay 318 is energized whereupon the generator 20 is removed from the bus 84 and the engine 24 is deenergized.

OVERSPEED RELAY 318

The function of the overspeed relay 318 is to cause shutdown of the engine 24 and disconnection of the generator 20 from the bus 84 upon an excessive speed condition; the overspeed condition is sensed by separate contacts which are a part of the centrifugal switch 330. The overspeed relay 318 is operative with the selector switch 74 in either the manual or automatic position and can be energized only after energization of the manual start relay 300 or the automatic start relay 302. Energization of the overspeed relay 318 prevents energization of the relays 310, 312, 314 and 316 and will cause energization of the alarm relay 308 whereby the generator 20 is removed from the bus 84 and the engine 24 will be deenergized.

Note that the relays 310–318 are interconnected in a specific order where one can control others. This particular arrangement permits a simplified construction and also prevents the occurrence of a false indication as to the malfunction causing its shutdown. Note that these relays 310–318 are connected in a selected order whereby false malfunction indications are precluded.

OVERCRANK RELAY 320

The function of the overcrank relay 320 is to sense a condition at which the engine 24 fails to start after it has been cranked for a selected period. The overcrank relay 320 is operative only when the selector switch 74 is in the automatic position and can be energized only after energization of the automatic start relay 302. The overcrank relay 320 functions with the cranking timer 328 such that upon receipt of a signal indicating that the engine 24 has failed to start after a preselected number of pretimed start cycles, then energization of the over crank relay 320 will occur whereby the alarm relay 308 will be energized causing deactuation of the engine 24.

VOLTAGE RELAY 322

The voltage relay operates independently of selector switch 74 and is energized by the occurrence of potential from the generator and upon energization it provides a circuit for the safety time delay relay 324 to the alarm relay 308 whereby the alarm relay 308 can be energized by relays 310–318 only after actuations of the voltage relay 322 and hence actuation of the safety time delay 324. The voltage relay 322, upon deenergization, also provides a signal to the automatic/manual engine selector control system 270 through the start-stop relay 304 when it is deenergized to provide to the selector control system 270 a signal which serves a purpose to be described. Note that both the start-stop relay 304 and the voltage relay 322 must be deenergized before a signal other than an alarm signal can be sent to the engine selector control system 270 indicating that the generating unit No. 1 is deactuated. The details of this will be described later.

SAFETY TIME DELAY RELAY 324

The function of the safety time delay relay 324 is to prevent the occurrence of a signal from the alarm relay 308 as a result of energization of any of the relays 310–318 prior to a preselected period. Thus, this prevents, for example, a signal from the low oil pressure relay 310 as a result of a low oil pressure condition existing upon a starting condition; thus allowing oil to be transferred from the reservoir to the oil galleries for lubrication purposes. The safety time delay 324 can be energized either in the manual or automatic position of the selector switch 74 and is energizable upon energization of either the manual start relay 300 or the automatic start relay 302. The time delay selected for the safety time relay 324 is greater than the time required for an overcrank signal to be sent from the overcrank relay 320. If an overcrank condition exists, a signal will be sent out and the system deactuated prior to expiration of the time of the safety time delay relay 324 thereby insuring that none of the other malfunction indication relays 310–318 will be effective prior to this expiration of time.

MANUAL TIME DELAY RELAY 326

The manual time delay relay 326 is energized by the selector switch 74 in the manual position only and functions to permit transfer of the manual automatic switch 74 from the manual position to the automatic position without temporary or momentary deactuation of the system. In switching the selector switch 74 from manual to automatic, there would be a short time in which selector switch 74 would be in an off position; to prevent the circuit breaker 88 from being opened temporarily during this interim period and also to prevent loss of synchronism, voltage sharing, etc., manual time delay relay 326 is provided such that energization is maintained for a preselected time period after the selector switch 74 has been moved from the manual position. Note that switching back from the automatic position to the manual position of the selector switch 74 does not pose a problem because of the automatic time delay built into the automatic start relay 302.

THE DETAILS OF THE AUTOMATIC START/STOP CONTROL 34 IN AUTOMATIC AND MANUAL OPERATION

The following description details the operation of the automatic start/stop control 34 as well as other associated circuitry in FIGURES 2 and 3 for automatic and manual operation.

AUTOMATIC OPERATION

The selector switch 74 has five segments 74A–74E ganged together for simultaneous actuation; segments 74A–74C are shown in FIGURE 3 and segments 74D–74E are shown in FIGURE 7. For automatic operation the switch segment 74A will have its contacts 3 and 4 engaged whereby a conductor 329 will then be connected to the contact 4. Conductor 329 conducts potential or a start signal from the automatic/manual engine selector control system 270; the manner in which it receives this signal will be described later. The potential appearing at conductor 329 is transmitted to conductor 331 via the closed contacts 3 and 4 and is impressed upon coil 302a to actuate the automatic start relay 302. In addition, potential is also impressed upon coil 304a to actuate the external start/stop relay 304. A conductor 332 connects contact 4 of automatic start relay 302 to battery 28 via a fuse F1. With automatic start relay 302 actuated, its contacts 4 and 6 are engaged transmitting battery potential onto a conductor 334 through engaged contacts 1 and 2 of deenergized manual start relay 300 onto a conductor 336 to the cranking timer 328. This energizes a clutch solenoid 338 and motor 340 of the cranking timer 328 whereby cranking of the engine 24 is initiated. Upon energization of the manual start relay 300 or with the system in manual the contacts 1 and 2 of manual start relay 300 are opened and the cranking timer 328 cannot be energized. The detailed operation of the cranking timer 328 will be described later.

With the start/stop relay 304 actuated, its contacts 4 and 6 will be closed, thereby closing a circuit from conductor 334 to automatic indicating lamp 78 via a conductor 342; since at this time conductor 334 is connected to battery potential, the lamp 78 will be lit. The potential at conductor 334 also appears at the high potential side of the coil 306a of operate relay 306. The ground side, however, of the coil 306a is connected to ground via a conductor 344 and closed contacts 1 and 2 of deenergized alarm relay 308. Thus, the operate relay 306 can be energized when alarm relay 308 is deenergized. Upon energization of the coil 306a of the operate relay 306, its contacts 1 and 3 will be engaged. Battery potential will be impressed upon the ignition system of the engine 24 from conductor 334, through closed contacts 1 and 3 of the energized operate relay 306 and through conductor 348 whereby the engine 24 can be started upon cranking. The specific details of the ignition system do not constitute a part of the present invention and have been omitted for purposes of simplicity except for the fact that it is a complete electronic ignition system having no wearing parts.

Upon energization of the automatic start relay 302, as previously noted, battery potential exists at conductor 334; this potential also appears at engaged contacts 4 and 5 of the deenergized alarm relay 308 via conductor 344 and is transmitted via conductor 350 to the centrifugal speed switch 330. The speed switch 330 has separate sets of contacts in three sections, 330A, B and C, which serve different purposes to be seen. The potential at conductor 350 is transmitted through the normally closed contacts of switch section 330A and via conductor 352 to the high side of start solenoid 325 which has its ground side connected to a grounding switch 353 via conductor 354; the grounding switch 353 is located in the cranking timer 328 and will be grounded for preselected periods after energization of the cranking timer 328 thereby permitting energization of the start solenoid 325 for these selected periods of time. Upon closing of the grounding switch 353, the start solenoid 325 will be energized, closing its contacts, thereby permitting energization of starter motor solenoid 327 by battery 28 via conductor 356, the closed contacts of start solenoid 325 and conductor 358. Upon energization of the starter motor solenoid 327, start motor 333 will be energized and cranking of engine 24 will begin. Note that the cranking timer 328 provides that the ground switch 353 be closed by a cam 2 on 10 seconds and 10 seconds off cycle; after four such cycles, if the engine 24 has not started the cranking will cease. The centrifugal switch section 330A functions such that its contacts will remain closed until the engine 24 reaches a preselected speed, i.e., between 400 and 600 r.p.m., at which time, its contacts will be opened thereby deenergizing the start solenoid 325 and the starter motor solenoid 327. On energization of the start solenoid 325, a signal is sent to the battery charger 260 via a conductor 359 which will deenergize the battery charger 260 during the period in which the engine 24 is cranking (see FIGURE 6). As previously noted, this prevents excessive charge current to be drawn from the battery charger 260 during the starting periods.

The contacts of centrifugal speed switch section 330B are normally closed and will be opened upon the attainment of a preselected speed less than the synchronous speed of the generator 20. The function of switch section 330B, as will be seen in detail later, is to permit a bias potential to be transmitted whereby the hydraulic actuator 106 is placed in a condition to hold the throttle of the engine 24 in a wide open position. This enables the engine 24 to approach synchronous speed at an accelerated rate. Upon attainment of a preselected speed below synchronous speed, the contacts of the switch section 330B will be opened, thereby removing the bias potential and permitting the governor 108 to function in its normal manner. This bias signal is transmitted via a conductor 360 which receives battery potential by means of the closed contacts of switch section 330B and a conductor 350 which, as previously noted, received potential through the engaged contacts 4 and 5 of the deenergized alarm relay 308.

The coil 308a of alarm relay 308 to be energized requires the impression of potential to its high side and the application of a ground to its low side. The high side of coil 308a is connected to the low oil pressure relay 310, the high water temperature relay 312, the reverse power relay 314, the excessive vibration relay 316, and the overspeed relay 318 and will be connected to battery potential upon energization of any one of those relays. The low side of the coil 308a is connected to a conductor 351 which can be grounded through two separate paths; the first is through contacts 1 and 3 of the overcrank relay 320; these contacts are normally opened and will be closed upon energization of the overcrank relay 320.

The second path is through the contacts of the safety time delay relay 324, conductor 351 and the engaged contacts 1 and 3 of the voltage relay 322. The coil 322a of the voltage relay 322 will be energized by a potential from the output of the generator 20 via conductors 356 and 358. The thermally actuated contacts of the safety time delay relay 324 are normally opened and will remain open until the heater 360 in the time delay relay 324 has been energized for a predetermined time which, for a purpose to be understood, has been selected to be 90 seconds.

The battery potential for the heater 360 of the safety time delay relay 324 is attained via the conductor 334 which is connected to battery upon actuation of the automatic start relay 302. Thus after receiving a start signal from the automatic engine switch selector control system 270, the contacts of time delay relay 324 will remain opened for a selected time period. This time delay is sufficient to permit the cranking timer 328 to have made four complete cycles at 10 seconds on and 10 seconds off after which time, if the engine 24 had not started, the overcrank relay 320 would be energized before the safety time delay relay 326 would be energized. The purpose of this is to prevent the occurrence of a false malfunction indication, as will be readily seen.

Considering now the low oil pressure relay 310, the high side of its coil 310a will receive battery potential via conductor 362 through the closed low oil pressure switch 60 and via the conductor 334. The low oil pressure switch 60 will be closed until the engine 24 has reached a speed at which the oil pressure has reached a level sufficient to open switch 60. Initially upon cranking, however, the pressure switch 60 will be closed, thereby impressing a voltage onto the high side of the coil 310a. The ground side of the coil 310a, however, has a chain path through contacts 1, 2 of high water temperature relay 312, contacts 1 and 2 of the reverse power relay 314, contacts 1 and 2 of the excessive vibration relay 316, contacts 1 and 2 of the overspeed relay 318, and thence to ground. Note that these contacts of the relays just noted will be normally closed when their respective relays are deenergized. Thus, upon initial cranking of the engine 24, the low oil pressure relay coil 310a will be energized. Energization of the relay 310 closes its contacts 1 and 3 thereby impressing upon contact 3 the battery potential via conductor 364 and the energized conductor 334 through the normally closed contacts 4 and 5 of the deenergized overspeed relay 318. This potential is impressed on the high side of the alarm relay coil 310a via a conductor 366. However, it will be recalled that in order for the alarm relay 308 to be actuated, it is necessary for both a potential and ground to be applied to its coil 310a. During initial cranking, however, no ground path is provided since the time delay of relay 324 has not expired and its normally opened contacts are still open and hence the alarm relay 308 will not be actuated. Assuming now that an overcrank condition does not exist and that the engine 24 has been brought up to speed and the generator 20 is functioning properly, then, after the expiration of the delay time of delay relay 324, its contacts will be closed and voltage relay 322 will be energized whereby its contacts 1 and 3 are engaged, thereby completing a ground path to the low side of the alarm coil 308a. If at this time a low oil pressure condition exists, then the low oil pressure switch 60 will have remained closed and hence the coil 310a will have remained energized whereby a potential will be impressed to the high side of alarm relay coil 308a and it will be energized. The same situation would occur, of course, if the low pressure condition occurred some time after the engine 24 had been operating.

Note that with the low oil pressure switch 60 closed and upon energization of the oil pressure relay coil 310a, the low oil pressure lamp 58 will be lit by battery potential applied from conductor 334 and closed switch 60 with a ground applied via a conductor 368, closed contacts 4 and 6 of the energized low oil pressure relay 310, a conductor 370, via closed contacts 4 and 5 of the deenergized overcrank relay 320, a conductor 372 and thence to ground via closed contacts 7 and 9 of the energized alarm relay 308. Thus ground will be applied whereby the low oil pressure lamp 58 can be lit only upon energization of the alarm relay 308 and hence the low oil pressure lamp 58 will be lit only upon the occurrence of a low oil pressure condition as a malfunctoin and not upon the natural occurrence of low oil pressure when the engine 24 is at reduced speeds as in starting or stopping. Note that upon the occurrence of a low oil pressure malfunction condition, the above circuit will be held even though the engine 24 is deactuated and generator 20 is removed from the bus 84 to provide an indication at lamp 58 of a low oil pressure malfunction.

The low oil pessure relay 310 has contacts 1 and 2 which are engaged in its deenergized condition and connect the potential at conductor 364 (as energized by conductor 334 through closed contacts 4 and 5 of deenergized overspeed relay 318) to the high side of the high water temperature relay coil 312a via conductor 374. The ground side of the coil 312a is connected to ground via a normally opened high water temperature switch 56 via a conductor 376. Note then that there is an interlock between the low oil pressure relay 310 and the high water temperature relay 312 whereby the water temperature relay 312 cannot be actuated when the low oil pressure relay 310 has been actuated. Note also that because of the path from the high side of the low oil pressure relay coil 310a, the low oil pressure relay 310 cannot be actuated when the high water temperature relay 312 is actuated.

Upon closing the high water temperature switch 56 under a high water temperature condition, the ground will be impressed upon the coil of the high water temperature relay coil 312a, thereby causing its energization. The high water temperature lamp 54 is connected in parallel with the coil 312a and hence will also be energized along with the coil 312a. A lock-in ground is provided to the coil 312a via a conductor 376, closed contacts 1 and 3 of the energized relay 312, and the closed contacts 1 and 2 of the reverse power relay 314, excessive vibration relay 316, and the overspeed relay 318 to ground. The hold path to ground maintains the high water temperature relay coil 312a energized even after the engine 24 has stopped and the water temperature has dropped. This assures that the high water temperature lamp 54 will remain lit to indicate the cause of failure.

Upon actuation of high water temperature relay 312 its contacts 4 and 6 will be closed, thereby transmitting battery voltage from conductor 334 through an interlock path to the alarm relay coil 308a; this path is from conductor 334, through closed contacts 4 and 5 of the deactuated overspeed relay 318, conductor 364, closed contacts 4 and 5 of the deactuated vibration relay 316, conductor 365, closed contacts 4 and 5 of the deactuated reverse power relay 314, conductor 367, closed contacts 4 and 6 of actuated water temperature relay 312 and conductor 366. Assuming that ground is established at the opposite side of the coil 308a, the alarm relay 308 will be energized. The purpose of the interlock path to battery potential is to prevent the occurrence of a false malfunction signal at one of the malfunction relays after one has been energized.

Reverse power relay 314 functions in a manner similar to that of the high water temperature relay 312; upon actuation of the reverse power relay switch 44 (not shown in FIGURE 2, see FIGURE 8) a ground will be connected to the coil 314a via a conductor 378; battery potential appears at the high side of the coil 314a via conductor 365, closed contacts 4 and 5 of deactuated vibration relay 316, conductor 364, closed contacts 4 and 5 of deactuated overspeed relay 318 and conductor 334 and will energize the relay 314. A hold path to ground is also provided for the reverse power relay 314 via its contacts 1 and 3 which are closed upon energization of relay 314. The hold path is through the sets of closed contacts 1 and 2 of the deenergized excessive vibration relay 316 and the deenergized overspeed relay 318. The lock path insures the continued actuation of the reverse power alarm relay 314 even though the reverse power condition is removed as the result of the engine 24 being shut down and the generator 20 being removed from the bus 84. The reverse power lamp 48 is connected in parallel with the coil 314a and hence will be lit and remain lit due to the continued energization of coil 314a via the lock path to indicate the cause of the malfunction even after engine 24 shutdown.

Upon energization of the reverse power alarm relay 314 its contacts 4 and 6 are closed thereby applying the battery potential then at the conductor 365 via conductor 366 to the alarm relay coil 308a. Assuming that a ground has been established at the other side of the alarm relay coil 308a via the conductor 352, the alarm relay 308 will be energized.

The excessive vibration relay 316 operates in a manner similar to that of the high water temperature relay 312 and the reverse power relay 314. Energization of the excessive vibration relay coil 316a is caused by closure of a vibration sensitive switch 68 which is located on the engine 24. Note that upon closure of switch 68 due to an excessive vibration condition, the excessive vibration lamp 62 will be lit and remain lit; likewise the coil 316a will remain closed as the result of a hold path for ground through closed contacts 1 and 2 of the deenergized overspeed relay 318. Actuation of excessive vibration relay 316 causes energization of the alarm relay 308 as contacts 4 and 6 of relay 316 close to connect the battery potential then at conductor 364 to the coil 308a via conductor 366. Note that the excessive vibration relay coil 316a has its high side connected to battery potential through a part of the interlock path, i.e., conductor 364, closed contacts 1 and 2 of deactuated overspeed relay 318 and conductor 334.

The overspeed relay 218 functions similarly to relays 314, 316; closing of the overspeed switch 330 (as shown in block diagram FIGURE 1) provides a ground for coil 318a; the switch 330 in FIGURE 3 is the centrifugal switch section 330C which, when closed, provides a ground via a conductor 380. The switch section 330C is set to close upon attainment of a speed of the engine 24 at which the generator 20 would be providing a frequency of 70 cycles per second. Similar to relays 314 and 316, a hold path to ground is provided via its closed contacts 1 and 3 for the energized overspeed relay coil 318a whereby the overspeed lamp 64 will remain lit after the removal of the generator 20 from the bus 84 in order to provide an indication of the cause of the malfunction. Actuation of overspeed relay 318 causes energization of the alarm relay 308 as contacts 4 and 5 of relay 318 close to connect the battery potential at conductor 334 to the coil 308a via conductor 366.

Note then that coils of relays 310, 312, 314, 316 and 318 have an interlocking ground path for their relay hold in circuits. The overcrank relay 320 has no interlocking ground with the other relays 310, 312, 314, 316 and 318 and its coil 320a obtains battery potential from conductor 334 via the closed contacts 4 and 5 of the deenergized overspeed relay 318 and conductor 364. Ground is applied to the low side of the coil 320a via a conductor 382 through a grounding switch 386 located in the cranking timer 328, via a conductor 385 and through closed contacts 1 and 2 of the deactuated voltage relay 322; the switch 386 is actuated by cam 3 of the cranking timer 328 after an elapsed time of around 70 seconds indicating an overcrank condition. At this time coil 320a will be energized. The overcrank lamp 66 is in parallel with the coil 320a and hence will be lit upon energization of the coil 320a.

Upon actuation of the overcrank relay 320, its contacts 1 and 3 will be closed thereby providing a ground to conductor 382 to the low side of the alarm relay coil 308a thereby permitting its energization. Battery potential to the high side of alarm coil 308a at this time is provided at conductor 366, from the closed contacts 1 and 3 of the energized low oil pressure relay 310 via conductor 364, and closed contacts 4 and 5 of deenergized overspeed relay 318 to conductor 334. Upon actuation of the overcrank relay 320 a hold path to ground is provided via its closed contacts 4 and 6, conductor 372, and the closed contacts 7 and 9 of the energized alarm relay 308. Thus the coil 320a will remain energized, after overcrank ground switch 386 has been opened, to maintain the overcrank lamp 66 lit to provide an indication of the malfunction.

Upon closure of the overcrank switch 386 in the cranking timer 328, a cam 1 opens an off normal switch 384 which will open the circuit to the cranking timer motor 340 whereby the motor 340 is deenergized. The clutch actuated by solenoid 338 will be released upon its deenergization relay and removal of the battery potential from conductor 334 and hence conductor 336 which is connected thereto via closed contacts 1 and 2 of the deenergized manual start relay 300. Upon release of the clutch the cams 1, 2 and 3 are returned to their original positions by a return spring (not shown).

Upon receipt of a signal by the alarm relay 308 from any one of the malfunction indicating relays 310, 312, 314, 316, 318 or 320 and upon deenergization of the engine generator unit No. 1, potential is no longer impressed upon conductors 356 and 358 to the voltage relay coil 322a whereby relay 322 is deactuated and contacts 1 and 3 are opened and whereby the ground path for alarm relay coil 308a through contacts 1 and 3 of voltage relay 322 is no longer maintained. In order for the energization of the alarm relay 308 be maintained, a hold path for ground is provided via its closed contacts 1 and 3. Upon actuation of alarm relay 308, the ground through its previously closed contacts 1 and 2 is opened, thereby removing the ground from the operate relay coil 306a whereby the operate relay 306 is deenergized and the ignition potential at conductor 348 is removed since contacts 1 and 3 of relay 306 are no longer engaged. At the same time, contacts 4 and 5 of operate relay 306 are engaged whereby battery potential from conductor 332 will be transmitted to the shunt trip coil 136 via conductor 388 to open the main circuit breaker 88 whereby the generator 20 is removed from the bus 84.

Upon energization of the alarm relay 308, a potential is applied through its closed contacts 4 and 6 from conductor 334 whereby a potential will be applied through a blocking diode D1 and through conductor 390 to provide a signal to the automatic engine selector control system 270 indicating that the generator unit No. 1 has been removed from the bus 84 because of a malfunction;

as will be seen this will result in another generator unit being called in to take its place. The diode D1 prevents reverse potential from being impressed upon the alarm relay 308.

Upon actuation of alarm relay 308, the engagement of contacts 4 and 5 is broken thereby removing potential from conductor 350 whereby potential is removed from the contacts of the centrifugal speed switch section 330A; this prevents the contacts of start solenoid 325 from engaging as the engine 24 decelerates and prevents actuation of the starter motor 333 during this period.

Also, upon energization of the alarm relay 308, a ground is provided to the conductor 372 via its closed contacts 7 and 9; this controls energization of the oil pressure indicating lamp 58 in the manner discussed previously.

Further, the alarm relay 308, upon energization, removes ground from its contact 8 and a conductor 392, thereby removing ground from the ground side of the push button manual start switch 394 which serves a purpose to be described. Also upon energization of the alarm relay 308, its contacts 10 and 12 will close, thereby impressing potential from the conductor 334 to conductor 396, through a blocking diode D2 down to a common alarm in the distribution panel whereby an alarm signal is initiated at the distribution panel. The diode D2 prevents feedback of an alarm signal from another generator unit. Thus the automatic cycle has been described.

Upon actuation of alarm relay 308 its contacts 10 and 13 will be closed thereby closing an additional hold path to relay coil 308a; this hold path will mainain relay 308 energized even after automatic start relay 302 has been deactuated and hence will maintain that one of the malfunction relays energized which caused the actuation of relay 308 such that the proper malfunction lamp will remain lit to provide a visual indication of the cause of malfunction. This hold path connects battery voltage from conductor 332 through normally closed switch 325, through closed contacts 10 and 13 of actuated alarm relay 308 and on to conductor 334; with potential at conductor 334 the alarm relays 308–320 will be energized the same as if automatic start relay 302 were energized. Once the malfunction has been noted the hold circuit can be deenergized by opening switch 325; when switch 325 closes again alarm relay 308 will have been deactuated and the hold path will remain open until relay 308 is again actuated.

With the selector switch section 74A in the automatic position, either removal of the potential from conductor 329 as appearing from the automatic manual engine switch control system 270, or by placing the switch section 74A into the off position, potential will be removed from the conductor 331. Note, however, that the automatic start relay 302 is of the time delay type such that the removal of potential from the conductor 331 to deenergize the coil 302a will not result in changing the position of the contacts until the delay time has elapsed. The start/stop relay 304 is not of this nature and will be immediately deactuated. During the period of the time delay of the automatic start relay 302, its contacts 4 and 6 will be maintained closed whereby a potential will then be applied via conductor 334 to the now closed contacts 4 and 5 of the start/stop relay 304 via a conductor 402 through closed contacts 1 and 3 of the automatic start relay 302 and via a conductor 404 to the standby operate lamp 276 whereby that lamp will be lit, thus indicating that the generator unit No. 1 is in a standby condition. At the same time, since the start/stop relay 304 has been deactuated its contacts 4 and 6 are no longer engaged and the automatic operate lamp 78 will no longer be lit. During the standby period all the remainder of the circuitry as previously described functions in the same manner as during the automatic operate condition. Upon expiration of the selected delay time, the contacts of the automatic start relay 302 will be moved to their normally deenergized condition at which time the contacts 4 and 5 will be engaged whereby battery potential from conductor 332 will be transmitted via a conductor 406 through closed contacts 4 and 5 of manual start relay 300 to the conductor 388, thereby energizing the shunt trip coil 136 opening the main breaker 88; at this time, contacts 1 and 3 of automatic start relay 302 will now be opened, thereby extinguishing the standby operate lamp 276.

MANUAL OPERATION

With the selector switch section 74A in the manual position, its contacts 1 and 2 are engaged, thereby applying battery potential from conductor 332 to conductor 407 and the heater 398 of the manual time delay relay 326 via a conductor 407. At the same time, a path for the battery potential exists through a blocking diode D3 from conductor 407 to a conductor 400. Upon closing the contacts of the manual time delay relay 326, a path is established from the conductor 407 to the conductor 400. The manual time delay relay 326 will maintain potential at conductor 400 for a short period of time after the switch section 74A has been moved from the manual to the automatic position; this delay serves to prevent deactuation of the system during switching from manual to automatic. Thus, once the system has been brought into synchronism in the manual condition, it can then be switched to automatic operation without loss of synchronization or opening of the main circuit breaker 88. The blocking diode D3 permits instant energization of the circuitry in the manual condition and prevents feedback from the conductor 400 through the heater 398 of the time delay relay 326 from holding that relay energized.

The conductor 400 is connected to the high side of the manual start relay coil 300a thereby causing its energization. At this time manual operate lamp 82, which is in parallel with coil 300a is lit. Upon energization of the manual start relay 300 its contacts 1 and 3 are engaged connecting the battery potential at conductor 407 to conductor 334 which then places the automatic start/stop control 34 in the manual operating condition; in this condition the various malfunction indicating relays, previously described in the discussion of the automatic operation, will function in an identical manner.

With manual start relay 300 energized, its contacts 1 and 2 are deenergized preventing the cranking timer 328 from being operated; also, its contacts 4 and 5 are disengaged removing the battery potential at conductor 407 from a conductor 388 which in turn is connected to the shunt trip coil 136 of the main circuit breaker 88; this will permit closing of breaker 88 in a manner to be described.

By actuating push button 394 its contacts are engaged thereby connecting one end of the start solenoid 325 to ground via conductor 392 and the closed contacts 7 and 8 of the deenergized alarm relay 308. The other end of solenoid 325 is already connected to battery potential through the closed contacts of the centrifugal switch section 330A and the closed contacts 4 and 5 of the deenergized alarm relay 308. Thus the engine 24 can be started by actuating the manual push button 394.

In placing the manual automatic selector switch 74 to the off position from manual, the manual start relay 300 will be deenergized, after expiration of the delay in relay 326, thereby causing engagement again of its contacts 4 and 5. Battery potential will be transmitted through conductor 388 from closed contacts 4 and 5 of the deenergized manual start relay 300 and conductor 406 or from closed contacts 4 and 5 of deenergized automatic start relay 302 and conductor 334 or from closed contacts 4 and 5 of deenergized operate relay 306 to the shunt trip coil 136 whereby the main breaker 88 will be opened. Also ignition voltage is removed from conductor 348 which is connected to ignition by the the deactuation of operate relay 306 and also by deenergization of conductor 334.

AUTOMATIC SYNCHRONIZER 110

The purpose of the automatic synchronizer 110 is to sense the difference between phase of the output from the oncoming generator 20 and the bus 84 and to provide a scan signal to the modulator control unit 124 whereby the frequency of the output at generator 20 is varied above and below synchronous until synchronism is attained; at this point the scan signal is discontinued and a signal is transmitted via selector switch 74 to the close coil 118 whereby the main breaker 88 is closed and the generator 20 is then on the bus 84. The automatic synchronizer 110 is operative only when the system is in the automatic condition.

Looking now to FIGURE 4, the automatic synchronizer control consists of three AC/DC transducers P1, P2, and P3, a control relay 414, a time delay relay 416, and a synchronizing relay 418. The AC/DC transducers P1, P2, and P3 are connected in a Y arrangement between each phase of the bus 84 to neutral when the synchronizer 110 is in the nonsynchronizing condition; that is, when the generator 20 is not operating. After the generator 20 has come up to voltage, a time delay which is adjustable between 1 to 5 seconds in the time delay relay 416 delays the energization of the control relay 414 the actuation of which initiates the synchronizing operation. It will be recalled that in initially energizing generator 20 the governor 108 was biased whereby the engine 24 would initially operate at wide open throttle until a speed near synchronous was attained; the time delay of relay 416 prevents initiation of synchronization until this initial start period has passed and the governor 108 has gained control of the engine 24 at a speed near synchronous and the engine 24 has stabilized. The time delay relay 416 is connected to one of the phases of the generator 20 and is energized as potential is obtained out of generator 20. The control relay 414 upon actuation operates to transfer the AC/DC transducers P1, P2 and P3 from a line-to-neutral to a line-to-line connection; that is, transducer P1 is connected between phase 1 of the bus 84 and phase 1 of the incoming generator 20; transducer P2 is connected between phase 2 of the bus 84 and phase 2 of the incoming generator 20 and similarly for transducer No. 3. When the phase difference between the voltages is zero at the coincident point then zero potential output is seen at the transducers P1, P2 and P3 thus deenergizing the synchronizing relay 418. Once the synchronizing relay has been deenergized, the scan signal is ceased and a signal through the selector switch 74 and the deactuated synchronizing relay 418 closes the main circuit breaker 88 whereby the oncoming generator 20 is paralleled with the bus 84. Note that with the bus 84 initially connected to transducers P1–P3 prior to actuation of control relay 414, potential at the bus 84 will energize synchronizing relay 418 preventing closing of breaker 88; however, if for some reason bus 84 is dead, then synchronizing relay 418 will not be energized and breaker 88 will be closed immediately whereby generator 20 is placed in service on bus 84.

The automatic synchronizer circuit shown in FIGURE 4. Since the three AC/DC transducers P1, P2, P3 are identical only the description of transducer P2 will be given; transducer P2 has a transformer T1 which has a primary and a secondary winding with a full wave rectifier bridge B1 connected across the secondary winding. The bridges, such as B1, of the transducers P1–P3 are connected in parallel. One side of each of the primaries of the transformers, such as T1, are connected to phases 1, 2 and 3 of the bus via conductors 408, 410 and 412 through fuses F1, F2 and F3, respectively, through the manual disconnect switch 90 (see FIGURES 4 and 7). The opposite sides of the primary windings are connected through closed contacts 7 and 8, 4 and 5, and 1 and 2, respectively, of the control relay 414 via conductors 420, 422 and 424, respectively, to a common neutral via conductors 648. The output of transducers P1, P2 and P3 are connected in parallel and via conductors 428 and 430 are connected across synchronizing relay coil 418a; with a potential on the bus 84, relay 418 is energized. The contacts 9, 6 and 3 of control relay 414 are connected to phases 1, 2 and 3, respectively, of the generator 20 and, therefore, upon energization of control relay 414 the voltage across the transformer in transducers P1, P2 and P3 will be the phase-to-phase voltage difference between the phases of the bus 84 and the corresponding phase of generator 20. If the two are out of phase, a difference of potential will still exist to keep the synchronizing relay 418 energized. As the oncoming generator 20 begins to produce potential, this voltage is sensed between phase 3 and neutral via conductors 642 and 648, respectively. This potential appears across the time delay relay coil 416a causing its actuation after the set time delay. As noted, this delay permits the oncoming generator 20 to stabilize prior to being paralleled onto the bus 84. Upon actuation of the time delay relay 416a its contacts 1 and 3 close, thereby connecting one end of control relay coil 414a to phase three via conductor 642; its other end is connected to neutral via conductor 648. When the control relay coil 414a is energized the circuits between its contacts 1 and 2, 4 and 5, 7 and 8 are broken, thus removing the neutral connection from the one end of the primaries of the transformers, such as T1, of transducers P1, P2 and P3 and engagement is made between contacts 1 and 3, 4 and 6 and 7 and 9. Since contacts 9, 6 and 3 are connected to and 7 and 9. Since contacts 9, 6 and 3 are connected to phases 1, 2 and 3, respectively, via conductors 646, 634 and 642, respectively, of the oncoming generator 20, the primaries of the transformers of the transducers P1, P2 and P3 are connected such that phase 1 of the generator 20 is connected to phase 1 of the bus 84 across the primary of transducer P1, and the phases 2 and 3 are similarly connected across transducers P2 and P3, respectively.

As previously discussed, during synchronization the governor 108 working in response to the frequency modulator 124 will be varying the frequency of the oncoming generator 20 ¼ cycle above and below the 60 cycle frequency every five seconds. As long as the potential at the bus 84 and the potential of the oncoming generator 20 are out of phase, a DC signal potential will appear across the output of the transducers P1, P2 and P3 whereby the synchonizing relay 418 will be energized at which time its contacts 1 and 3 and 4 and 6 will be engaged. Contact 1 is connected to 120 volts AC via conductor 440 and this potential is utilized as the scan signal transmitted to the modulator 124 via conductor 628. Conductor 628, however, is connected to conductor 440 through contacts 4 and 6 of the time delay relay 416 and contacts 1 and 3 of synchronizing relay 418; thus for the scan signal to be transmitted both the control and synchronizing relays 414 and 418, respectively, must be energized. Upon attainment of synchronization the transducers P1, P2 and P3 will have zero output. At this time, the synchronizing relay coil 418a will be deenergized and the contacts will be in their deenergized positions. At this time the engagement of contacts 1 and 3 will be broken, thereby removing the scan signal from conductor 628 whereby the modulator 124 will return to a "home" position in a manner to be described. At the same time, engagement is made between contacts 4 and 5 of synchronizing relay 418; contact 4 is connected to phase three of the oncoming generator 20 via conductor 628 (see FIGURES 4 and 7) and thereby impresses this potential onto conductor 446 via contact 5, through the manual-automatic selector switch section 74D, contacts 3 and 4 which are in the closed position when the switch 74 is in its automatic condition thereby transmitting potential to conductor 448 through closed contacts on a door interlock switch 450, through the closed close contacts 119, through the close solenoid coil 118 and back to phase two via a conductor 634. With potential then applied across the close solenoid coil 118, the main circuit breaker 88 will be closed to connect the oncoming generator 20 onto the bus 84.

THE GOVERNOR 108 AND AUTOMATIC FREQUENCY MODULATOR CONTROL 124

Referring now to FIGURES 9 and 10, the automatic frequency modulator control 124 is shown and includes an AC reversible type motor 454 having a pair of windings connected whereby the direction of rotation of the motor 454 can be selectively reversed by the manipulation of a switch, in a manner to be seen.

The motor 454 has connected to it three cams 462, 464 and 466, which cooperate to actuate switches 468, 470 and 472, respectively. The motor 454 is connected through a suitable gear train, not shown, and an electrically actuated clutch, generally indicated as 474, to a 360° continuous wound power rheostat 476. The clutch 474 is actuated by a coil 478. In automatic operation, as previously mentioned, after the time delay relay 416 in the automatic synchronizer 110 has timed out, indicating that the engine 24 and generator 20 are stabilized at a speed proximate to synchronous speed, then the scan signal will cause motor 454 to rotate in a clockwise direction whereby the wiper of the rheostat 476 will be rotated continuously about 360°; this causes a varying signal to be sent to the governor 108 which will cause the governor 108 to vary frequency above and below the synchronous frequency in a manner to be described. When synchronism is obtained, the synchronizing relay 418 will be deactuated whereby the scan signal from the synchronizer 110 will be removed. Note that null switch 472 is in parallel with the contact 1 of the synchronizing relay 418 and contact 4 of the time delay relay 416. The null cam 466 is designed to open the null switch 466 twice for every 360° of rotation of the wiper of rheostat 476, with the opening of the switch 466 to occur at a 90° or 270° point along the 360° wound rheostat 476. The 90° and 270° points are referred to as the "home" positions of the rheostat 476 and at these points provide zero variation in the governor 108 from a 60 cycle frequency. Upon attainment of synchronization and deactuation of the synchronizing relay 418 and the time delay relay 416 in the synchronizer 110, the null switch 472, unless the wiper of the rheostat 476 is in a home position, will be closed, thus assuring further actuation of the motor 454 and hence further rotation of the wiper for the rheostat 476. This will continue until null switch 472 is opened by the cam 466. The clutch coil 478 is actuated by either the scan signal from the synchronizer 110 or current through null switch 472 when it is closed and hence will be deactuated when the scan signal is removed and null switch 472 opened, thereby disconnecting the motor 454 from the wiper of the rheostat 476 and hence ceasing rotation of that wiper. At this point the wiper is in the 90° or 270° home positions. The deactuation of the clutch coil 478 assures that the wiper of rheostat 476 will not coast beyond the preselected home positions.

As will be seen, the rotation of the wiper of the rheostate 476 will cause a frequency variation plus or minus ¼ of a cycle about the selected 60 cycle frequency for the generator 20. By returning the wiper of rheostat 476 to the home position the time required for the generator 20 to lock in and stabilize with the bus 84 will be minimized. Potential for the motor 454 in the synchronizing condition is provided by means of transformer T2 which has its primary connected to a governor control relay 480 which is energized upon actuation of the operate relay 306 via battery potential through its closed contacts 1 and 3 and conductor 348, the potential at which also energizes the ignition of the engine 24. In its deenergized position, the governor control relay 480 transmits AC bus potential to the transformer T2 which potential is used to maintain the governor 108 energized, thereby eliminating variations in the operation of the governor 108 due to temperature variations. Also the potential at the secondary of transformer T2 can be fed to the motor 454 and to the clutch brake 478, through either the closed contacts of the null switch 472 or the closed contacts of the synchronizing relay 418 and time delay relay 416, both when energized. The potential at the secondary of T2 then provides the potential for the scan signal. Upon initial energization of engine 24, the bus potential at secondary of T2 is ineffective to cause rotation of the motor 454 since the synchronizer 110 is not yet actuated and the null switch 472 is opened. The sole function of the application of the bus potential to the transformer T2 is to provide for the temperature stabilization of the circuitry of the governor 108 and in no way is effective to cause rotation of the motor 454. It will also be seen that for scanning purposes the transformer T2 will be connected across two phases of the oncoming generator 20 via governor control relay 480 when it is actuated.

With the system in either manual or automatic position, through actuation from the automatic start/stop control 34, specifically through the operate relay 306, the governor control relay 480 is energized thereby placing contacts 4 and 6 and 1 and 3 in engagement whereby the primary of the transformer T2 is then disconnected from the bus 84 and is connected to the AC line of the oncoming generator 20. At the same time, the automatic synchronizer 110 is subject to energization and then the voltage from generator 20 is utilized to operate the frequency modulator 124. Note that this potential from generator 20 on transformer T2 will be utilized for both manual and automatic operation.

In the automatic condition the automatic synchronizer 110 will be actuated, in the manner as previously described, whereby the synchronizing relay 418 and time delay relay 416 upon actuation will close a circuit paralleling the null switch 472 thereby permitting energization of the motor 454. At this time, the motor 454 will rotate in the clockwise direction rotating the wiper for the rheostat 476. Upon attainment of synchronization, the closed contacts paralleling the null switch 472 will be opened and, assuming that the wiper for the rheostat 476 is not in either of the home positions, the null switch 472 will still be closed, thereby permitting actuation of the motor 454 until a home position is reached at which position the null switch 472 will be opened in the manner previously described, thereby preventing any further frequency variations.

In manual operation, the limit switches 468 and 470 are utilized to restrict the rotation of the wiper of the rheostat 476 between 0° and 180°, which movement attains minimum to maximum resistance of the rheostat 476. For instance, with the manual-automatic selector switch 74 in the manual position the lower-raise governor switch 126 will be energized, in a manner to be seen, such that upon manipulation of switch 126 to the raise position a circuit will be closed through the raise limit switch 470 to the clutch coil 478 and the motor 454 whereby the motor 454 will be driven in a clockwise direction rotating the wiper of the rheostat 476 in a direction to cause the frequency of the generator 20 to be raised. By manipulation of the raise-lower switch 126 in the lower position a circuit is closed through a lower limit switch 468 to the clutch coil 478 and the motor 454 to drive the motor 454 in a counter-clockwise direction, thereby reversing the direction of rotation of the wiper of the rheostat 476 moving it in a direction to decrease the frequency of the generator 20. The cam 402 is operative in conjunction with the lower limit switch 468 such that when the wiper for the rheostat 476 is in its lowermost position, the switch 468 will be opened, thereby deenergizing clutch coil 478 and stopping rotation of the wiper of rheostat 476. Similarly, the cam 464 is operative when the wiper of the rheostat 476 reaches its uppermost position to open the raise switch 470 to open the circuit to the clutch coil 478 and thereby precluding further rotation of the wiper of rheostat 476. Thus actuation of the governor raise-lower switch 126 will effectuate movement of rotation of the wiper of the rheostat 476 in either direction to increase or decrease the frequency with the limit positions being limited by the switches 468 and 470. It will be understood that the limit switches 468 and 470 insure that the wiper of rheostat 476 will be moved only in a direction to raise frequency when manual switch 126 is moved to its raise position and to lower frequency when switch 126 is moved to its lower position; without these stop limits actuation of switch 126 would cause 360° rotation, as with automatic operation, and the operator could have difficulty in manually synchronizing.

The wound rheostat 476 provides a signal to the governor 108 whereby the frequency of the generator 20 will be altered in a manner to be described in more detail.

In FIGURE 10 is shown a governor bias relay 482. The governor bias relay 482 is actuated in either manual or automatic operation and is controlled by centrifugal switch section 330B (see FIGURE 3); bias relay 482 is energized via battery potential from conductor 350 to conductor 360 when switch section 330B is closed and provides a bias to the governor 108 to maintain the throttle of the engine 24 in substantially a wide-open throttle condition until the engine 24 reaches a preselected speed prior to synchronous speed. The function of the bias relay 482 then is to provide for rapid acceleration up to a speed proximate synchronous speed; upon attainment of this speed centrifugal switch section 330B will be opened thereby deactuating the bias relay 482 whereby the governor 108 will then perform its governing function to control speed.

Also shown in FIGURE 10 is a load sharing relay 484; auxiliary contacts 176 of the main circuit breaker 88 funtion to actuate the load sharing relay 484; upon closing of the breaker 88 relay 484 is actuated whereby an interconnection is made between the governors of the different generator units on the bus such that load sharing between the different generators automatically takes place in a manner to be described.

Looking now to FIGURE 9, there is shown the remainder of the governor 108. In general, the governor 108 utilizes magnetic amplifiers to control the energization of the hydraulic actuator 106. The hydraulic actuator 106 is shown in FIGURE 11 and comprises a pair of solenoid actuated valves which are mounted in a balanced system whereby two orifices are opened relative to each other to cause a difference in pressure between two sides of a piston the movement of which is used to cause either opening or closing of the engine throttle. The two orifices will be in a balanced condition when the signals from the magnetic amplifier of the governor 108 are equal thereby precluding further movement of the piston and hence further movement of the throttle. The details of the hydraulic actuator 106 will be described.

The governor 108 functions through the actuator 106 to control the throttle opening of the engine 24 and in doing so is sensitive to engine speed to maintain the proper frequency at the output of the generator 20. At the same time the throttle opening is controlled in response to load whereby an increase or decrease in load demand is noted at the output of the generator 20 and is translated to the engine throttle prior to the engine 24 having an opportunity to react either by decreasing or increasing its speed. The governor 108 is also capable of automatic load division between parallel generator; in addition, the governor 108 is provided with facilities for either isochronous operation with systems having similar operational characteristics or is provided with facility for parallel operation with systems having droop characteristic. In addition, the governor 108 is provided with facility for isochronous operation at either 50 or 60 cycles or droop operation at 50 or 60 cycles.

The details of the governor 108 will now be considered. In the preferred form the governor 108 will be of the Westinghouse EFG, 50/60 cycles type. Note also that the actuator 106 which is operated in conjunction therewith will be the Westinghouse catalog No. 32D1560G33 type.

Governor 108 includes a multiple-gate winding section 486 the outputs of which are utilized to provide the signals to the solenoids of the hydraulic actuator 106. The gate winding section 486 receives its energization from a flip flop multivibrator oscillator 488 which has an output of approximately 1200 cycles/sec. The output from the oscillator 488 is rectified and controlled by the gate winding section 486 in a manner to be seen to provide direct current signals to the solenoid windings of the hydraulic actuator 106. The magnetic amplifier circuitry also includes a frequency bias winding section 498 which is utilized to provide a preselected bias at the two outputs from the gate winding section 486 whereby the desired frequency is attained. A feedback winding section 492 receives a feedback signal from the hydraulic actuator 106 and provides stability. A load sharing coil section 494 provides bias whereby automatic load sharing is accomplished. Bias balancing is provided by a coil balancing section 496. DC bias for the frequency bias section 490 is provided by a tuned resonant frequency bias network 498.

The oscillator section 488 includes a pair of p-n-p transistors TR1 and 2 which are connected in push-pull with an output across the primary of an output transformer T3; feedback windings provide bias between base and emitter circuits through a bias resistor R1; 12 volts DC is provided to the input on the oscillator 488 across the emitter and the center tap of the primary of the output transformer by means of conductors 500 and 502. Bias is also provided by resistor R2 connected between base transistor TR2 and the center tap of the primary of the output transformer. The parameters of the transistors TR1 and 2 and associated circuitry are such that oscillation will occur at around 1000 to 1200 cycles per second. The secondary of the transformer T3 is connected to the input of the multiple gate windings section 486 which comprises coils 504, 506, 508 and 510. Coils 504 and 506 are connected in a bridge with four diodes whereby a resultant rectified potential is obtained at the output of the bridge at conductors 512 and 514. Similarly coils 508 and 510 are connected in a bridge with four diodes with a rectified DC output appearing at conductors 516 and 518. The output at conductors 512, 514 is fed to one of the solenoid coils in the hydraulic actuator 106 through bias relay 482 while the output at conductors 516 and 518 is fed to the other solenoid coil, thereby providing for actuation of the hydraulic valve and positioning of the engine throttle. When the output at conductors 512 and 514 is equal to the output at conducors 516 and 518, then the solenoid valves will be similarly energized resulting in equal pressure on opposite sides of the actuating piston in the hydraulic actuator 106 and hence no movement of the throttle. When there is a difference of potential between conductors 512, 514 and 516, 518, then the actuator 106 will have greater pressure on one side of the piston and hence the piston will move resulting in a change of the throttle position. The magnitude of the potential at conductors 512, 514 and 516, 518 is affected by the various bias circuits previously noted. The windings 504, 506, 508 and 510 are inductively coupled to windings with similar numbers but with different letter postscripts in the other bias neworks. Thus, when bias current flows through coils 504A, 504C or 504D, the impedance of coil 504 will be changed and hence the output at its associated bridge; the same holds true for the other coils.

Looking now to the balance coil section 496, windings 504D and 506D and dropping resistor R3 are connected in parallel with the winding 508D and 510D and dropping resistor R4 via windings of a bias balance potentiometer R5. The wiper of the potentiometer R5 is serially connected with a variable resistor R6 and thence to the negative side of a rectifier bridge circuit 520 via a conductor 522; the positive side of the bridge 520 is connected to the other side of coils 504D and 508D via a conductor 524.

The bridge 520 obtains its energization from a secondary winding of a transformer T4 via conductors 602 and 604. The primary winding of transformer T4 is connected across the secondary of transformer T2 (see FIGURE 10) via conductors 526 and 528 and hence will receive its energization initially from the bus 84 and after energization of the operate relay 306 (see FIGURE 2) and hence of the governor control relay 480 then from the oncoming generator 20. By adjusting the wiper of the potentiometer R5, the curent flow through the balance windings in section 496 can be controlled, thereby controlling the relative outputs at conductors 512, 514 and 516, 518 in gate section 486. The variable resistor R6 permits adjustment of the level of the output generally equally at both conductors 512, 514 and 516, 518. As will be seen, the balance windings section 496 operates to control the frequency at which the governor 108 will set the engine 24.

The coils of the frequency biasing section 490, 504A, 506A, 508A and 510A are serially connected and are biased by current from the tuned network 498 which is tuned to the desired frequency, i.e., 50 or 60 cycles. The network 498 includes a rectifier bridge 534, one side of the input of which is connected to a secondary of transformer T4 via a pair of choke coils 536 and 538 which have their juncture connected to the opposite side of the secondary and bridge 534 via a capacitor C1; the circuit is tuned for 60 cycle/sec. A second capacitor C2 can be connected in the circuit via conductors 540 and 542 to switch 544 (see FIGURE 10) to change the tuned frequency of the circuit for 50 cycle/sec. operation. A resistor R14 is connected across the bridge 534.

The positive side of the bridge 534 of the tuned network 498 is connected to the frequency bias winding section 490 via a conductor 547 and a variable frequency gain adjustment resistor R7. By varying resistor R7 the magnitude of the bias by the coils 504A, 506A, 508A and 510A can be varied. The negative side of bridge 534 is connected to the opposite side of frequency bias coil section 490 via a dropping resistor R8, a conductor 546 a balance control variable resistor R9, which is connected to the 180° point of rheostat 476 (see FIGURE 10), through a portion of the rheostat 476, through the wiper and a conductor 550; note that the bridge 520 of the balance section 496 has its negative side connected to the negative side of bridge 534 via conductor 552 and has its positive side connected to the 0° point of rheostat 476 via a conductor 524, a portion of a load sharing potentiometer R12, and a conductor 566 through a balance control variable resistor R10. Thus the balance bias winding section 496 will be adjusted by means of resistor R5 such that at 60 cycles the resultant output at the rectifier bridge 534 of the tuned network 498 and its resultant bias to the frequency bias section 490 will provide the output potentials appearing at conductors 512, 514 and 516, 518 to be equal thereby indicating that the throttle setting for that load is correct to provide the desired frequency. Note that the bias path for frequency bias section 490 includes the rheostat 476; thus rotation of its wiper will result in a change in bias and a resultant change in output frequency.

In order to provide stability to the circuit, the feedback section 492 is provided and it operates in conjunction with a rectifier bridge 556. The feedback windings 504B, 506B, 508B and 510B are serially connected and energized by means of the bridge 556 which receives its energization from the hydraulic actuator 106 via conductors 558, 560 in a manner to be described. As the throttle of the engine 24 is moved to a desired position, a feedback signal varying in magnitude with the position of the throttle is provided at the conductors 558, 560; this signal is used to provide for stability of the circuitry. The positive side of bridge 556 is connected to feedback coils 504B, 506B, 508B and 510B via a conductor 562. The opposite side of the feedback coils 504B–510B is connected through a variable feedback gain resistor R11, adjustment of which provides for variation in the magnitude of the bias caused by the feedback signal, through a conductor 564, through a group of parallelly connected capacitors C3–C6, through a conductor 554, through a dropping resistor R13, through potentiometer R12 and to the negative side of the bridge 556. The capacitors C3–C6 are selected to provide stability. The potentiometer R12 is connected directly across the bridge 520. The function of the load sharing null adjustment potentiometer R12 is to be able to provide a zero adjustment under no load conditions for the load sharing bias coils 504C–510C, such that under a no load condition no current will flow through these coils and hence no bias condition will exist therefrom. The load sharing bias coils 504C–510C are connected at one end to the wiper of load sharing potentiometer R12 and to a resistor R14' via a conductor 566, to one end of a parallel adjustment control potentiometer R15 via a conductor 568 and to the positive side of the feedback bridge 556 via a conductor 570. The wiper of potentiometer R15 is connected to contact 4 of load sharing relay 484 while the opposite end of the coils 504C–510C are connected to contact 1 via a conductor 572. Upon energization of the load sharing relay 484 by the main circuit breaker 88, the contacts 1 and 4 will be engaged with contacts 3 and 6, respectively, whereupon the load sharing circuit of the generator unit No. 1 will be connected in parallel to the load sharing circuit of all other operative generating units on the bus 84 at that time. The percent of load sharing is adjusted by means of the parallel adjustment control potentiometer R15. Note that the load sharing circuit includes the feedback potential across bridge 556; therefore current will flow until the feedback potentials are sufficient to balance the load sharing circuits. The load sharing circuit between generator units is shown in a simplified form in FIGURE 17 in which the components of the second generator unit are designated with a –2 postscript to indicate generator unit No. 2. For droop operation a droop switch 571 can be closed thereby connecting a frequency regulation control variable resistor R15' in parallel with capacitors C3–C6 via conductors 564 and 554; the operation with droop characteristics can be varied by varying the resistance of R15'.

THE HYDRAULIC ACTUATOR 106

As noted, the output from the governor 108 is utilized to operate the hydraulic actuator 106. The actuator 106 is shown in FIGURE 11 and includes a pair of solenoid actuated valves 574 and 576 with the coil of valve 574 connected to conductors 516 and 518 from the gate section 486 of governor 108 and the coil of valve 576 connected to conductors 512 and 514 via conductors 610 and 612. The valves 574 and 576 are connected together in a balanced construction which is pivoted about a point 578. An actuating piston 580 has one end 582 connected to the throttle through an appropriate linkage. A pressure port 584 is connected to a source of fluid pressure (not shown) and has one outlet 586 controlled by solenoid valve 576 and another outlet 588 controlled by solenoid valve 574. The outlets 586 and 588 are communicated to opposite sides of piston 580 via passages 590 and 592, respectively, and also to tank (not shown) via passageways 594 and 596, respectively. When the input to the coils of solenoid valves 574 and 576 are equal, the fluid pressure applied to opposite sides of the piston 580 will be equal and no throttle movement will result; when the inputs are unequal, the output pressures will be unequal and piston 580 will move the throttle accordingly. The core 598 of a transformer 600 is connected to the piston 580 and hence will be moved into and out of the windings upon movement of piston 580 and is used to provide a feedback signal; the primary of transformer 600 is connected to a source of A-C potential via conductors 602, 604 while the secondary is connected to feedback conductors 558, 560. Thus the output at the feedback bridge 556 will be varied in accordance with variations in the position of the core 598 of transformer 600.

The following description will be of first the automatic and then the manual operation of that portion of the system including the governor 108, the hydraulic actuator 106, the automatic frequency modulator control 124 and other associated circuitry. Assume now that the manual-automatic selector switch 74 is in the off position. At this time, A-C potential from the bus 84 appears at contacts 5 and 2 of the governor control relay 480. This potential, through contacts 4 and 1 engaged with contacts 5 and 2, respectively, appears at the primary winding of transformer T2, the secondary of which is connected to the input of the governor 108 by means of conductors 526 and 528. This potential appears at the primary of transformer T4 whereby the governor 108 is maintained energized to eliminate variations due to temperature.

AUTOMATIC OPERATION

With the manual selector switch 74 in the automatic position, the operate relay 306 will be actuated whereby potential will be applied to conductor 348 which is connected to the high side of the governor control relay coil 480a thereby energizing the relay 480 disengaging contacts 4 and 5 and 1 and 2 and engaging contacts 4 and 6 and 1 and 3 thereby removing the AC bus potential from the primary of transformer T2 and placing the primary of transformer T2 across the oncoming generator by means of conductors 356 and 358. At this time the potential appearing at the secondary of transformer T2 will be transmitted to the governor 108. At the same time the engine 24 will be started whereby some potential will begin to appear at the transformer T2. Also actuation of the automatic start relay 302 causes potential to be applied to the centrifugal switch section 330B, through its closed contacts and through conductor 360 which is connected to the high side of the governor bias relay coil 482a, the low side of which is connected to ground thereby energizing the relay 482 and causing engagement of its contacts 1 and 3 and 4 and 6. Contact 6 is connected to ground through a bias resistor R17 and hence connects contact 4 and conductor 610 to ground thereby; contact 3 at the same time is connected to the high side of the coil 482a which as previously indicated has been energized and hence battery voltage will appear at contact 3 and as a result of its engagement with contact 1 at a conductor 612. Conductors 610 and 612 are connected directly across the throttle solenoid coil 576 hence applying battery voltage thereto to bias the hydraulic actuator 106 to move the throttle to a wide open position to provide for rapid starting of the engine 24 to a speed approximate synchronous. On attainment of a speed approximate synchronous, the centrifugal speed switch section 330B will then have its contacts opened thereby removing the potential from the governor bias relay coil 482a hence causing its deenergization, whereby engagement of contacts 1 and 3 and 4 and 6 will be broken and contacts 1 and 2 and 4 and 5 will then be engaged. In this condition the open throttle solenoid coil 576 of the hydraulic actuator 106 will then be connected to the governor 108 by means of the conductors 512 and 514 which in turn are connected to the gate section 486. At this point the actuation of the hydraulic actuator 106 will be solely in control of the governor 108.

The engine 24 has now attained synchronous speed; however, the potential from generator 20 will not at this time be in synchronism with the potential appearing at the bus 84. As previously noted, the automatic synchronizer 110 will not be actuated for a specified time period permitting the generator 20 to be brought up to synchronous speed and to be stabilized thereat. The governor 108 is effective by means of the frequency bias section 490 and the other sections noted therein to automatically bring the engine 24 hence the generator 20 up to this synchronous speed. At this point the frequency of the voltage from generator 20 is proximate to or equal to the frequency appearing at the AC bus 84. It is now necessary prior to paralleling the generator 20 with the bus 84 that synchronism be obtained between the potential of the generator 20 and the potential at the bus 84. A simplified form of the circuit for automatic synchronization is shown in FIGURE 15. Potential appears at the secondary of transformer T2 by means of the governor control relay 480 and will be utilized to drive the reversible motor 454 and to energize the clutch coil 478. The potential at the secondary of transformer T2 will be impressed across the motor 454 by means of a circuit through conductor 440 at one side of the secondary winding of transformer T2, through the null switch 472 which may be open or closed at this time, and thence by means of conductor 614, through the closed contacts 3 and 4 of the automatic-manual selector switch section 74C, to the windings of motor 454, and thence to the other side of the secondary winding of transformer T2 via conductor 460. A circuit is also connected from conductor 614 via the null switch 472 through closed contacts 3 and 4 of the manual-automatic selector switch section 74B through a conductor 615 through the clutch coil 478 and thence back to the opposite side of the secondary winding of transformer T2 via conductor 460. The null switch 472 is paralleled by contacts in the circuit of the automatic synchronizer 110 when the synchronizing relay 418 and time delay relay 416 are actuated; the parallel circuit is from conductor 440 through closed contacts 1 and 3 of the synchronizing relay 418, through the closed contacts 4 and 6 of the time delay relay 416 and back to conductor 442. At this time the motor 454, being energized, will rotate the wiper of the wound rheostat 476 in a counterclockwise direction changing the bias on the frequency bias section 490 causing it to vary the frequency of the generator 20 plus and minus ¼ of a cycle every 5 seconds. When synchronization is obtained, the synchronizing relay 418 will be deenergized. Assuming now that the wiper of the wound rheostat 476 has not reached a home position, being either 90° or 270°, the null switch 472 will still be closed permitting continuation of energization of the motor 454 until the home position is reached, at which the null switch 472 will be opened and scanning will cease. Note that the wound rheostat 476 is connected to the governor 108 in the manner previously described, such rotation of the wiper will cause a current to flow through the frequency bias section 490 whereby the speed of engine 24 will be changed so that the output frequency of generator 20 will be changed. Note that the balance resistors R9 and R10 are utilized to balance the potentials appearing at conductors 546 and 566 whereby the plus and minus excursions will be equal. A bias resistor R18 is connected directly across conductors 546 and 566 paralleling the rheostat 476 to control the amplitude of the scan to be ¼ of a cycle plus or minus.

Upon attainment of synchronization, the output from transducers P1, P2 and P3 in the synchronizing circuit 110 will be zero, hence deactuating the synchronizing relay 418 whereby the circuit to the motor 454 through the synchronizing relay 418 will be then opened. Note that this will also open the circuit to the clutch coil 478 preventing overshooting due to inertia. Next the manual operation will be considered.

MANUAL OPERATION

In manual operation the manual-automatic selector switch 74 will be in a manual position. As previously noted, scanning plus and minus on opposite sides of the 60 cycle selected base frequency for synchronization purposes is caused by operation of the manual governor raiselower switch 126. A simplified form of the circuit for manual synchronization is shown in FIGURE 16. In manual, conductor 440 from the secondary of transformer T2 is connected through closed contacts 1 and 2 of selector switch section 74B through a conductor 616 through switch section 126A of the raise-lower switch 126 to the clutch coil 478 either through closed contacts 3 and 4 when the switch section 126A is placed in the lower position or closed contacts 1 and 2 when the switch section 126A is placed in the raise position. The contacts 3 and 4 are serially connected to the clutch coil 478 via conductor 618 through the lower limit switch 468, while the contacts 1 and 2 are connected to the clutch coil 478 via conductor 615 and through the raise limit switch 470 and a conductor 620. The opposite side of the clutch coil 478 is connected to the secondary of transformer T2 via conductor 460. Thus by actuation of the manual raise-lower switch 126 either to the raise or lower position, the clutch coil 478 will be actuated. At the same time the conductor 616 is connected to one winding of the dual wound motor 454, through contacts 3 and 4 of switch section 126B and a conductor 456 with switch section 126B in its lower position thereby causing current to flow through that one of the windings of the AC reversible motor and to the opposite side of the secondary transformer T2 via conductor 460. In this condition the motor 454 will rotate in the counterclockwise direction causing the frequency to be lowered. Also, the conductor 616 is connected to the switch section 126B through contacts 1 and 2 which will be closed when the switch 126 is in its raise position thereby closing a circuit to conductor 458 and thence to the other winding of the AC reversible motor 454 and thence to the opposite side of the secondary of transformer T2. With the switch 126 in the raise position then, the motor 454 will be caused to rotate in a clockwise direction whereby the wiper of wound rheostat 476 will be rotated in a direction to cause raising of the frequency. Note that the lower limit switch 468 will be opened when the motor 454 has rotated the wiper of the rheostat 476 to its 0° position indicating the lowest frequency possible and likewise the raise switch 470 will be opened when the wiper of rheostat 476 has been rotated to its maximum frequency or 180° position. Opening of either switch 468 or 470 will deactuate the clutch coil 478 and hence stop the wiper from rotation by the motor 454. Thus manual control of the frequency variation can be obtained merely by manipulation of the governor raise-lower switch 126. The effect of rotation of the wiper by either manual or automatic operation is the same with regard to the effect upon the governor 108.

As previously noted, synchronization can be observed when in manual operation upon the synchroscope 142 and upon a synchronous condition being obtained the manual circuit breaker switch 120 can be manually closed to close breaker 88 thereby paralleling the generator 20 with the bus 84.

Upon closing of the main breaker 88, the auxiliary contacts 176 are closed, thereby connecting the battery potential to the load sharing relay coil 484a by means of conductor 332 to conductor 622 thereby energizing the relay 484. Upon energization of load sharing relay 484, contacts 1 and 3 and 4 and 6 are engaged whereby the load sharing circuits of all governors, such as governor 108 of generators on the bus are placed in parallel. This connection has been previously described. As previously noted, by adjusting the position of the wiper of the parallel adjustment control R15, the percentage of load to be assumed by each of the respective generators can be selected.

Upon initial connection of generator 20 to the bus 84 current will flow through the load sharing bias section 494 to bias the magnetic amplifier to provide an output from the gate section 486 whereby the throttle will be moved in the proper direction to cause the engine 24 and generator 22 to assume more of the load on the bus 84 until the balance condition is reached where no circulating current occurs between the load sharing circuits of those generators then in parallel. Because of the relatively low throttle opening of the oncoming generator 20, the potential appearing at the bridge 556 of the feedback network 492 will be low relative to the similar potentials in the other generator units. Thus circulating current will initially occur through the load sharing bias network 494 causing the throttle of engine 24 to be opened further. This will continue until the proper load sharing has occurred. Note that load sharing relay 484 will be actuated with the system in either manual or automatic condition upon the closing of the main circuit breaker 88 and hence load sharing will automatically occur whether manual or automatic operation has been selected.

GENERATOR INSTRUMENTATION AND CONTROL CIRCUITS

A schematic diagram of the interconnection between the cable 86 of the generator 20 and the bus 84 is shown in FIGURES 7 and 8. Looking now to these drawings, the cable 86 is shown to comprise conductors 1, 2 and 3 which correspond to the phases 1, 2 and 3 with N corresponding to the neutral. The phases 1, 2 and 3 are shown going through the manual disconnect switch 90 as well as through the main circuit breaker 88 to a connection to the bus 84 to connect to similar phases and neutral of the other generators on the bus 84.

The main circuit breaker 88 has five auxiliary contacts 119, 134, 164, 168 and 176. The auxiliary contacts 119 are connected with close coil 118 and the trip relay 134 is connected to the trip coil 136; the tieline contacts 176 have already been discussed with the load sharing relay 484. Contacts 168 are normally opened and are closed upon closing of the main breaker 88 and hence close a circuit to the closed lamp 160 and lamp 162 whereby those lamps are lit to provide an indication that generator unit No. 1 is now serving the bus 84. Lamp 162 is located at the distribution panel while lamp 160 would be located proximate to the location of the individual generator 20. Contacts 164 are normally closed to energize the open lamp 158 indicating that generator 20 is not on the bus 84 and will be opened upon closure of the main contacts 88 whereby the open lamp 158 will be deenergized.

The trip contacts 134 are normally open and will be closed upon actuation of the main circuit breaker 88 thereby providing for a closed circuit to the shunt trip coil 136 thus permitting its energization. When trip coil 136 is energized, it will open the main circuit breaker 88. Energization of the trip coil 136 is caused by circuit breaker trip relay 624 which upon energization will have battery potential applied through closed contacts 1 and 2 via conductor 332 to conductor 388 and thence to the shunt trip coil 136 whereby the main circuit breaker 88 will be opened. Energization of the circuit breaker trip relay 624 will be discussed later. In addition, the conductor 332, as previously noted, is connected to operate relay 306 which, upon energization of the alarm relay 308, will be deenergized applying a potential to conductor 388 to cause energization of the shunt trip coil 136, causing the main circuit breaker 88 to be opened. In addition, placing of the manual start relay 300 in the deenergized position will apply potential to conductor 388 whereby the shunt trip coil 136 will be energized, causing the main circuit breaker 88 to be opened.

Note that the contacts 119 are normally closed and will be opened upon closing of the main circuit breaker 88, thereby opening the circuit to the close coil 118 to prevent damage from constant energization thereof. Note that upon opening of the main circuit breaker 88, the contacts 119 will again be closed and the close coil 118 will be in condition to be energized by signals either from the manual circuit breaker switch 120 or from the automatic synchronizer 110 whereby the main breaker 88 will be closed. A door interlock switch 450 is provided in series with the close coil 118 such that the close coil 118 can be energized only when the switch 450 is closed which will be only when the door to the circuit breaker panel is closed.

The energization of the close coil 118 can be by the automatic synchronizer 110. The output from the automatic synchronizer 110 is connected through conductor 446 through the closed contacts 3 and 4 of the manual-automatic selector switch section 74D (when in the automatic position) through a conductor 448 and thence to the close coil 118 whereby the main circuit breaker 88 will be closed upon receipt of a signal from the automatic synchronizer 110. In the manual position of the switch section 74D, contacts 1 and 2 thereof will be engaged. Energization of the close coil 118 and hence closing of the main circuit breaker 88 can be by the manual circuit breaker switch 120 being placed in the close position at which time its contacts 3 and 4 are engaged thereby connecting a conductor 626 to a conductor 628 which is connected to phase 3 of the oncoming generator 20; conductor 626 in turn is connected to conductor 450 via closed contacts 1 and 2 of the selector switch section 74D (in its manual position); thus potential is applied to close coil 118 to close the main breaker 88. The main circuit breaker 88 can be opened when the manual automatic selector switch 74 is in the manual position at which time the switch section 74E will have its contacts 1 and 2 engaged; with the manual switch 120 in its open position its contacts 1 and 2 will be closed; therefore potential from phase 3 will be connected via conductors 628 and 630, closed contacts 1 and 2 of switch 74E, through conductor 632 and thence to one side of the coil 624a of the circuit breaker trip relay 624 with the other side connected to phase 2 via a conductor 634; with relay 624 actuated its contacts 1 and 2 are closed applying the battery potential at conductor 332 to conductor 388 whereby current is caused to flow through the trip coil 136 causing the main circuit breaker 88 to open.

Looking now to the circuit drawing as shown in FIG-URES 7 and 8, there are shown the following meters; the kilowatt meter 184, power factor meter 186, the elapsed time meter 188, the ammeter 190 and the voltmeter 192; also shown are the kilowatt control 196 and the reverse power relay 44. Since many of the above noted apparatus utilize both voltage and current sensing and since the current sensing of the meters are, in many instances, interconnected, first the voltage circuit will be described and connections through appropriate meters will be shown and then secondly the interconnected current circuit will be shown. Considering first now the voltage circuit, the voltmeter 192 has its sensing winding connected via conductors 636 and 638 to selector switch 194 with phases 1, 2 and 3 of generator 20 being connected to selector switch 194 by means of conductors 640, 634 and 642, respectively. The switch 194 being in the position as shown, will register a zero reading on voltmeter 192; as its contacts are moved to the succeeding three positions to the right, the voltmeter 192 will read the voltage between phases 1 and 2, 2 and 3, and 3 and 1 in that order. The potential from phases 1 and 2 is impressed upon the primary of transformer T6 by means of conductors 640 and 634, respectively; the secondary winding of transformer T6 is connected to the reverse power relay 44 voltage sensing element by means of conductors 644 and 646. Phases 1, 2 and 3 are connected to resistors R20, R21 and R22 of the power factor meter 186; the kilowatt meter 184 receives potential of phases 1 and 3 via conductors 640, and 642, respectively. A neutral connection via conductor 648 is also connected to kilowatt meter 184. The kilowatt control 196 also is connected to phases 1 and 3 and neutral by means of conductors 640, 642 and 648, respectively; the elapsed time meter 188 receives potential from phase 3 to neutral via conductors 642 and 648, respectively, and hence 120 volts are supplied to the elapsed time meter 188 such that whenever this voltage is present the elapsed time meter 188 will register, thus providing an indication of the total time during which the generator 20 has been operated.

Current for the various meters, including the kilowatt meter 184, the power factor meter 186 and the kilowatt control 196 and ammeter 190, is provided by means of meter current transformers 178A, B and C, which correspond to phases 1, 2 and 3, respectively. The transformers 178A, B and C are all connected together at one end which is connected to a common ground. The current transformer 178A has its opposite side connected by means of a conductor 650 through the current element of the kilowatt meter 184 and out through conductor 650a through the coil element of kilowatt control 196 and out through conductor 650b and then to the ammeter selector switch 189. By placing the ammeter switch 189 in the first position, a circuit will be completed through the conductor 650b through a conductor 652 through the coil of the ammeter 190, through a conductor 654 which is connected to ground. The current transformer 178B is connected by means of conductor 656 through the coil of the kilowatt meter 184 out through a conductor 656a, through the current sensing coil of power factor meter 186 out through conductor 656b, to the kilowatt control 196, and out conductor 656c to the second position of the ammeter selector switch 189. Thus with the ammeter switch 189 in position two, a current path can then be completed through conductor 682, the coil of ammeter 190 and conductor 654 to ground. Current transformer 178C is connected by conductor 658 through the current sensing coil of kilowatt meter 184, out through the conductor 658a to the reverse power relay 44, through its current sensing coil and out through conductor 658b, to the kilowatt control 196, and thence through its sensing coil and out through conductor 658c to contact position three of the ammeter selector switch 189. With the ammeter selector switch 189 in the third position, a circuit will be completed through conductor 652, the coil of the ammeter 190 and thence to ground. It should be noted that the selector switch 189 is such that when the movable selector is in any one of the positions sensing the current of that position, the other or remaining circuits are connected to the ground by means of a short circuit to the ground conductor 654 thereby providing for continuity either through the coil of ammeter 190 or through the shunt switch 189.

The reverse power relay 44 senses the potential between phases 1 and 2 and the current of phase 3 and thence will provide an indication of reverse power. When this occurs the relay will be actuated closing its contacts whereby conductor 378 will be grounded; conductor 378 is connected to low side of the reverse power alarm relay 314 (FIGURE 2) and hence upon connection to ground completes the circuit whereby the reverse powder alarm relay coil 314a will be energized causing the relay 314 to be actuated. Subsequent actuation of the alarm relay 308 and the sequence of operations described therewith will follow.

The killowatt meter 184, as noted, will be sensing the potential between phases and the current to the various phases to provide a vectorial summation of the kilowatt power being generated by the generator 20.

The power factor meter 186 senses the current to phase 2 and the potential between phases 1, 2 and 3 will provide an indication of the power facor at which the generator 20 is operating.

The kilowatt control 196 receives the same information as the kilowatt meter 184. The kilowatt control 196 is a meter having selectible high and low initiation features such that it can close a circuit upon attaining a selected high kilowatt level and also can close a different circuit upon the attainment of a selected low kilowatt level. The kilowatt control 196 provides a signal at the input of the DC amplifier low limit 214 by means of conductors 660 and 662 and provides a signal to the DC amplifier high limit 202 by means of conductors 664 and 662. The low and high limit DC amplifiers 214 and 202, respectively, are conventional amplifiers and in the preferred embodiment would be used in conjunction with a kilowatt meter 196 of the type produced by General Electric Company; the kilowatt control 196 in the preferred embodiment is a General Electric type AB-18 with high and low control initiation generally as described in the General Electric Manual GEI-56412F. The DC amplifiers, high and low, 202 and 214, respectively, are preferably also of the General Electric type as described in their catalog No. 989144 OG1—Automatic Reset Type and also generally shown in the General Electrical instruction manual GEI-56412A. Since the details of the meter 196 and the DC amplifiers 202 and 214 do not constitute a part of the present invention, these details have been eliminated for purposes of simplicity. The low limit DC amplifier 214 is provided with two output conductors 666, 668 and a ground. Conductor 668 is connected to the low side of a coil 670a of a kilowatt demand time delay relay 670. The high side of coil 670a is connected to a conductor 672 at the output of the high DC limit amplifier 202. Battery potential at conductor 332 is connected from the high limit DC amplifier 202. Under normal operating conditions in which the kilowatt output of the generator 20 is between the low and high limits as set in the amplifiers 202 and 214 and in the kilowatt control 196, conductor 668 is connected to ground by means of an actuated relay in the low limit amplifier 214. This then provides a ground to the low side of the kilowatt demand relay 670. At this time battery potential is not yet applied to the high side of the coil 670a. Upon the occurrence of a signal from the DC amplifier high limit 202 indicating that the demand of the system is exceeding the preselected maximum load level for the generator 20, then the high limit amplifier 202 will be actuated to cause the closing of relay contacts providing for a direct path between the battery at conductor 332 to the conductor 672. This then will apply potential to the kilowatt time delay relay coil 670a, actuating relay 670. The relay 670 is of the time delay nature provided to have an elapsed time after initial energization before it is actuated. This can be set from between 5 to 60 seconds. The purpose of this time delay is to insure that the kilowatt demand relay 670 will not be actuated in response to load fluctuations of a short time duration, i.e., motor starting loads. Upon actuation of the kilowatt demand relay 670, its contacts 1 and 3 will be engaged whereby the battery potential at conductor 332 is then connected to provide a hold path for the coil 670a. At the same time, contacts 1 and 2 are opened thereby deenergizing an auxiliary demand relay 672. The auxiliary demand relay 672 has its coil energized by means of battery potential from conductor 332, through the normally closed contacts 1 and 2 of the deenergized kilowatt demand relay 670; the other side of the coil 672a is connected to ground. Hence when the demand relay 670 is deactuated, the auxiliary demand relay 672 will be energized. Conversely, upon actuation of the demand relay 670, the high side of the coil 672a will be disconnected from the battery and the relay 672 will be deenergized. With the auxiliary demand relay 672 deenergized its contacts 1 and 2 and 4 and 5 will be in engagement; a potential via conductor 332 will then be connected through closed contacts 1 and 2 through a conductor 674 to automatic-manual engine switch control system 270 whereby an additional generator will be started. Meanwhile, with contacts 4 and 5 of auxiliary demand relay 672 in engagement conductors 676 and 678 are connected together which conductors are connected to the automatic-manual engine selector control system 270 and also serve a purpose to be described. With the kilowatt demand relay 670 actuated, its contacts 4 and 6 will be engaged thereby placing the battery potential appearing at conductor 332 onto a conductor 329. Looking now to the drawing of the automatic start/stop control 34 (FIGURE 2) it will be seen that conductor 329 is connected to contact 3 of switch section 74A, and hence will provide an auxiliary start signal to the conductor 331 which will act as a hold potential for the automatic-start relay 302 to hold that relay energized during a transient condition, which will be described. Note that the demand relay 670 is provided with a hold path such that even upon removal of the signal from the high limit DC amplifier 202, the relay 670 will still be maintained actuated. Once a signal has been sent to the automatic-manual engine selector control system 270 indicating that a high kilowatt condition exists and that another generator should be called in, and such additional generator is called in, after load has been appropriately divided, then no signal will appear at the high limit DC amplifier 202. However, because of the functioning of the automatic manual engine selector control system 270, in a manner to be described, the signal is maintained thereat indicating that such demand has been made. The low limit DC amplifier 214 upon actuation as previously noted, will, when the kilowatt demand is between the low and high limits, have conductor 668 connected to ground. However, upon the occurrence of a low kilowatt condition, then the connection between conductor 668 and ground will be broken and a connection will be made between conductor 666 and ground. Note that breaking of the connection between conductor 668 and ground will cause the deenergization of the demand relay 670. As a result, the auxiliary demand relay 672 will be energized and the engagement between its contacts 4 and 5 and 1 and 2 will be broken, removing the signal from the automatic manual engine selector control system 270 whereby a need for additional generators was indicated. At the same time conductor 666 has now been connected to ground and connects the low side of a low level relay coil 682a of low level relay 682 to ground; the coil 682a which has its high side connected directly to the battery via conductor 332 will be energized, thereby closing its contacts 1 and 3 providing for an electrical connection between conductors 684 and 686. These conductors 684 and 686 are connected to the automatic manual engine selector control system 270 and serve a function to be described. Upon raising of the kilowatt demand level above the low limit as set in the DC amplifier 214, the connection between conductor 666 and ground will be broken, thereby deenergizing the low level relay 682 and hence breaking the connection between conductors 684 and 686.

Note that the auxiliary demand relay 672 provides for insurance against malfunctioning due to loss of DC potential at conductor 332. This loss would result in the demand relay 670 being deenergized. At this time, however, upon deenergization of that relay, the auxiliary demand relay 672 will be deenergized whereby its contacts 4 and 5 will be engaged to conductors 676 and 678. This functions in a manner to be later described.

The voltage regulator 92 obtains information from a cross current transformer 102 which senses the current in phase 2 and current in phase 3. The transformer 102 is also connected across phase 1 to neutral through a load in the regulator 92. Hence the winding 102 will be sensitive to the current through phases 2 and 3 and to the voltage across phase 1 and will provide for cross current compensation in a conventional manner. A cross current resistor R23 is connected in parallel with the secondary winding and provides for an adjustment of the magnitude of the output. As shown in the drawing in FIGURE 5, the phases 1, 2 and 3 and neutral will be fed to the automatic voltage regulator 92 via conductors 640, 634, 642 and 648, respectively, with cross current information fed via conductor 872.

The manual synchronizing switch 150 comprises four sets of contacts; phase potential for phases 1, 2 and 3 are fed through fuses via conductors 690, 692 and 694, respectively, to contacts 1, 3 and 5, respectively, of the manual synchronizing switch 150; contacts 5 and 7 are tied together and hence the same potential appears in both. Upon actuation of the manual synchronizing switch 150, contacts 1 and 2, 3 and 4, 5 and 6 and 7 and 8 are engaged whereby the potential appearing at conductors 690, 692, 694 are transmitted through conductors 696, 698, 700, respectively, with the potential at conductor 694 being additionally transmitted to conductor 702 through the closed contacts 7 and 8. Conductors 696, 698, 700 and 702 are connected to the distribution panel and provide a function to be described.

DISTRIBUTION PANEL INSTRUMENTATION AND CONTROLS

Looking now to FIGURES 12, 13 and 14, the distribution panel includes a plurality of meters and other devices which are sensitive to current and/or voltage. These meters include the synchroscope 142, frequency meter 152, frequency meter 154, kilowatt meter 230, kilowatt hour meter 232, kilovar meter 234, kilowatt control 240 and ammeter 226. The frequency meter 152 is used to measure the frequency at the bus 84. The frequency meter receives its input by means of three conductors 704, 706 and 708 which are connected to an impedor 710. The impedor receives its input information from one phase to neutral of the bus 84 by means of conductors 712 and 714, respectively. The frequency meter 152 and impedor 710 function in a conventional manner to provide a visual indication of the frequency of the potential at the bus 84. At the same time a second frequency meter 154 is utilized to provide for visual indication of the frequency of the potential from the oncoming generator 20 and is fed by means of conductors 716, 718 and 720 from an impedor 722. The impedor 722 is connected across one phase of the oncoming generator and neutral by means of conductors 702 and 714, respectively. The frequency meter 154 can be connected to any one of the generator units 1 through 3. For example, the frequency meter 154 can be connected to the output from generator 20 by means of the manual synchronizing switch 150 which, when actuated, as previously described, will connect the three phases 1, 2 and 3 of the oncoming generator 20 to conductors 696, 698, 700 and 702 with 700 and 702 being connected together. The actuation of the manual synchronizing switch 150 will connect the phase 1 potential of the oncoming generator 20 to the impedor 722 whereby the frequency meter 154 will read the frequency of the potential out of generator 20. The synchroscope 142 is connected across both the bus 84 and the oncoming generator 20; thus the synchroscope 142 has a pair of contacts connected to neutral by means of conductor 714 and has one contact connected to phase 1 of the bus by means of conductor 712 and has its other contact connected to phase 1 of the oncoming generator 20 by means of conductor 702 through the manual synchronizing switch 150 in a manner previously described. Therefore, the synchroscope will provide for visual indication of the synchronous condition between the potential at the bus 84 and the potential of the oncoming generator 20. At the same time in order to provide for an additional visual indication of synchronization, three synchronizing lamps 156A, B and C, are connected between phase-to-phase of bus 84 to the oncoming generator 20; as for example, lamp 156A is connected between phase 1 of the bus and phase 1 of the oncoming generator by means of conductors 700 and 724 and via a dropping resistor R30. The synchronizing lamp 156B is connected between phase 2 of the oncoming generator 20 and phase 2 of the bus 84 by means of conductors 698 and 726 via dropping resistor R32 and synronizing lamp 156C is connected between phase 3 of the oncoming generator and phase 3 of the bus 84 by means of conductors 696 and 728 via dropping resistor R34. When the potential at the bus 84 is in synchronism with the potential from the oncoming generator 20 then the lamps 156A, B and C will not be lit. However, when there is lack of synchronism, then the lamps will be lit since there will be a difference in potential whereby current will flow therethrough.

Kilowatt hour meter 232 will provide two pieces of information; the first is the total kilowatt consumption delivered to the load and the second is the maximum demand load serviced by the system. The kilowatt hour meter 232 receives voltage information from phases 1 and 3 to neutral of the bus 84 by means of conductors 712, 730 and 714, respectively. The kilowatt hour meter 232 also receives current information which will be described in conjunction with the current circuit of the meters. The kilowatt meter 230 provides a visual indication of the total kilowatt output of the system at any one particular time and senses voltage from phases 1 and 3 of the bus 84 to ground by means of conductors 712, 730 and 714, respectively. The kilovar meter 234 is utilized to provide an instantaneous indication of the reactive component of the total output of the system and senses potential at phases 1, 2 and 3 to neutral by means of conductors 712, 732, 730 and 714, respectively. Phases 2 and 3 are connected to the kilovar meter 234 through resistors R36 and R38, respectively. The kilowatt control 240 is a meter identical to the kilowatt control 196 and serves a similar purpose, as will be seen. The kilowatt control 240 senses voltage information from phases 1 and 3 to neutral by means of conductors 712, 730 and 714, respectively. Current is sensed by means of the meter current transformers 222A, B and C, which are connected to phases 1, 2 and 3 of the bus, respectively. The one side of the current transformers 222A, B and C is connected to ground. The current transformer 222A for phase 1 is connected to the current coil of the kilowatt control 240 by means of a conductor 736, through the coil therein out through conductor 736a, through the current sensing coil of the kilowatt hour meter 232, out through conductor 736b, through a sensing coil in the kilowatt meter 230 out through conductor 736c, through the current sensing coil of the kilovar meter 234 out through conductor 736d, to the ammeter selector switch 228, through conductor 738 through the coil of the ammeter 226 and thence back to ground via conductor 734. Thus with the ammeter selector switch 228 in the position whereby conductor 736d is connected with conductor 738, the ammeter 226 will register the current of phase 1. Phase 2 current is fed from transformer 222B by means of conductors 740, 740a–740d through current sensing coils in the meters as previously described; phase 3 current is fed from current transformer 222C by means of conductors 742, 742a–742d through the current sensing coils of the meters as previously described. Note that the ammeter selector switch 228 functions in a manner simliar to the selector switch 189 previously described such that when the switch is in the position to read phase 1 current there is shunt path for phases 2 and 3 back to ground or neutral.

The kilowatt control meter 240 is utilized in conjunction with a DC high limit amplifier 242 which functions similarly and can be of the same type as the DC high limit amplifier 202 previously described. The DC amplifier 242 receives a signal from the kilowatt control 240 via conductors 744 and 746 such that when the kilowatt control 240 receives information indicating a level above a preselected level, then a circuit in the DC high limit amplifier 242 will be actuated. At this time an output signal will be transmitted by means of the closure of a circuit between conductor 748 and ground. Conductor 748 is connected to the low side of a system overload relay coil 750a; the high side of the coil 750a is connected to battery potential by means of conductor 332. Upon acuation of the relay 750, its contacts 1 and 3 and 4 and 6 will be engaged. Contacts 1 and 3, when closed, transmit battery potential from conductor 332 to a conductor 752 for an alarm system. Note that conductor 725 is connected to conductor 397 which receives its energy via diode D2 from the alarm relay 308.

The alarm system can include any type of visual or audible alarm. Conductor 752 is connected to a local alarm 292 through normally closed contacts 1 and 2 of an alarm cutoff relay 756. At the same time a path is completed from conductor 752 through the alarm lamp 294. The coil 756a of the alarm cutoff relay 756 has one side connected to ground and its other side connected to the conductor 752 by means of a normally opened push button switch 298. By actuating the button 298, a circuit is completed energizing the coil 756a whereby engagement between contacts 1 and 2 is broken and contacts 1 and 3 are then engaged thereby providing a hold path to the coil 756a to maintain the relay 756 actuated. Note that in breaking the engagement between contacts 1 and 2, the local alarm 292 will then be deenergized. Note, however, that the alarm lamp 294 will remain lit. Removal of potential from conductor 752 as by correction of the overload condition as indicated by the DC amplifier 242 will remove energization from the coil 756a and hence extinguish the lamp 294 and place that circuit in its normally deactuated condition. Note that the conductor 752 is connected to each of the alarm relays such as alarm relay 308 via conductor 397 and diode D2 such that a signal therefrom will cause energization of the local alarm 292 in the manner as previously described. Also in conjunction with an overload condition, contacts 4 and 6 of the system overload relay 750 will be closed whereby the potential from phase 1 of the bus is connected by means of a conductor 758, closed contacts 4 and 6, and conductor 760 to the system overload indicating lamp 248. The operating mechanism for nonessential load breakers can be placed in parallel with the system overload lamp 248 and hence can be actuated to drop out loads which have been designated as nonessential in response ot the occurrence of an overload condition. Lamps 162, 170 and 172 will be energized in response to energization of the generators of generator units Nos. 1, 2 and 3, respectively, and would be in parallel with lamp similar to the closed lamp 160 and hence actuated upon actuation of that lamp to indicate at the distribution panel which of the generators is then servicing the bus 84.

The main distribution circuit breaker 218 can be manually actuated to open and close the bus 84. It also includes auxiliary contact 254 and 256. Auxiliary contacts 254 are normally closed and provide a path from phase 3 to neutral through the open indicating lamp 250 which, when lit, will indicate that the main distribution circuit breaker 218 is opened. Upon closure of the main distribution circuit breaker 218, a normally open auxiliary contact 256 will close, thereby closing a circuit from phase 3 to neutral through the circuit breaker close lamp 252 thereby energizing that lamp to provide a visual indication that the main distribution circuit breaker 218 has been closed.

AUTOMATIC ENGINE SELECTOR CONTROL SYSTEM 270

The automatic-manual engine selector control system 270 is shown in FIGURE 14 and includes means for receiving information from each of the generator units Nos. 1, 2 and 3. As previously noted, the function of this control system 270 is to react in accordance with sensed load conditions to determine which combination of generator units Nos. 1, 2 and 3, either alone or in combination, will service the bus 84. In the preferred embodiment, the generator unit No. 3 was selected to be of a lower capacity than the generator units Nos. 1 and 2; the generator unit No. 3 was selected to have a capacity of 50 kilowatts while generator unit Nos. 1 and 2 were selected to have a capacity of 100 kilowatts each. The generator unit No. 3 was selected to operate under nighttime, weekend or other low load demand intervals. The generator unit No. 3 also was provided to assume load when generator units Nos. 1 and 2 reached their capacity and more load demands was made.

Considering the entire system to be now in an automatic condition and to be operative under a nighttime or low load condition, then the automatic engine selector control system 270 would have the generator unit No. 3 on the bus 84. As the load demand increased to a preselected percentage of the capacity of the generator unit No. 3, the control system 270 would be effective to cause a preferred one of the generator units Nos. 1 and 2 to be actuated; assume now that generator unit No. 2 was selected as preferred. At this time then the preferred generator unit No. 2, of larger capacity, would be placed into operation to service the bus 84 and unless the demand were high enough the low capacity generator unit No. 3 would be deactuated. Upon an increase in load demand to a preselected percentage of the maximum of the generator unit No. 2, the control system 270 would be operative to cause the generator unit No. 1 to be actuated whereby load division would occur between the two generator units 1 and 2. Assuming that the increase in demand continued then the control system 270 would be effective to cause generator unit No. 3 to be actuated whereby all three generator units would then be servicing the bus 84. As the load demand diminished to a preselected point, then the control system 270 would be effective to drop the low capacity generator unit No. 3 and the alternate generator unit No. 1 from the bus 84, thereby leaving the preferred generator unit No. 3 alone to service the bus 84. As the load demand dropped further, then the control system 270 would be effective to drop the preferred generator unit No. 2 and actuate the low capacity generator unit No. 3 and the sequence would repeat itself. The above sequence was related with the generator unit No. 2 being considered as the preferred and generator unit No. 1 as the alternate. A similar sequence of events would occur with the generator unit No. 1 being substituted for generator unit No. 2 if generator unit No. 1 had been selected as the preferred with the generator unit No. 2 selected as the alternate. The control system 270 is also effective in response to alarm conditions resulting from malfunction of any one of the engine generator units Nos. 1, 2 and 3 whereby if one of these generator units then on the line suffers a malfunction additional ones of the available generator units will be called into service.

In FIGURE 14 which shows the control system 270, the exterior connections thereto have been shown in phantom for purposes of simplicity in explanation; also the numbers to the components of the engine generator unit No. 1 shown in phantom are the same as those given in the associated drawings in which they originally appear. Since engine generator units Nos. 2 and 3 have similar components the same numbers have been utilized with –2 and–3 indicating that these are components of generator units Nos. 2 and 3, respectively.

Looking now to the drawing of the automatic-manual engine selector control system 270, an automatic sequence relay 760 is shown to be connected to the generator units Nos. 1 and 2 and depending upon its condition will determine which of the generator units Nos. 1 and 2 will be preferred and which will be the alternate unit. As previously noted, that generator unit which is the preferred, will be the first one to be called in by generator unit No. 3 and will be the last one to remain on the line after all generator units have been deactuated. A generator selector switch 762 is shown and functions with the generator units and with the automatic sequence relay 760 such as to determine which of the generator units Nos. 1 and 2 will be the preferred and which will be the alternate. In the position as shown of the automatic sequence relay 760 and of the generator selector switch 762, the generator unit No. 2 will be preferred; by rotating the selector switch to the left, the generator unit No. 1 will be preferred through energization of the automatic sequence relay 760.

The details of the circuitry of the selector control system 270 will be discussed in conjunction with a description of its operation under various conditions. In the first operative condition it is assumed that the system is under a low load demand which is then being served by the generator unit No. 3.

LOW LOAD DEMAND

In order for generator unit No. 3 to be in the operative condition, its automatic start relay 302-3 must be energized and will be energized by means of the closed contacts 3 and 4 of its manual-automatic selector switch section 74A-3; battery potential will be connected to the coil of automatic start relay 302-3 via conductor 764, through conductor 684-2, through closed contacts 1 and 3 of the deenergized low level relay 682-2, through conductor 686-2 through conductor 766 through conductor 767 through closed contacts 5 and 4 of the deenergized voltage relay 322, through conductor 768 through closed contacts 1 and 2 of the deenergized start/stop relay 304, through conductor 770 and conductor 772 thence to battery potential via conductor 332. Thus, the above circuitry describes an energizing path whereby the automatic start relay 302-3 for the generator unit No. 3 will be in its energized condition. As previously noted, energization of automatic start relay 302-3 will result in the starting and operating of the generator unit No. 3. An alternate path to the coil of the automatic start relay 302-3 is provided via conductor 774, conductor 776, conductor 767-2, through closed contacts 5 and 4 of voltage relay 322-2 of the engine generator No. 2, via conductor 780, through closed contacts 1 and 2 of the start/stop relay 304-2, out conductor 770-2 to conductor 784, thence to conductor 684 to closed contacts 1 and 3 of the energized low level relay 682 and thence through conductor 686 through conductor 786 and conductor 788 to battery potential via conductor 332. Thus a second energizing path for automatic start relay 302-3 has been provided. Note that the first circuit then defines a series circuit through the voltage relay 322 and start/stop relay 304 of generator unit No. 1 and the low level relay 682-2 of generator unit No. 2, while the second circuit includes the voltage relay 322-2 and the start/stop relay 304-2 of generator unit 2 and the low level relay 682 of generator unit No. 1. Thus the automatic-start relay 302-3 of generator unit No. 3 will be energized through one of the two circuits previously described and generator unit No. 3 will be on the bus 84 alone.

INCREASED DEMAND—PREFERRED GENERATOR UNIT CALLED IN

Assuming now that the demand has increased to a preselected percentage of the capacity of the generator unit No. 3 and an additional generator unit is to be brought onto the bus 84; then the auxiliary demand relay 672-3 will be deactuated as the kilowatt demand relay 670-3 is energized whereby a battery potential will be transmitted via the closed contacts 1 and 2 of the deactuated auxiliary demand relay 672-3 via conductor 390-3 through a conductor 790, through the closed contacts 4 and 5 of the deactuated automatic sequency relay 760 through conductor 792 and thence to conductor 329-2 through the closed contacts 3 and 4 of the selector switch section 74A-2 to the coil of the automatic start relay 302-2 whereby the automatic start relay 302-2 is energized. Note that with the generator unit No. 2 preferred, the contacts 4 and 5 of sequence relay 760 are closed to permit energization of start relay 302-2; if generator unit No. 1 had been preferred sequence relay 760 would have been actuated opening contacts 4 and 5 closing contacts 4 and 6 whereby automatic start relay 302 of unit No. 1 would be energized. Energization of the automatic start relay 302-2 will cause energization of the generator unit No. 2, hence bringing that generator unit onto the bus 84. As previously noted, actuation of the automatic start relay 302-2 results in energization of the start/stop relay 304-2 whereupon its normally closed contacts 1 and 2 are opened (see FIGURE 2); this will then open one of the closed circuits to the automatic start relay 302-2 of the generator unit No. 3. Thus at this time the automatic start relays 302-2 and 302-3 of the generator units Nos. 2 and 3 are energized. After the generator unit No. 2 has paralleled with the generator unit No. 3, assuming now that the load demand at the bus 84 is not sufficient to warrant the operation of both generator units Nos. 2 and 3, the low level relay 682-2 opens in response to a signal from the low limit DC amplifier (corresponding to amplifier 214) thereby deenergizing the relay 682-2 opening the previously closed contacts 1 and 3 whereby the second circuit to the automatic start relay 302-3 of the generating unit No. 3 will be opened. At this time then, assuming the standby period has elapsed, the generator unit No. 3 will be removed from the bus 84. Note, however, that upon deenergization of the automatic start relay 302-3, instantaneously the start/stop relay 304-3 will be deenergized whereby its contacts 1 and 2 previously opened will be closed, thereby closing a hold path to the automatic start relay 302-2; this hold path is defined by a conductor 794, conductor 767-3, through closed contacts 1 and 2 of start/stop relay 304-3, through conductor 770-3, through conductor 796 thence to conductor 790, through closed contacts 5 and 4 of the deactuated automatic sequence relay 760, thence to conductor 792 whereby battery potential is supplied to the automatic start relay 302-2. Note that the prior energization path for the automatic start relay 302-2 was opened since the generator unit No. 3 was dropped from the bus 84, thereby energizing the auxiliary demand relay 672-3 whereby its contacts 1 and 2 are opened, thereby opening that circuit which had previously energized the automatic start relay 302-2. Thus at this time the generating unit No. 2 will alone service the bus 84.

INCREASED DEMAND—ALTERNATE GENERATOR UNIT CALLED IN

In the event that the load demand increases, then the auxiliary demand relay 672 will be deenergized as the demand relay 670 is energized whereby a circuit will be closed to energize the automatic start relay 302 of generator unit No. 1; this circuit is defined from battery through the closed contacts 1 and 2 of the deactuated auxiliary demand relay 672, via conductor 390-2, through conductor 798, through the closed contacts 2 and 1 of the deenergized automatic sequence relay 760, through conductor 800 and thence through conductor 329, through closed contacts 1 and 3 of the selector switch section 74A to the coil 302a of the automatic start relay 302, thereby energizing that relay and causing the generator unit No. 1 to be brought onto the bus 84. Automatic load sharing will occur in a manner previously described and at this time then generator units Nos. 1 and 2 will be on the bus 84.

INCREASED DEMAND—LOW CAPACITY GENERATOR UNIT CALLED IN

In the event that the demand increases further, then the auxiliary demand relay 672 will be deenergized as the demand relay 670 is energized and a path from battery will be closed through to the automatic start relay 302-3 of the generator unit No. 3. Note that the auxiliary demand relay 672-2 of the generator unit No. 2 will remain deactuated even after the generator unit No. 1 has been called onto the bus 84. However, as the demand increased, the auxiliary demand relay 672 of unit No. 1 was energized and a circuit was defined through the contacts 4 and 5 of the deactuated auxiliary demand relay 672-2 and contacts 4 and 5 of the deactuated auxiliary demand relay 672 to provide a path for battery potential to the automatic start relay 302-3 of the generator unit No. 3. This path is as follows: from battery potential via conductor 332 through a conductor 788, through conductor 678, through closed contacts 4 and 5 of the auxiliary demand relay 672, through conductor 676, out through conductor 802, thence through conductor 678-2 through closed contacts 4 and 5 of the auxiliary demand relay 672-2, through conductor 676-2, out through conductor 774 and thence to the coil of the automatic start relay 302-3. This will result in energization of the generator unit No. 3, bringing that unit onto the bus 84. Again, load sharing between the three units, Nos. 1, 2 and 3, will automatically occur. As previously noted, a hold path was provided for the automatic start relay 302-2 by means of the deenergized start/stop relay 304-3. Upon energization of the generator unit No. 3, the start/stop relay 304-3 will be energized and this hold path will be opened. A circuit, however, is now provided by means of the energized kilowatt demand 670-2. This path will be defined from battery potential through closed contacts 4 and 6 of the demand relay 670-2, through conductor 329-2, out conductor 792, out through the closed contacts of selector switch section 74A-2 thence through the coil of the automatic start relay 302-2 thereby holding that coil energized. Now all three generating units Nos. 1, 2 and 3 are servicing the bus 84.

DECREASED DEMAND—PREFERRED GENERATOR UNIT SERVICES THE BUS

In the event that the load diminishes, then generating unit No. 3 will be dropped from the bus 84. Upon the occurrence of this condition, the auxiliary demand relay 672-2 and 672 which have been in series and had previously provided for an operating path for the automatic start coil 303-3 will be now deenergized, thereby opening up this path. This, then, will result in the generator unit No. 3 being deenergized and dropped from the bus 84. Note that again the start/stop relay 304-3 will be deenergized once again initiating the hold path for the preferred generator automatic start relay 302-2. Note also that at the same time the previously described hold path through the enregized kilowatt demand relay 670-2 will have been opened. At the same time the generator unit No. 1 will be moving to a standby condition since there will be no energization path for its automatic start relay 302, i.e. demand relay 670-2 deenergized and auxiliary demand relay 672-2 actuated. Hence, after the passage of a preselected elapsed time only the engine generator unit No. 2 will be servicing the bus 84. Note that the delay time in dropping the generator unit No. 3 is set to be shorter than the delay times of generator units Nos. 1 and 2. Thus in a diminished load condition as generators Nos. 1 and 3 would go into a standby condition, generator No. 3 would first drop off the bus 84. If the load at this time were increased or were high enough to require the necessity of additional capacity on the line, then generator unit No. 1 would be removed from the standby condition in a manner previously described and hence would then be maintained on the line with generator unit No. 2 to share the load.

DECREASED DEMAND—LOW CAPACITY UNIT CALLED IN THE SERVICE THE BUS

In the event that the load continues to diminish, then the generator unit No. 2 will be dropped from the line and generator unit No. 3 will be reinstated to service the bus 84. Note that in the prior discussion when describing the energization or operation of the engine generating unit No. 3 alone, two circuit paths for the energization of automatic start relay 302-3 were described. Note that with the dropping of generator unit No. 1 from the line, a portion of one of these paths is reinstated as the start/stop relay 304 will be deenergized whereby its contacts 1 and 2 will be engaged. Upon cessation of potential from the generator unit 20, the voltage relay 322 will likewise be deenergized whereby its contacts 4 and 5 will again be engaged. At this time then it will only be necessary that the remainder of the path through the low level relay 682-2 in generator unit No. 2 be completed. Thus, as the demand decreases and the low level relay 682-2 is energized, then its contacts 1 and 3 will be once again engaged thereby completing the path from the battery potential to the automatic start relay 302-3 whereby the engine generator unit No. 3 will be energized. At this time the start/stop relay 304-3 will be energized whereby its contacts 1 and 2 will be operated to thereby open the only remaining energizing path to the automatic start relay 302-2 whereupon the generator unit No. 2 will then be placed first in a standby condition and as the preselected time elapses will then be removed completely from the bus 84, thereby leaving the bus 84 being serviced by the generator unit No. 3 alone.

Note that the above sequence has been described with generator unit No. 2 as the preferred unit; had generator unit No. 1 been the preferred unit, then the sequence would have ben altered by replacing the generator unit No. 1 for the generator unit No. 2, and vice versa.

Alarm conditions operate on the automatic-manual engine selector control system 270 in much the same manner as the demand conditions previously described. Note that with the occurrence of a malfunction condition through the circuits as previously described, the appropriate one of the operate relays such as relay 306 will be deenergized thereby removing that generator unit from the bus 84. Note at the same time, the alarm relay, such as relay 308, will be actuated to close contacts to provide a signal similar to the occurrence of a demand signal. For example now, assuming that the engine generator unit No. 1 has been servicing the line and that a malfunction occurs causing deenergization of its operate relay 302, at the same time the alarm relay 308 will be energized closing contacts 4 and 6 thereby connecting battery through the diode D1 onto the conductor 390 thereby providing for the same type of condition as would have occurred had the auxiliary demand relay 672 been deenergized, which would have resulted in the calling for an additional generator.

An examination of the above circuitry, it can be determined that if one of the generator units were in the manual condition and were operating and servicing the bus 84 and the others of the units were in the automatic condition, then the alarm relays such as 308 and load demand relays, such as 370 and 372, function to provide for the calling of additional generators in the same manner as previously described.

PREFERENCE SELECTION

The generator selector switch 762 in the position as shown has no effect upon the automatic sequence relay 760 and hence as previously noted in that condition the generator unit No. 2 would be preferred; by switching the selector switch 762 to its No. 1 position to the left, battery voltage will then be connected by means of conductor 806, through switch 762, through the coil 760a of the sequencing relay 760 and back to ground thereby energizing relay 760. By energization of the relay 760, contacts 4 and 5 and 1 and 2 are opened and contacts 4 and 6 and 1 and 3 are closed. This condition then provides that the original relationship between the generator unit No. 3 and generator unit No. 2 be changed and that the same relationship now exists between generator unit No. 3 and generator unit No. 1. Note that a conductor 808 connects contact 6 of relay 760 to battery potential either through the alarm relay 308 or auxiliary demand relay 672 both of generator unit No. 1; note also that conductor 790 from generator unit No. 3 is connected to both contacts 3 and 5 of relay 760; thus when relay 760 is actuated generator unit No. 1 will be preferred in place of unit No. 2. Note also that the selector switch 762 can be placed in an automatic position which is its extreme right; in automatic operation the generator units Nos. 1 and 2 will be alternately preferred on a selected time base by means of a 48-hour clock timer 810, which is energized from phase 3 to neutral of the bus 84 by means of conductors 812 and 814, respectively. The timer 810 actuates a switch 816 to be alternately opened and closed; in the closed position of switch 816 the automatic sequence relay 760 will be energized thereby selecting the generator unit No. 1 to be preferred; when the switch 816 is opened then the automatic sequence relay 760 will be deenergized whereby the generator unit No. 2 will be preferred.

In addition, a system program timer can be provided by means of a 24-hour clock 818 which is energized by means of potential from phase 3 to neutral of the bus 84 via conductors 812 and 814, respectively. The clock 818 can be provided to close a switch 820 at a preselected time and in anticipation of a load demand to occur at that time, thereby providing for the application of battery potential via conductors 822 and 824 onto the conductors 790, thereby stimulating a start signal to be sent to that one of the generator units Nos. 1 and 2, which is preferred at that time, thereby causing the energization of that selected unit. It may be noted that a switch 288 is in series with contact 820 for disconnecting the program timer. If switch 288 is open, system is on load demand only. If switch 288 is closed, system is on load demand and automatic program.

Note that while the associated components shown in phantom for the engine generator units Nos. 1 and 2 are identical that shown for the engine generator unit No. 3 is somewhat modified; for example, the connection for the low level relay such as relay 682 is not used and hence not shown; likewise, the connection between the contacts 4 and 5 of the auxiliary demand relay 672-3 are not utilized and hence are not shown. Also note that the contacts 4 and 5 of the voltage relay 322 are not shown in series with the contacts 1 and 2 of the start/stop relay 304-3. This permits the generator unit No. 3 to provide for a hold path even though no generator voltage is being provided by the generator for unit No. 2; thus generator unit No. 3 can be deactuated and still provide a hold path for the preferred generator unit which it has called onto the bus 84.

The load sharing leads such as leads 623 and 625 from load sharing relay 484 (see FIGURE 10) are connected onto the other by means of the conductors 778 and 882. Of course, only those load sharing circuits will be interconnected in which the load sharing relay, such as relay 484, has been actuated.

BATTERY CHARGER 260

The battery charger 260 receives its energy by means of a connection to the bus 84 across phase one to neutral via conductors 715 and 717, respectively (see FIGURE 14). The conductors 715 is connected to the primary of a transformer T10 at one of a number of taps which can be used to provide for compensation due to deterioration of diodes, etc. The other end of the primary is connected to neutral 717 by two possible paths; the first path is through a conductor 826, a resistor R40, through closed contacts 1 and 2, of a deactuated charge relay 828, and thence through a conductor 830, through engaged contacts 4 and 5 of a deactuated starter cutoff relay 832 and thence to neutral 717. The second path from the other end of the primary is by means of a conductor 834 through contacts 3 and 1 of the actuated charge relay 828 and thence to conductor 830 and through the same circuitry as the first path to the neutral 717. The coil 828a of charge relay 828 has one side connected to conductor 830 and thence to neutral via contacts 4 and 5 of the deactuated cutoff relay 832 and has its other side connected to battery potential by means of a conductor 836 and the closed contacts of a deactuated temperature and voltage relay 838 and thence to conductor 715.

The secondary of the transformer T10 is connected across the input of a full wave rectifier bridge 840 which has one end of its output connected through a choke coil 842, an ammeter 844 and thence to the positive side of the battery 28. The other side of the rectifier bridge 840 is connected directly to ground by means of a conductor 846. The temperature and voltage sensing relay 838 has one end of it coil 838a connected to the positive side of the battery 28 via a conductor 848 and has its opposite side connected to ground by means of a conductor 850 through a switch 852, through the closed contacts 1 and 2 of the deactuated cutoff relay 832 and thence to ground by means of the conductor 846. The switch 852 is actuated by a timer clock 854 which is connected from phase to neutral by means of conductors 715 and 717. A plurality of blocking diodes D6, D7 and D8 are connected to generator units Nos. 1, 2 and 3, respectively, and are the charging circuit cutoff leads; for example, the conductor 359 from the start solenoid 355 (see FIGURE 3). The diodes D6, D7 and D8 are connected by means of a conductor 856 to the high side of coil 832a of the starter cutoff relay with the low side being connected to ground by means of conductor 846.

In operation then the rectified potential at the full wave rectifier bridge 840 will be used to charge the battery 28 and when the charge relay 828 is in the deenergized position with contacts 1 and 2 engaged, the resistor R40 will be included in the circuit of the primary thereby cutting down on the charge current and hence resulting in a lower charge rate to the battery 28. Note, however, that the charge relay 820 will be energized through the closed contacts of the temperature and the voltage sensing relay 838 and hence will maintain its contacts 1 and 3 in engagement whereby the resistor R40 will be shunted and a higher charging rate will be impressed upon the battery 28. Note also at this time that a lamp 858 connected directly across the coil 828a will be lit when that coil is energized, indicating that a high charge rate is then being employed. As previously noted, upon energization of the starter motor 333, a signal will be sent by means of conductor 359 through the diode D6 through conductor 856 thereby energizing the starter cutoff relay coil 832a, thereby disengaging its contacts 1 and 2, thereby opening up the circuit to the primary of transformer T10. Thus under starting conditions where heavy current is being drawn from the battery 28, the charge circuit will be disconnected from the source and hence high transient currents will be avoided. Upon the cessation of starting, the contacts 1 and 2, of relay 832 will again be engaged and the charging will be continued.

The temperature and voltage sensing relay 838 is operative to sense the voltage and also sense the ambient temperature such that when the voltage is at a preselected level at a selected temperature, its contacts will be opened, thereby opening the circuit through the charge relay 828 to the charge relay coil 828a, thereby deactuating the relay 828 disengaging its contacts 1 and 3 and placing contacts 1 and 2 in engagement, at which time the resistor R40 is then placed in series circuit with the primary of the transformer T10. At this time then the charge rate will be at the reduced level. Since the temperature voltage relay 838 has no external means of deenergization, the clock timer 854 is provided to operate in conjunction with switch 852 so as to open the switch 852 at periodic intervals thereby opening the circuit to the coil 838a of the temperature voltage sensing relay 838, thereby causing its deenergization and the closing of its contacts whereby charging at high rate will again be initiated. Note also that the temperature voltage sensing relay coil 838a will also be deenergized upon each actuation of the starter cutoff relay 832 whereby charging at a high rate will be initiated. This is provided since in starting engine 24, there is a substantially heavy drain upon the battery 28 and charging at a high rate is desired.

THE VOLTAGE REGULATOR 92

The voltage regulator 92 (see FIGURE 5) is to provide excitation to the exciter 22 of the generator 20. The voltage regulator can be of a construction known to those in the art and in a preferred embodiment was a General Electric voltage regulator of the type as shown and described in the General Electric Publication GEI–65559, REV. 3 and in general would correspond to General Electric Model No. 3300A03 B0003.

The regulator 92 provides excitation to the exciter 22 of the generator 20 by means of the conduction of SCR1. The firing circuit for the SCR1 permits it to conduct long enough during each cycle to supply the required exciter field excitation for the voltage level adjustment control 98 set by a voltage potentiometer R50.

In general, AC voltage from the output terminals of the generator 20 is converted by silicon rectifiers from AC to DC. The DC output is filtered and applied to a voltage comparison network. This network compares a reference voltage network output and the output voltage of the generator 20. The comparison level can be adjusted by the gain adjustment potentiometer R52. When the generator 20 load changes, the resulting voltage change is sensed by the regulator 92 which then changes the firing angle of the SCR1 to supply a new level of excitation to the exciter 22. Thus as shown the exciter 22 is connected to the voltage regulator 92 by means of conductors 860 and 862; phases 1, 2, 3 and neutral of the generator 20 are connected to the regulator by means of conductors 634, 640, 648 and 642, respectively. Cross current compensation is connected to the regulator 92 by means of conductors 634 and 872. The potential appearing at conductors 640, 648 and 872 is filtered and rectified by means of a plurality of resistors R52, R54, R56 and a plurality of capacitors C10, C12, C14 and C16, and a plurality of diodes D20, D22, and D24. Thus the potential at conductor 648 is rectified and filtered via resistor R56, capacitor C14 and diode D20; input potential at conductor 640 is filtered and rectified via resistor R54, capacitor C12 and diode D22 and the potential input at conductor 872 is filtered and rectified by means of resistor R52, capacitor C10 and diode D24. The resistors R56, R54 and R52 are connected in series with diodes D20, D22 and D24, respectively, while capacitors C10, C12 and C14 connect resistors R52, R54, and R56, respectively, to neutral conductor 642.

The voltage adjust potentiometer R50 is connected in series with resistor R58 and in parallel with capacitor C16 to neutral. The wiper of the adjust potentiometer R50 is connected to the voltage comparison circuit by means of a conductor 874. The exciter 22 has one end connected to the anode of SCR1 by means of conductor 860 and has its other end connected to the conductor 631 via conductor 862. A diode D26 is connected between conductor 862 and conductor 860. The cathode of SCR1 is connected to neutral conductor 642. The potential appearing at conductor 874 is connected to the conductor 862 through a Zener diode Z1. The Zener diode Z1 has one end connected to conductor 862 and its other end connected to one end of a primary winding of a transformer T30. The other end of the primary of transformer T30 is connected back to the other end of the Zener diode Z1 by means of a dropping resistor R60. The secondary of transformer T30 is connected to a filter network and has one end connected to the conductor 874 and has its other end connected to a resistor R62 through a diode D27. A capacitor C18 is connected in parallel across the secondary of transformer T30, diode D27 and resistor R62. Resistor R62 is connected to one end of another resistor R64 which has its opposite end connected to one end of a capacitor C20 which has its opposite end connected to conductor 874. A resistor R66 parallels the capacitor C20. A plurality of diodes generally indicated by the numeral D28 are connected in series and in series with a Zener diode Z2 all of which are in parallel with resistor R66. A second plurality of serially connected diodes generally indicated by the numeral D30 are connected in parallel with a resistor R68 with one end of this parallel circuit being connected to the juncture between resistor R66 and capacitor C20 and its other end connected to neutral by means of resistor R70 and a capacitor C22.

The rectified potential then at the juncture of resistors R68, R70 is connected to the base of an NPN transistor Q1 which has its emitter connected to neutral through the variable resistor R52 and has its collector connected to a dropping resistor R72. Resistor R72 is connected to conductor 862 via a resistor R74 and a diode D32. The base of a transistor Q2 is connected to the collector of transistor Q1 and in turn is of the PNP type and has its collector connected directly to the neutral conductor 854 and has its emitter connected to resistor R74 via a resistor R76. A unijunction transistor Q3 has its emitter electrode connected to the collector of transistor Q2 and has one of its bases connected to resistor R74 and the other of its bases connected to neutral via a resistor R76. The second base is also connected to the gate of the SCR1 to provide the trigger therefor and hence control its conduction.

A diode D34 is connected from the resistor R74 to neutral and a capacitor C24 is connected from the diode D32 to neutral. The gain of the comparison circuit can be adjusted by adjusting the variable resistor R52, thereby controlling the point at which the trigger pulse will occur from the unijunction transistor Q3. The frequency with which this occurs will control the occurrence of the gate to SCR1 and hence will control the firing time of the SCR1, and hence will control the DC excitation provided to the exciter 22. The comparison circuit provides for a comparative reference voltage which is independent of the voltage generated by the generator 20 and hence will automatically provide a DC reference for controlling the level of excitation. As the load demand increases, the excitation will automatically increase and likewise, when the demand decreases, the excitation will be automatically decreased.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an electrical generating system having a generator driven by a prime mover and to be paralleled onto a bus, the invention comprising: synchronizing means for sensing the difference in phase between the potential on the bus and the potential from the generator and for providing a first signal in response to said difference and a second signal when said difference is zero, and modulator means responsive to said first signal for varying the frequency of the potential from said generator over a preselected range whereby phase coincidence will be obtained between the potential from the generator and the potential on the bus, and means responsive to said second signal for automatically connecting the generator onto the bus.

2. In an electrical generating system having a generator driven by a prime mover and to be parallel onto a bus, the invention comprising: synchronizing means for sensing the difference in phase between the potential on the bus and the potential from the generator and for providing a first signal in response to said difference and a second signal when said difference is zero, and responsive to a condition of no potential on the bus for providing said second signal and for providing a signal effective to connect the generator to the bus and modulator means responsive to said first signal for varying the frequency of the potential from said generator over a preselected range whereby phase coincidence will be obtained between the potential from the generator and the potential on the bus.

3. In an electrical generating system having a generator driven by a prime mover and to be paralleled onto a bus, the invention comprising: synchronizing means for sensing the difference in phase between the potential on the bus and the potential from the generator and for providing a scan signal in response to said difference, said synchronizing means including time delay means for delaying for a preselected interval the sensing of said difference, and modulator means responsive to said first signal for varying the frequency of the potential from said generator whereby phase coincidence will be obtained between the potential from the generator and the potential on the bus.

4. In an electrical generating system having a generator driven by a prime mover and to be paralleled onto a bus, the invention comprising: synchronizing means for sensing the difference in phase between the potential on the bus and the potential from the generator and for providing a signal when said difference is zero for paralleling the generator onto the bus and responsive to a condition of no potential on the bus for providing said signal and including means responsive to said signal for automatically connecting the generator onto the bus.

5. In an electrical generating system having a generator driven by a prime mover and to be paralleled onto a bus, the invention comprising: synchronizing means for sensing the difference in phase between the potential on the bus and the potential from the generator and for providing a signal when said difference is zero for paralleling the generator onto the bus and responsive to a condition of no potential on the bus for providing said signal, said synchronizing means including time delay means for delaying for a preselected interval the sensing of said difference.

6. In an electrical generating system having a generator driven by a prime mover and to be paralleled onto a bus, the invention comprising: synchronizing means for sensing the difference in phase between the potential on the bus and the potential from the generator and for providing a signal when said difference is zero for paralleling the generator onto the bus, said synchronizing means including time delay means for delaying for a preselected interval the sensing of said difference, said synchronizing means further including means operative during said interval and responsive to potential on the bus for providing no said signal and to no potential on the bus for providing said signal.

7. In an electrical generating system having a generator driven by a prime mover and to be paralleled onto a bus, the invention comprising: synchronizing means for sensing the difference in phase between the potential on the bus and the potential from the generator and for providing a signal when said difference is zero for paralleling the generator onto the bus, said synchronizing means including time delay means for delaying for a preselected interval the sensing of said difference, said synchronizing means further including means operative during said interval and responsive to potential on the bus for providing no said signal and to no potential on the bus for providing said signal and after expiration of said interval being electrically connected between a phase on the generator and a corresponding phase on the bus for sensing said difference in phase.

8. In an electrical generating system having a generator driven by a prime mover and to be paralleled onto a bus, the invention comprising: synchronizing means for sensing the difference in phase between the potential on the bus and the potential from the generator and for providing a scan signal in response to said difference, and governor means connected to the prime mover for controlling its speed and hence for controlling the frequency of the potential from the generator, modulator means responsive to said scan signal for providing a bias to said governor means for varying the frequency of the potential from said generator above and below the frequency of the potential on the bus over a preselected range whereby phase coincidence will be obtained between the potential from the generator and the potential on the bus.

9. In an electrical generating system having a generator driven by a prime mover and to be paralleled onto a bus, the invention comprising: synchronizing means for sensing the difference in phase between the potential on the bus and the potential from the generator and for providing a scan signal in response to said difference, and governor means connected to the prime mover for controlling its speed and hence for controlling the frequency of the potential from the generator, modulator means responsive to said scan signal for providing a bias to said governor means for varying the frequency of the potential from said generator above and below the frequency of the potential on the bus over a preselected range whereby phase coincidence will be obtained between the potential from the generator and the potential on the bus, said modulator means providing a bias varying in magnitude at a preselected set rate in response to said scan signal.

10. In an electrical generating system having a generator driven by a prime mover and to be paralleled onto a bus, the invention comprising: synchronizing means for sensing the difference in phase between the potential on the bus and the potential from the generator and for providing a scan signal in response to said difference, governor means connected to the prime mover for controlling its speed and hence for controlling the frequency of the potential from the generator, and modulator means responsive to said scan signal for providing a bias to said governor means for varying the frequency of the potential from said generator above and below the frequency of the potential on the bus whereby phase coincidence will be obtained between the potential from the generator and the potential on the bus, said synchronizing means including time delay means for delaying for a preselected interval the sensing of said difference, and means operative with said governor means for biasing said governor to bring the prime mover rapidly up to a speed for the desired frequency during said interval.

11. In an electrical generating system having a generator driven by a prime mover and to be paralleled onto a bus, the invention comprising: synchronizing means for sensing the difference in phase between the potential on the bus and the potential from the generator and for providing a scan signal in response to said difference, governor means connected to the prime mover for controlling its speed and hence for controlling the frequency of the potential from the generator, modulator means responsive to said scan signal for providing a bias to said governor means for varying the frequency of the potential from said generator above and below the frequency of the potential on the bus whereby phase coincidence will be obtained between the potential from the generator and the potential on the bus, said synchronizing means including time delay means for delaying for a preselected interval the sensing of said difference, said synchronizing means operative during said interval and responsive to potential on the bus for providing no said signal and to potential on the bus for providing said signal, and means operative with said governor means for biasing said governor to bring the prime mover rapidly up to a speed for the desired frequency during said interval.

12. In an electrical generating system having a generator driven by a prime mover and to be paralleled onto a bus, the invention comprising: synchronizing means for sensing the difference in phase between the potential on the bus and the potential from the generator and for providing a scan signal in response to said difference, governor means connected to the prime mover for controlling its speed and hence for controlling the frequency of the potential from the generator, modulator means responsive to said scan signal for providing a bias to said governor means for varying the frequency of the potential from said generator above and below the frequency of the potential on the bus whereby phase coincidence will be obtained between the potential from the generator and the potential on the bus, said synchronizing means including time delay means for delaying for a preselected interval the sensing of said difference, said synchronizing means operative during said interval and responsive to potential on the bus for providing no said signal and to potential on the bus for providing said signal, and after expiration of said interval being electrically connected between a phase on the generator and a corresponding phase on the bus for sensing said difference in phase, and means operative with said governor means for biasing said governor to bring the prime mover rapidly up to a speed for the desired frequency during said interval.

13. In an electrical generating system having a generator driven by a prime mover and to be paralleled onto a bus, the invention comprising: synchronizing means for sensing the difference in phase between the potential on the bus and the potential from the generator and for providing a scan signal in response to said difference, governor means connected to the prime mover for controlling its speed and hence for controlling the frequency of the potential from the generator, modulator means responsive to said scan signal for providing a bias varying in magnitude from a selected magnitude for varying the frequency of the potential from said generator from the frequency of the potential on the bus whereby phase coincidence will be obtained between the potential from the generator and the potential on the bus, said modulator means including homing means operative after expiration of said scan signal for bringing said bias to said selected magnitude.

14. In an electrical generating system having a generator driven by a prime mover and to be paralleled onto a bus, the invention comprising: synchronizing means for sensing the difference in phase between the potential on the bus and the potential from the generator and for providing a scan signal in response to said difference, governor means connected to the prime mover for controlling its speed and hence for controlling the frequency of the potential from the generator, modulator means responsive to said scan signal for providing a bias varying in magnitude from a selected magnitude for varying the frequency of the potential from said generator from the frequency of the potential on the bus whereby phase coincidence will be obtained between the potential from the generator and the potential on the bus, said modulator means including homing means operative after expiration of said scan signal for bringing said bias to said selected magnitude, said synchronizing means including time delay means for delaying for a preselected interval the sensing of said difference, said synchronizing means operative during said interval and responsive to potential on the bus for providing no said signal and to potential on the bus for providing said signal, and after expiration of said interval being electrically connected between a phase on the generator and a corresponding phase on the bus for sensing said difference in phase, and means operative with said governor means for biasing said governor to bring the prime mover rapidly up to a speed for the desired frequency during said interval.

15. In an electrical generating system having a generator driven by a prime mover and to be paralleled onto a bus, the invention comprising: synchronizing means for sensing the difference in phase between the potential on the bus and the potential from the generator and for providing a signal when said difference is zero for paralleling the generator onto the bus and responsive to a condition of no potential on the bus for providing said signal, governor means connected to the prime mover for controlling its speed and hence for controlling the frequency of the potential from the generator, modulator means responsive to said scan signal for providing a bias varying in magnitude from a selected magnitude for varying the frequency of the potential from said generator from the frequency of the potential on the bus whereby phase coincidence will be obtained between the potential from the generator and the potential on the bus, said modulator means including homing means operative after expiration of said scan signal for bringing said bias to said selected magnitude, said synchronizing means including time delay means for delaying for a preselected interval the sensing of said difference, said synchronizing means operative during said interval and responsive to potential on the bus for providing no said signal and to potential on the bus for providing said signal, and after expiration of said interval being electrically connected between a phase on the generator and a corresponding phase on the bus for sensing said difference in phase, and means operative with said governor means for biasing said governor to bring the prime mover rapidly up to a speed for the desired frequency during said interval.

16. In an electrical generating system having a generator driven by a prime mover and to be paralleled onto a bus, the invention comprising: synchronizing means for sensing the difference in phase between the potential on the bus and the potential from the generator and for providing a signal when said difference is zero for paralleling the generator onto the bus and responsive to a condition of no potential on the bus for providing said signal, governor means connected to the prime mover for controlling its speed and hence for controlling the frequency of the potential from the generator, modulator means responsive to said scan signal for providing a bias varying in magnitude from a selected magnitude for varying the frequency of the potential from said generator from the frequency of the potential on the bus whereby phase coincidence will be obtained between the potential from the generator and the potential on the bus, said modulator means including homing means operative after expiration of said scan signal for bringing said bias to said selected magnitude, said synchronizing means including tme delay means for delaying for a preselected interval the sensing of said difference, said synchronizing means operative during said interval and responsive to potential on the bus for providing no said signal and to potential on the bus for providing said signal, and after expiration of said interval being electrically connected between a phase on the generator and a corresponding phase on the bus for sensing said difference in phase, and means operative with said governor means for biasing said governor to bring the prime mover rapidly up to a speed for the desired frequency during said interval, said synchronizing means comprising a continuous wound rheostat having a rotatable wiper and motor means energizable responsively to said scan signal for rotating said wiper, means connecting said rheostat to said governor with rotation of said wiper providing a variation in said bias and with said homing means returning said wiper a selected position for bringing said bias to said selected magnitude.

17. The system of claim 16 with said synchronizing means including an electrical impedance element, and means connecting one end of said element to one phase of the bus and the other end to a corresponding phase of the generator.

18. The system of claim 16 with said synchronizing means including an electrical impedance element, and first means connecting one end of said element to one phase of the bus, second means having one condition connecting the other end of said element to the bus and another condition connecting the other end of said element to a corresponding phase of the generator, said second means and said time delay means electrically connected with said second means being in said first condition during said interval and being placed in said second condition after expiration of said interval.

19. The system of claim 18 with said synchronizing means including means responsive to a potential difference across said impedance element for providing no said signal and to no potential difference across said impedance element for providing said signal.

20. The system of claim 19 in which said impedance element is the primary of a transformer having a secondary and having a rectifier bridge connected across said secondary.

References Cited

UNITED STATES PATENTS

| | | | |
|---|---|---|---|
| 2,885,569 | 5/1959 | Schuh et al. | 307—87 |
| 2,929,941 | 3/1960 | Bobo | 307—87 |
| 3,069,556 | 12/1962 | Apfelbeck et al. | 307—87 |
| 3,210,556 | 10/1965 | Billings | 307—87 |
| 3,235,743 | 2/1966 | Ryerson et al. | 307—87 X |

ROBERT K. SCHAEFER, Primary Examiner

H. J. HOHAUSER, Assistant Examiner

U.S. Cl. X.R.

307—87

FO-1050
(5/69)

UNITED STATES PATENT OFFICE
CERTIFICATE OF CORRECTION

Patent No. 3,489,914            Dated January 13, 1970

Inventor(s) Michael J. Taylor

It is certified that error appears in the above-identified patent and that said Letters Patent are hereby corrected as shown below:

Column 2, line 2, delete "relatively" and substitute therefor --relative--
Column 4, line 12, delete "condition" and substitute therefor --conditions--
Column 4, line 46, delete "ampliude" and substitute therefor --amplitude--
Column 4, line 66, after "108" insert --flow to the actuator 106 via cable 111 while feedback information is fed to the governor 108--
Column 5, line 12, delete "bust" and substitute therefor --bus--
Column 5, line 15, delete "24" and substitute therefor --124--
Column 5, line 15, delete "in" and substitute therefor --is--
Column 5, line 65, delete "Noted" and substitute therefor --Note--
Column 6, line 58, delete "thigh" and substitute therefor --high--
Column 7, line 66, delete "No." and substitute therefor --Nos.--
Column 8, line 32, after "system" insert --timer--
Column 8, line 64, delete "is" second occurrence and substitute therefor --its--
Column 12, line 70, delete "generating" and substitute therefor --generator--

Column 21, line 58, after "circuit" insert --is--
Column 21, line 73, delete "conductors" and substitute therefor --conductor--
Column 25, line 61, delete "24" and substitute therefor --20--
Column 29, line 73, delete "grought" and substitute therefor --brought--
Column 34, line 53, before "FIGURE" insert --see--
Column 34, line 54, delete "killowatt" and substitute therefor --kilowatt--
Column 39, line 35, delete "ot" and substitute therefor --to--
Column 41, line 47, delete "un't" and substitute therefor --unit--
Column 44, line 11, delete "operated" and substitute therefor --opened--
Column 46, line 6, delete "it" and substitute therefor --its--
Column 48, line 62, delete "parallel" and substitute therefor --paralleled--

Signed and sealed this 28th day of July 1970.

(SEAL)
Attest:

EDWARD M. FLETCHER, JR.          WILLIAM E. SCHUYLER, JR.
Attesting Officer               Commissioner of Patents